(12) United States Patent
Polk et al.

(10) Patent No.: US 8,518,202 B2
(45) Date of Patent: Aug. 27, 2013

(54) METHOD AND APPARATUS FOR FORMING A SHAPED MULTILAYERED MOLDED ARTICLE

(75) Inventors: Karl Leslie Polk, Cocoa Beach, FL (US); Albert H. Berghuis, Titusville, FL (US); Dale E. Polk, Jr., Titusville, FL (US); Victor Wolynski, Cocoa, FL (US)

(73) Assignee: LRM Industries International, Inc., Rockledge, FL (US)

( * ) Notice: Subject to any disclaimer, the term of this patent is extended or adjusted under 35 U.S.C. 154(b) by 925 days.

(21) Appl. No.: 12/495,838

(22) Filed: Jul. 1, 2009

(65) Prior Publication Data

US 2010/0021664 A1   Jan. 28, 2010

Related U.S. Application Data

(60) Provisional application No. 61/082,908, filed on Jul. 23, 2008.

(51) Int. Cl.
*B44C 1/17* (2006.01)
*D06N 7/00* (2006.01)

(52) U.S. Cl.
USPC .......................................... 156/231; 156/238

(58) Field of Classification Search
USPC .................... 156/231, 238; 264/510
See application file for complete search history.

(56) References Cited

U.S. PATENT DOCUMENTS

| | | |
|---|---|---|
| 3,676,537 A | 7/1972 | Winstead |
| 4,061,706 A | 12/1977 | Duffield et al. |
| 4,421,712 A | 12/1983 | Winstead |
| 4,475,881 A | 10/1984 | Borst |
| 4,722,820 A | 2/1988 | Flecknoe-Brown |
| 4,778,372 A | 10/1988 | Mutti |
| 4,790,972 A | 12/1988 | Coffman |
| 4,942,012 A | 7/1990 | Lee |
| 4,960,558 A | 10/1990 | Short |
| 5,297,328 A | 3/1994 | Reimers |

(Continued)

OTHER PUBLICATIONS

U.S. Appl. No. 06/679,653, filed Jan. 20, 2004, Robert J. DiTullio.

(Continued)

*Primary Examiner* — Michael C Miggins

(57) ABSTRACT

The present invention provides a method and apparatae used to prepare a shaped and molded multilayered article formed from a heated thermoplastic sheet and a first plastic sheet that are driven into melt-bonding contact by a stream of gas. The method involves applying a stream of gas (450) against the first surface (417) of a first plastic sheet (411) so as to drive a second surface (420) of the first plastic sheet against and into contact with the first surface (432) of a heated thermoplastic sheet (423) as the heated thermoplastic sheet is formed (e.g., extends downstream from the sheet slot 426 of a sheet die 429). The second surface of the first plastic sheet is defined by a thermoplastic layer. The heated thermoplastic sheet has a temperature that is sufficient to melt-bond the thermoplastic layer defining the second surface of the first plastic sheet and the first surface of the heated thermoplastic sheet together, thereby resulting in the continuous formation of a heated multilayered thermoplastic sheet (292) having a thermoformable temperature. The second surface (298) of the heated thermoformable multilayered thermoplastic sheet is brought into contour matching contact with the interior surface (14) of a first mold portion (11), and cooled thereby resulting in formation of the shaped multilayered article. A sheet molding apparatus (1), a sheet guide apparatus (456, 603), and fluid management structures (700) (e.g., storm/waste water management chambers) prepared thereby, are also provided with regard to the present invention.

17 Claims, 29 Drawing Sheets

(56) References Cited

U.S. PATENT DOCUMENTS

| | | |
|---|---|---|
| 5,314,325 A | 5/1994 | Bosler |
| 5,419,838 A | 5/1995 | DiTullio |
| 5,614,228 A | 3/1997 | Demerest |
| 5,659,153 A | 8/1997 | Narayan et al. |
| 5,773,756 A | 6/1998 | DiTullio |
| 5,824,178 A | 10/1998 | Shingu et al. |
| 6,063,504 A | 5/2000 | Nagaoka et al. |
| 6,066,221 A | 5/2000 | Marmon |
| 6,086,800 A | 7/2000 | Manlove |
| 6,093,462 A | 7/2000 | O'Herron |
| 6,475,591 B2 | 11/2002 | Mushaben |
| 6,705,853 B1 | 3/2004 | Nehring |
| 6,814,905 B1 | 11/2004 | Dalgewicz |
| 6,818,083 B2 | 11/2004 | McAmish |
| 6,913,714 B2 | 7/2005 | Liu |
| 7,008,213 B2 | 3/2006 | King |
| 7,204,681 B2 | 4/2007 | Fitzell, Jr. |
| 7,226,241 B2 | 6/2007 | DiTullio |
| 7,306,399 B1 | 12/2007 | Smith |
| 2004/0101369 A1 | 5/2004 | DiTullio |
| 2004/0184884 A1 | 9/2004 | DiTullio |
| 2006/0233612 A1 | 10/2006 | DiTullio |

OTHER PUBLICATIONS

U.S. Appl. No. 07/118,306 B2, filed Oct. 10, 2006, Kurt J. Kruger et al.

U.S. Appl. No. 07/052,209 B1, filed May 30, 2006, Kurt J. Kruger et al.

METHOD AND APPARATUS FOR FORMING A SHAPED MULTILAYERED MOLDED ARTICLE

The present non-provisional patent application is entitled to and claims under 35 U.S.C. §119(E), the benefit of U.S. Provisional Patent Application Ser. No. 61/082,908, filed Jul. 23, 2008, which is hereby incorporated herein by reference in its entirety.

FIELD OF THE INVENTION

The present invention relates to a method of forming a shaped multilayered molded article. The method, in particular, involves applying a stream of gas against a first plastic sheet so as to drive it against a continuously formed heated thermoformable thermoplastic sheet, thereby continuously melt-bonding the two sheets together, and correspondingly forming continuously a heated thermoformable multilayered thermoplastic sheet. The heated thermoformable multilayered thermoplastic sheet is brought into contour matching contact with the interior mold surface of a first mold portion (e.g., by means of reduced pressure). The heated multilayered thermoplastic sheet, while in contour matching contact with the interior mold surface, is cooled thereby forming a shaped multilayered molded article, which retains the contour of the interior mold surface. The present invention also relates to a sheet molding apparatus, a sheet guide apparatus, and a fluid management structure prepared thereby.

BACKGROUND OF THE INVENTION

Multilayered thermoforming processes typically involve providing a preformed multilayered sheet of thermoplastic material (usually on a roll), heating the preformed multilayered thermoplastic sheet to a thermoformable temperature, and contacting the heated multilayered thermoplastic sheet with a shaped mold surface. The heated multilayered thermoplastic sheet is typically drawn into contact with the shaped mold surface by means of a vacuum being drawn through perforations in the mold surface.

Such prior art methods of multilayered sheet thermoforming typically and undesirably involve multiple steps, such as separately forming the multilayered thermoplastic sheet, collecting the preformed multilayered thermoplastic sheet on a roll, transporting (e.g., shipping) the roll of preformed multilayered thermoplastic sheet to a molder (or fabricator), and re-heating the preformed multilayered thermoplastic sheet prior to the thermoforming operation.

Thermoforming processes that involve the continuous extrusion of a multilayered thermoplastic sheet, that is thermoformed using residual heat from the extruded thermoplastic sheet are known. U.S. Pat. No. 6,814,905 B1 discloses forming a thermoformable sheet having at least two distinct layers by means of co-extruders, and contacting the sheet with the mold surface of mold members (e.g., 300) provided on a rotating wheel (e.g., 50), while the sheet is in a substantially non-oriented state. Such continuous co-extrusion thermoforming methods typically involve the use of multiple extruders connected to a multilayer die. The use of multiple extruders is typically accompanied by substantially increased manufacturing costs. Increased manufacturing costs are generally due to duplication of equipment in that a separate extruder and the equipment associated therewith (e.g., raw material feed and temperature control apparatae) are required for each layer of the multilayered sheet. It can be difficult to control the thicknesses of the various layers of the co-extruded multilayered sheet, for example due to variable extrudate expansion upon emergence from the slots of the multilayered die. In addition, formation by co-extrusion of an outer layer having a width that is less than that of an abutting underlying layer typically and undesirably results in the outer layer having non-distinct edges that bleed out over the underlying layer, which can result in degraded physical and aesthetic properties of the final molded article.

It would be desirable to develop new multilayer thermoforming processes, and apparatae used therewith, that minimize or eliminate the steps typically encountered with prior art methods. In addition, it would be further desirable that such newly developed methods and apparatae also provide reduced operating costs, and/or improved control of the thicknesses and widths of the various sheet layers.

SUMMARY OF THE INVENTION

In accordance with the present invention, there is provided a method of forming a shaped multilayered article comprising:

(a) providing a first mold portion having an interior mold surface, said interior mold surface having a contour;

(b) providing a first plastic sheet having a first surface and a second surface defined by a thermoplastic layer having a melting temperature, said first plastic sheet being provided at a temperature that is less than said melting temperature of said thermoplastic layer defining said second surface of said first plastic sheet;

(c) forming, from at least one thermoplastic composition, a heated thermoplastic sheet having a temperature that allows said heated thermoplastic sheet to be thermoformable, said heated thermoplastic sheet having a first surface and a second surface, said temperature of said heated thermoplastic sheet being equal to or greater than the melting temperature of said thermoplastic layer defining said second surface of said first plastic sheet;

(d) positioning a portion of said second surface of said first plastic sheet in opposition (e.g., facing opposition) with a portion of said first surface of said heated thermoplastic sheet;

(e) applying a stream of gas against a portion of said first surface of said first plastic sheet, thereby contacting continuously, as said heated thermoplastic sheet is formed, said portion of said second surface of said first plastic sheet with said portion of said first surface of said heated thermoplastic sheet, thereby melt-bonding continuously said thermoplastic layer defining said second surface of said first plastic sheet and said heated thermoplastic sheet together, and thereby forming continuously a heated multilayered thermoplastic sheet having a first surface defined at least partially by said first surface of said first plastic sheet, and a second surface defined by said second surface of said heated thermoplastic sheet, said heated multilayered thermoplastic sheet having a temperature that allows said heated multilayered thermoplastic sheet to be thermoformable;

(f) bringing said second surface of said heated multilayered thermoplastic sheet into contour matching contact with said interior mold surface of said first mold portion; and (g) cooling said heated multilayered thermoplastic sheet thereby forming said shaped multilayered article, which retains said contour of said interior mold surface of said first mold portion; and (h) removing said shaped multilayered article from said first mold portion.

In further accordance with the present invention, there is provided a sheet molding apparatus comprising:

(a) a sheet die having an elongated sheet slot dimensioned to form from at least one thermoplastic composition a heated thermoplastic sheet having a first surface, a second surface and a temperature that allows said heated thermoplastic sheet to be thermoformable, said heated thermoplastic sheet being formed so as to extend downstream relative to said elongated sheet slot;

(b) a guide apparatus for a first plastic sheet having a first surface, and a second surface defined by a thermoplastic layer having a melting temperature, said first plastic sheet being provided at a temperature that is less than said melting temperature of said thermoplastic layer defining said first surface of said first plastic sheet, said guide apparatus comprising, an elongated arm comprising a forward portion having a guide slot dimensioned to receive said first plastic sheet there-through, said forward portion of said elongated arm further comprising a conduit having a gas outlet aperture residing beneath said guide slot, said gas outlet aperture being dimensioned to allow a stream of gas to pass outward therefrom, said forward portion of said elongated arm being positioned downstream relative to said elongated sheet slot and in opposition to said first surface of said heated thermoplastic sheet as said heated thermoplastic sheet extends downstream relative to said elongated sheet slot, as said first plastic sheet is guided through said guide slot said first surface of said plastic sheet passes in front of said gas outlet aperture such that said stream of gas emerging from said gas outlet aperture contacts said first surface of said first plastic sheet and drives continuously a portion of said second surface of said first plastic sheet into contact with a portion of said first surface of said heated thermoplastic sheet, said temperature of said heated thermoplastic sheet being equal to or greater than said melting temperature of said thermoplastic layer defining said second surface of said first plastic sheet, thereby melt bonding together continuously said heated thermoplastic sheet and said thermoplastic layer defining said second surface of said first plastic sheet and forming continuously a heated multilayered thermoplastic sheet having a first surface defined at least partially by said first surface of said first plastic sheet, and a second surface defined by said second surface of said heated thermoplastic sheet, said heated multilayered thermoplastic sheet having a temperature that allows said heated multilayered thermoplastic sheet to be thermoformable; and (c) a first mold portion having an interior mold surface having a contour, said first mold portion being positioned downstream relative to said forward portion of said elongated arm of said guide apparatus, said first mold portion being positioned to provide contour matching contact between said second surface of said heated multilayered thermoplastic sheet and said interior mold surface of said first mold portion so as to result in formation of a shaped multilayered article.

In accordance with the present invention, there is also provided a sheet guide apparatus comprising, an elongated arm comprising a forward portion having a guide slot dimensioned to receive therethrough a sheet (e.g., the first plastic sheet) having a first surface and a second surface, said forward portion of said elongated arm further comprising a conduit having a gas outlet aperture residing beneath said guide slot, said gas outlet aperture being dimensioned to allow a stream of gas to pass outward therefrom, wherein said gas outlet aperture is positioned to direct said stream of gas against a portion of said first surface of said sheet (e.g., the first surface of the first plastic sheet) as said sheet passes through said guide slot and in front of said gas outlet aperture, so as to drive a portion of said second surface of said sheet (e.g., the second surface of the first plastic sheet) against a first surface of a separate structure (e.g., the first surface of the heated thermoplastic sheet) positioned opposingly relative to said forward portion of said elongated arm.

A fluid management structure (e.g., a storm/waste water chamber) prepared using the method and optionally the apparatus of the present invention is also provided, wherein the fluid management structure comprises:

a housing having a longitudinal axis, an arch shaped cross section, a first base side flange, a second base side flange, a plurality of raised lateral ribs extending from said first base flange to said second base side flange, a plurality of continuous lateral indentations extending from said first base flange to said second base flange, each continuous lateral indentation being interposed between a pair of neighboring raised lateral ribs, an open bottom, an exterior surface, and an interior surface;

a first endplate having an exterior surface and an interior surface; and a second endplate having an exterior surface and an interior surface, wherein said housing, said first endplate and said second endplate together defining a continuous unitary structure, said exterior surface of said housing, said exterior surface of said first endplate and said exterior surface of said second endplate are each defined by said first surface of said multilayered thermoplastic sheet, said interior surface of said housing, said interior surface of said first endplate and said interior surface of said second endplate are each defined by said second surface of said multilayered thermoplastic sheet, said interior surface of said housing, said interior surface of said first endplate and said interior surface of said second endplate together defining an interior chamber, said first endplate having a first opening that is in fluid communication with said interior chamber, said second endplate having a second opening that is in fluid communication with said interior chamber, and further wherein, said housing has a housing wall thickness, said first endplate has a first endplate wall thickness, and said second endplate has a second endplate wall thickness, said housing wall thickness, said first endplate wall thickness and said second endplate wall thickness being substantially equivalent.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred (though non-limiting) embodiments of the invention are illustrated and described.

As used herein and in the claims, terms of orientation and position, such as, "upper", "lower", "inner", "outer", "right", "left", "vertical", "horizontal", "top", "bottom", and similar terms, are used to describe the invention as oriented and depicted in the drawings. Unless otherwise indicated, the use of such terms is not intended to represent a limitation upon the scope of the invention, in that the invention may adopt alternative positions and orientations.

Unless otherwise indicated, all numbers or expressions, such as those expressing structural dimensions, quantities of ingredients, etc., as used in the specification and claims are understood as modified in all instances by the term "about".

BRIEF DESCRIPTION OF THE DRAWINGS

In FIGS. 1 through 30, like reference numerals designate the same components and structural features, unless otherwise indicated.

DETAILED DESCRIPTION OF THE INVENTION

Figure 1:
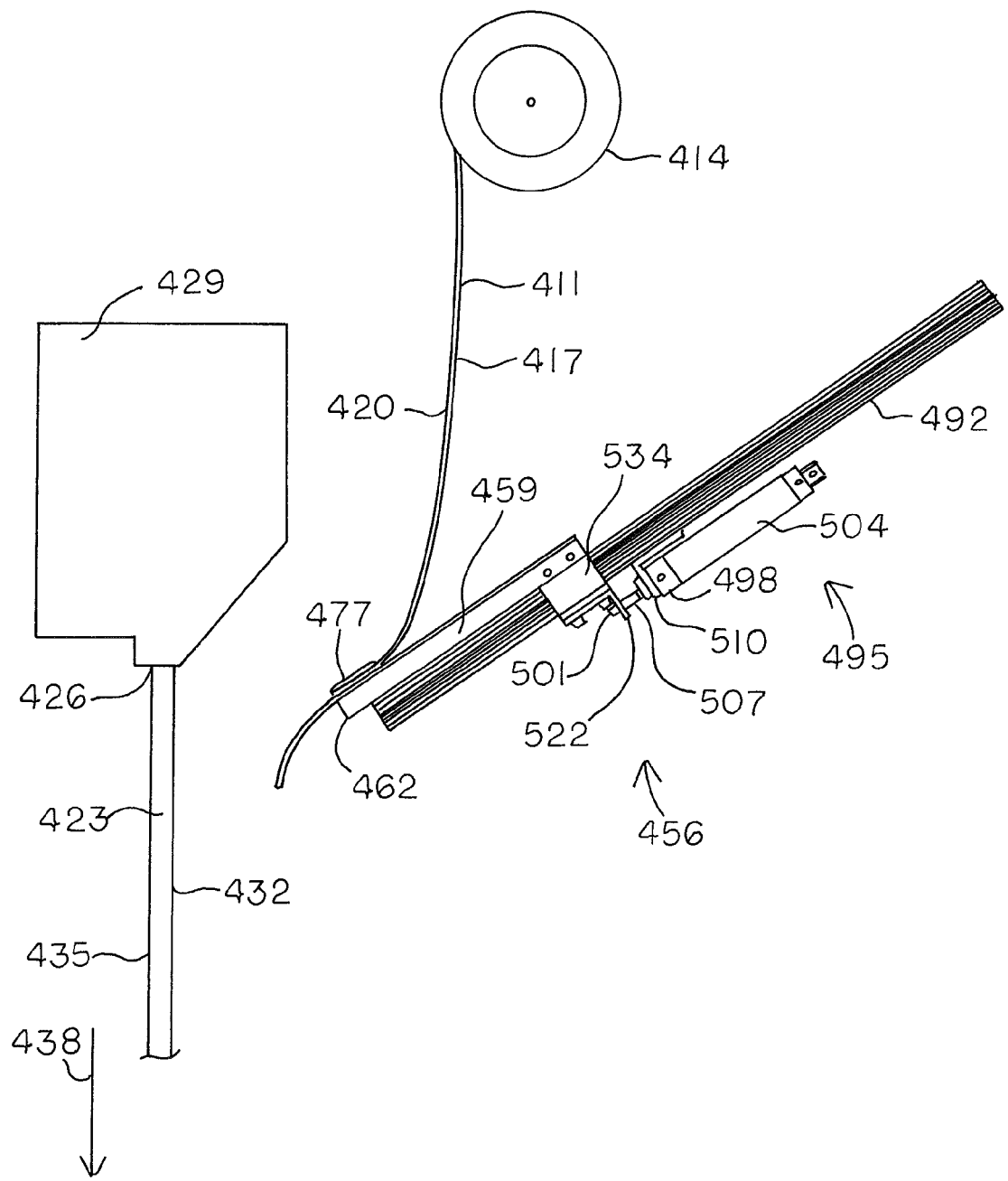
FIG. 1 is a representative side elevational view of a portion of a sheet molding apparatus according to the present invention that includes a sheet die and a sheet guide apparatus.

The method of the present invention involves providing a first mold portion having an interior mold surface that has a contour. The first mold portion may be described with reference to the sheet molding apparatus 1 of FIG. 11, which includes a first mold portion 11 having an interior mold surface 14 and a perimeter edge 17. Interior mold surface 14 has a contour and a plurality of perforations 26. The contour of interior mold surface 14 may include, for example, raised portions 20 and/or recessed portions 23. Interior mold surface 14 may be a substantially recessed or female interior mold surface (not shown), in which case, it resides substantially below perimeter edge 17. Alternatively, interior mold surface 14 may be a substantially raised or male interior mold surface (as depicted), in which case, a majority of interior mold surface 14 resides above perimeter edge 17. In addition, interior mold surface 14 may include relatively shallow (e.g., relative to raised portions 20 and recessed portions 23) raised and/or recessed patterns (not shown), such as grooves, for purposes of providing the surface of the molded article with texture and/or molded-in indicia.

The first mold portion may be fabricated from suitable rigid materials. For example, the first mold portion may be fabricated from metal and/or ceramic materials. Typically, the first mold portion is fabricated from one or more metals, such as steel. While the first mold portion may be fabricated from a combination of metal and non-metal materials, the interior mold surface is typically fabricated from a metal. The interior mold surface (e.g., 14) of the first mold portion (e.g., 11) may be selected or fabricated from polished metal (e.g., polished steel) surfaces, stainless steel surfaces, plated nickel surfaces, nickel/polytetrafluoroethylene surfaces and combinations thereof.

The method of the present invention further includes providing a first plastic sheet having a first surface and a second surface. The second surface of the first plastic sheet is defined by a thermoplastic layer having a melting temperature. The first plastic sheet is provided at a temperature that is less than the melting temperature of the thermoplastic layer that defines the second surface thereof. More typically, the first plastic sheet is provided at a temperature that is less than or equal to (preferably less than) the glass transition temperature (Tg) of the thermoplastic layer that defines the second surface thereof. The temperature at which the first plastic sheet is provided, is typically ambient room temperature (e.g., from 18° C. to 35° C.).

The first plastic sheet may be provided in the form of a single sheet, or a plurality of separate sheets (e.g., in the form of separate labels). Typically, the first plastic sheet is provided in the form of a substantially continuous sheet (e.g., a roll of first plastic sheet). With reference to FIG. 1, first plastic sheet 411 is a substantially continuous first plastic sheet provided on a roll 414. First plastic sheet 411 has a first surface 417 and a second surface 420, which define opposite surfaces or sides of sheet 411.

As depicted in the drawings, first plastic sheet 411 is a single layer plastic sheet, in which case, the thermoplastic material or layer from which it is fabricated defines both first surface 417 and second surface 420. The first plastic sheet may be a multilayer sheet including the thermoplastic layer defining the second surface thereof, and at least one further layer. Each further layer of the multilayered first plastic sheet may be fabricated from a material selected independently, in each case, from thermoplastic materials (which may be the same or different than the thermoplastic material of the layer defining the second surface of the first plastic sheet), thermoset materials, metal foils, paper, woven fabric materials, non-woven fabric materials and combinations thereof. When the first plastic sheet is a multilayered first plastic sheet, one of the further layers is an external layer that defines the second surface of the multilayered first plastic sheet.

As used herein and in the claims, the term "sheet(s)" and terms inclusive thereof, such as "first plastic sheet", "second plastic sheet", "heated thermoplastic sheet", "heated multilayered thermoplastic sheet", and "sheet die(s)" are inclusive of the term "film(s)", and similar terms, such as "first plastic film", "second plastic film", "heated thermoplastic film", "heated multilayered thermoplastic film", and "film die(s)".

The first plastic sheet and the optional second plastic sheet (as will be discussed in further detail herein) may each independently have any desirable dimensions (i.e., thickness, width and length). The first plastic sheet may have a thickness that is less than, equal to or greater than the thickness of the heated thermoplastic sheet. For example, the first plastic sheet may have a thickness of from 0.5 mm to 25 mm, or from 1.5 mm to 15 mm, or from 6 mm to 12 mm. In an embodiment, the first plastic sheet is more particularly a first plastic film having a thickness that is less than that of the heated thermoplastic sheet, for example, from 0.05 mm to 0.76 mm, or 0.08 mm to 0.64 mm, or from 0.13 mm to 0.51 mm.

Typically, the width and length of the first plastic sheet are each independently equal to or less than (and accordingly not greater than) the length and width of the heated thermoplastic sheet/heated multilayered thermoplastic sheet. For example, the first plastic sheet may have: a width of from 2.5 cm to 5 m, or from 31 cm to 3 m, or from 61 cm to 2 m; and a length of from 31 cm to 10 m, or from 61 cm to 8 m. In an embodiment, the first plastic sheet has a thickness and width that are each less than, and a length that is substantially equivalent to that of the heated thermoplastic sheet/heated multilayered thermoplastic sheet. For example, the first plastic sheet may have a thickness of 0.4 mm (about 16 mils), a width of 75 mm (about 3 inches) and a length of 5 m (about 16.5 feet).

A heated thermoplastic sheet having a first surface and a second surface is formed from at least one thermoplastic composition in the method of the present invention. The heated thermoplastic sheet has a temperature that allows it to be thermoformable (e.g., a thermoformable temperature). While the temperature of the heated thermoplastic sheet may be equal to or greater than the melting point of the thermoplastic sheet, the temperature of the heated thermoplastic sheet is more typically equal to or greater than the softening point (or glass transition temperature) of the thermoplastic sheet, and less than the melting point of the thermoplastic sheet. In addition, the temperature of the heated thermoplastic sheet is sufficient to allow for melt-bonding together: the heated thermoplastic sheet; and the thermoplastic layer that defines the second surface of the first plastic sheet. So as to allow for such melt-bonding, the temperature of the heated thermoplastic sheet is typically equal to or greater than the melting temperature of the thermoplastic layer that defines the second surface of the first plastic sheet.

With reference to FIG. 1, a heated thermoplastic sheet 423 is depicted as emerging from the elongated sheet slot 426 (not visible) of a sheet die 429. Heated thermoplastic sheet 423 has a first surface 432 and a second surface 435. Heated thermoplastic sheet 423 extends downstream from elongated sheet slot 426 of sheet die 429. As depicted in the drawings, heated thermoplastic sheet 423 more particularly extends substantially gravitationally downward and downstream from/relative to elongated sheet slot 426 of sheet die 429, as indicated by arrow 438. In addition or alternatively to extending gravitationally downward, heated thermoplastic sheet 423 may extend in other directions, such as laterally (or horizontally), relative to elongated sheet slot 426 of sheet die 429. Extension of heated thermoplastic sheet 423 in directions other than or in addition to downward, such as laterally/horizontally, may be achieved by retaining the end of the sheet in a clamp (not shown) which draws the heated thermoplastic sheet in a direction that is in addition or alternative to the downward direction indicated by arrow 438.

The temperature (in particular, the thermoformable and melt-bonding temperature) of the heated thermoplastic sheet is the result of the process by which the sheet is formed (e.g., melt extrusion) from the thermoplastic composition(s).

Stated alternatively and equivalently, the temperature of the heated thermoplastic sheet is due to the residual heat of formation of the heated thermoplastic sheet. In an embodiment, the method of the present invention is free of introducing additional thermal energy (i.e., heat) into the heated thermoplastic sheet after it is formed. The method of the present invention is typically free of thermal introduction methods (with regard to the heated thermoplastic sheet) including, but not limited to: contact methods (e.g., contact of the heated thermoplastic sheet with one or more heated rolls and/or surfaces); convective methods (e.g., passing the heated thermoplastic sheet through a convection oven); and radiative methods (e.g., exposing the heated thermoplastic sheet to an infrared heat source).

In an embodiment of the method of the present invention, the heated thermoplastic sheet has an interior portion that is interposed between the first and second surfaces of the heated thermoplastic sheet. The temperature of the heated thermoplastic sheet, in this embodiment, is substantially uniform (e.g., varying by less than or equal to 2° C. or 1° C.) through the first surface, the interior portion and the second surface thereof. In particular, the temperature is uniform when the first plastic sheet and the heated thermoplastic sheet are contacted and melt-bonded together (as will be discussed in further detail herein).

The temperature of the heated thermoplastic sheet may be determined by art-recognized methods, such as contacting thermocouples with the first and second surfaces of the heated thermoplastic sheet, and inserting a thermocouple into the interior portion of the heated thermoplastic sheet. Alternatively, or in addition thereto, remote temperature sensors, such as an infrared sensor, may be used to determine the temperature of the first and second surfaces of the heated thermoplastic sheet.

As depicted in the drawings, the heated thermoplastic sheet (e.g., emerging from sheet die 429 or 274) comprises a single thermoplastic layer. In an embodiment of the method of the present invention, the heated thermoplastic sheet comprises at least two thermoplastic layers. Each thermoplastic layer may be formed from a separate thermoplastic composition, or the same thermoplastic composition. For example, each thermoplastic composition may be melt compounded (e.g., extruded) so as to form separate molten thermoplastic compositions that are each separately fed into a multilayer sheet die, in accordance with art-recognized methods. The multilayer sheet die forms a heated thermoplastic sheet comprising a plurality of thermoplastic layers from the molten thermoplastic compositions fed therein.

Figure 2:
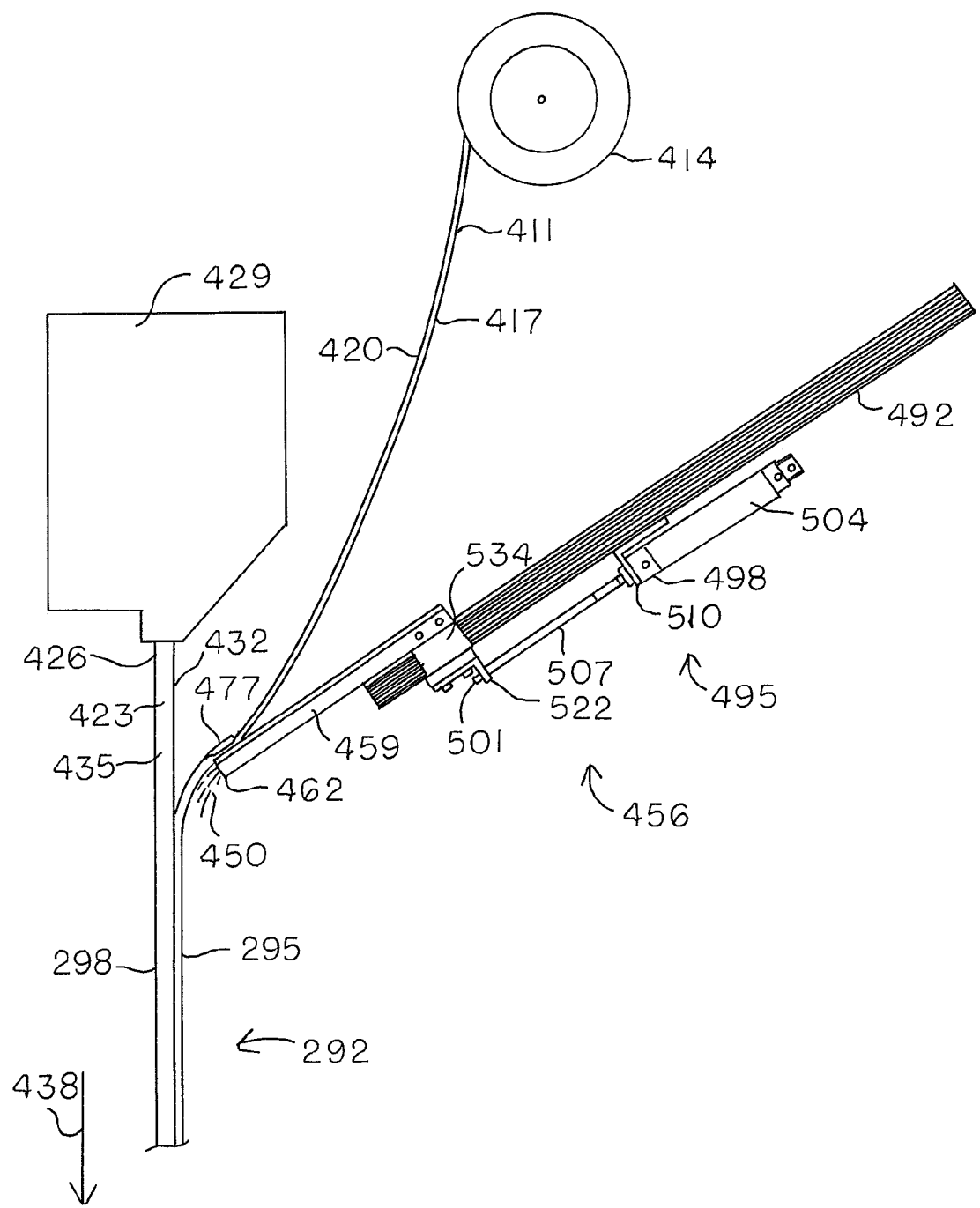
FIG. 2 is a representative side elevational view of the sheet molding apparatus of FIG. 1, in which the elongated arm of the sheet guide apparatus is extended towards the heated thermoplastic sheet emerging from the sheet die.
Figure 3:
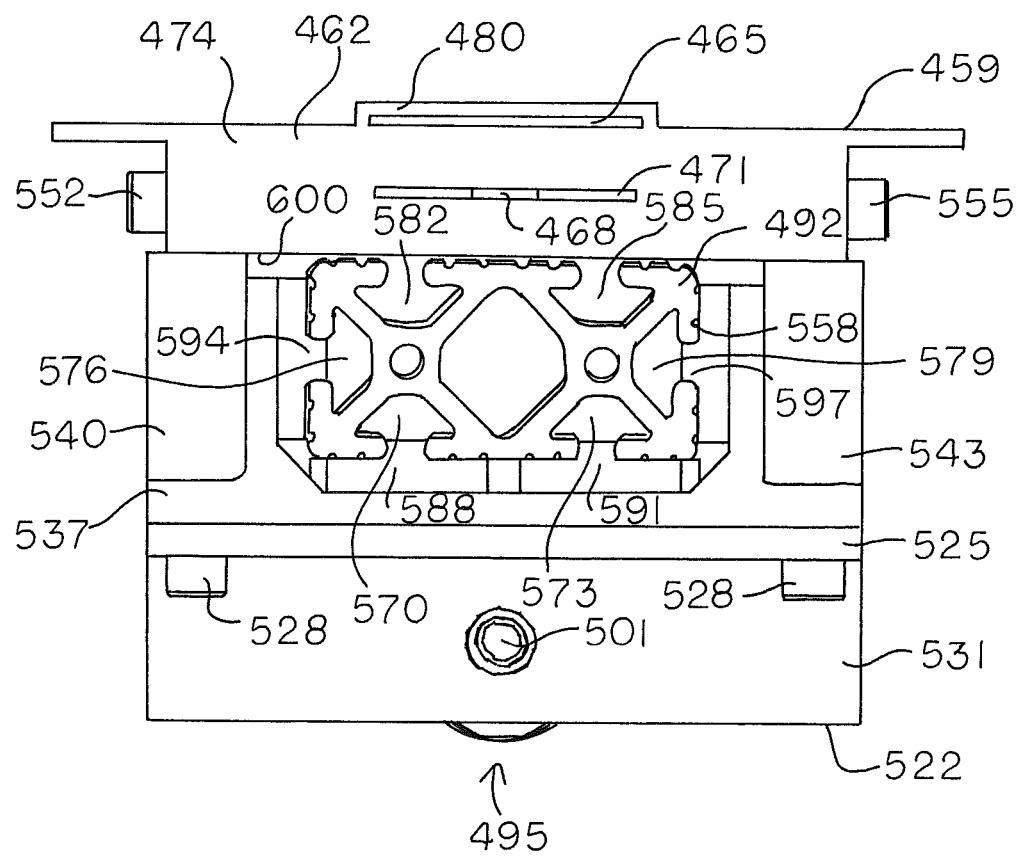
FIG. 3 is a representative front elevational view of the sheet guide apparatus of FIG. 1.
Figure 26:
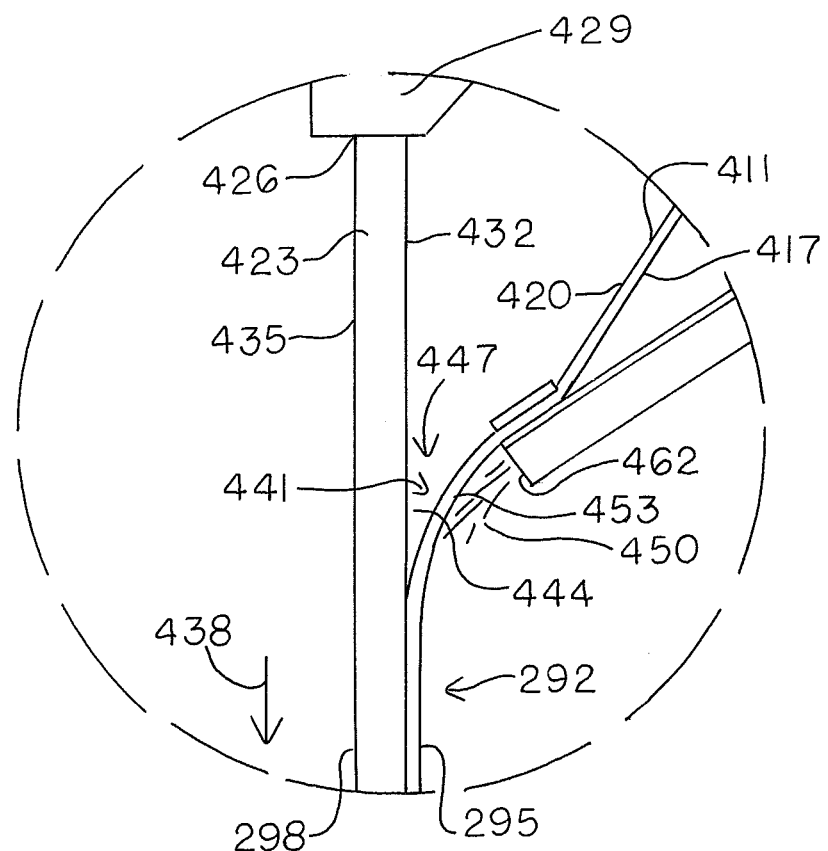
FIG. 26 is a magnified portion of FIG. 2 showing in closer detail the contact and melt-bonding area of the sheets.

A portion of the second surface of the first plastic sheet is positioned in opposition (e.g., facing opposition) with a portion of the first surface of the heated thermoplastic sheet (as the heated thermoplastic sheet is being formed), in the present method. As used herein and in the claims, positioning the respective portions of the first plastic sheet and the heated thermoplastic sheet in "opposition" means they are positioned in sufficient proximity to each other such that the subsequent or concurrent application of a stream of gas (to the first surface of the first plastic sheet) will result in the opposing portion of the second surface of the first plastic sheet being driven into contact with the opposing portion of the first surface of the heated thermoplastic sheet. With reference to FIGS. 2 and 26, portion 441 of second surface 420 of first plastic sheet 411 is positioned in opposition to a portion 444 of first surface 432 of heated thermoplastic sheet 423. The sheets may be positioned in opposition to each other by manual, or more typically mechanical means, as will be discussed in further detail herein. Since the method of the present invention typically involves the continuous formation of heated thermoplastic sheet 423, portion 441 of second surface 420 of first plastic sheet 411 and portion 444 of first surface 432 of heated thermoplastic sheet 423 are continually positioned in opposition to each other, and as such may be described as together forming a zone or region 447 of opposing surface portions 441 and 444.

A stream of gas is applied against a portion of the first surface of the first plastic sheet, so as to continuously bring the opposingly positioned portions of the first plastic sheet and heated thermoplastic sheet (as described above) into contact, thereby continuously melt-bonding the first plastic sheet and heated thermoplastic sheet together, and thus resulting in the continuous formation of a heated multilayered sheet. With further reference to FIGS. 2 and 26, a stream of gas 450 is applied against portion 453 of first surface 417 of first plastic sheet 411. More particularly, portion 453 of first surface 417 of first plastic sheet 411, against which stream of gas 450 is applied, is generally opposite relative to the portion 441 of second surface 420 of first plastic sheet 411 that is positioned in opposition to portion 444 of first surface 432 of heated thermoplastic sheet 423. It should be noted that as described herein and with reference to the drawings (e.g., FIGS. 1, 2 and 26) the various portions of the first plastic sheet and heated thermoplastic sheet are more so general, rather than specific, areas or regions of the sheets, and their respective positions and locations relate to the contact and melt-bonding of the sheets, and the resultant formation of the heated multilayered thermoplastic sheet. As the stream of gas 450 impinges upon portion 453 of first surface 417 of first plastic sheet 411, the portion 441 of first plastic sheet, substantially opposite thereof, is driven continuously into contact with portion 444 of first surface 432 of heated thermoplastic sheet 423, as heated thermoplastic sheet 423 is continuously formed (e.g., moving continuously downstream in direction 438 from elongated sheet slot 426 of sheet die 429).

As the sheets (411 and 423) are driven into contact by the impinging stream of gas 450, the thermoplastic layer defining second surface 420 of first plastic sheet 411 is melt-bonded continuously together with the first surface 432 of heated thermoplastic sheet 423. The residual heat of its formation (e.g., via melt mixing, such as melt extrusion) results in the heated thermoplastic sheet having a temperature that is equal to or greater than the melting temperature of the thermoplastic layer defining the second surface of the first plastic sheet, which results in melt-bonding of the sheets together when they are urged into abutting contact by the impinging stream of gas. The continuous melt-bonding together of first plastic sheet 411 and heated thermoplastic sheet 423 correspondingly results in the continuous formation of a heated multilayered thermoplastic sheet 292.

Heated multilayered thermoplastic sheet 292 has a first surface 295 that is defined at least partially by first surface 417 of first plastic sheet 411, and a second surface 298 defined by second surface 435 of heated thermoplastic sheet 423. The heated multilayered thermoplastic sheet (e.g., 292) has a temperature that allows it to be thermoformable.

The stream of gas (e.g., 450) that is brought into contact with that portion (e.g., 453) of the first surface of the first plastic sheet, so as to drive the second surface of the first plastic sheet and the first surface of the heated thermoplastic sheet into melt-bonding contact, may be selected from and comprise a wide variety of gasses. The stream of gas may comprise reactive and/or non-reactive (or inert) gasses. Reactive gasses include those gaseous species that may react with the first surface of the first plastic sheet so as to alter the surface chemistry thereof. The stream of gas may be in the form of a plasma, but more typically is not in the form of a plasma. Examples of reactive gasses include, but are not limited to, oxygen, peroxides, ozone, nitrous oxide, ethylenically unsaturated organic species (e.g., acetylene and/or ethylene) and combinations thereof. Typically, the stream of gas comprises a majority (e.g., greater than 50 percent by volume) of one or more inert gaseous species, such as nitrogen, helium, argon, carbon dioxide, carbon monoxide and combinations thereof. In a particular embodiment of the present invention, the stream of gas comprises air (e.g., is air).

The stream of gas may optionally include non-gaseous materials, such as aerosols and/or finely divided particulate materials (e.g., having average particle sizes of less than or equal to 25 or 10 microns). Typically, non-gaseous species are present in minor amounts, e.g., in amounts less than or equal to 50 percent, or less than or equal to 25 percent, or less than or equal to 10 percent by weight, based on the total weight of the gaseous and non-gaseous components of the stream of gas. Aerosols may be included in the stream of gas for purposes including, but not limited to, altering the surface chemistry of the first layer of the first plastic sheet, cooling the first plastic sheet, and lubricating or plasticizing the first surface of the first plastic sheet. Finely divided particulate materials may be included in the stream of gas for purposes including, but not limited to, increasing the roughness of and/or lubricating the first surface of the first plastic sheet. Examples of aerosol materials that may be present in the stream of gas include, but are not limited to, water, alcohols (e.g., methanol, ethanol, propanol, etc.), glycols (e.g., ethylene and/or propylene glycols), inorganic acids (e.g., phosphoric acid), organic acids (e.g., acetic acid), hydrocarbons (e.g., linear or branched $C_2$-$C_{20}$ alkanes) and combinations thereof. Examples of particulate materials that may be included in the stream of gas include, but are not limited to, aluminum oxide, silica, silicon carbide, zirconia, iron oxide, garnet, molybdenum and mixtures thereof. Typically, the stream of gas is free of non-gaseous materials or components, such as aerosols and/or finely divided particulate materials.

The stream of gas may have a wide range of temperatures, when it is applied against the first surface of the first plastic sheet. For example, the stream of gas may have a temperature that is equal to or greater than, or less than the melting temperature of the thermoplastic layer that defines the second surface of the first plastic sheet. In a particular embodiment, the stream of gas has a temperature that is less than the melting temperature of the thermoplastic layer that defines the second surface of the first plastic sheet. Typically, the stream of gas has a temperature that is substantially equal to ambient room temperature (e.g., from 18° C. to 35° C.).

The stream of gas may be applied at any suitable velocity and pressure, against the first surface of the first plastic sheet, provided: (i) the second surface of the first plastic sheet is driven into melt-bonding contact with the first surface of the heated thermoplastic sheet; and (ii) the first plastic sheet and the heated thermoplastic sheet are not damaged (e.g., torn and/or perforated). Typically, the stream of gas is applied against the first surface of the first plastic sheet at: a pressure of from 40 pound-force per square inch (psi) to 160 psi (276 kilopascal "kPa" to 1103 kPa), more typically from 50 psi to 120 psi (345 kPa to 827 kPa), and further typically from 60 psi to 100 psi (414 kPa to 690 kPa); and a velocity of from 0.5 standard foot per minute (SFPM) to 10 SFPM (0.15 standard meter per minute "SMPM" to 3.1 SMPM), more typically from 1 SFPM to 8 SFPM (0.3 SMPM to 2.4 SMPM), and further typically from 2 SFPM to 6 SFPM (0.6 SMPM to 1.8 SMPM). In an embodiment of the present invention, the stream of gas is air, and is applied against the first surface of the first plastic sheet, at: a temperature that is substantially equal to ambient room temperature (e.g., from 18° C. to 35° C.); a pressure of 80 psi (552 kPa); and a velocity of 3.5 SFPM (1.1 SMPM).

When applied against the first surface of the first plastic sheet in the method of the present invention, the stream of gas may have any suitable shape. As used herein and in the claims, the shape (e.g., the cross sectional shape) of the stream of gas means the shape the stream of gas has when it impacts or impinges upon the first surface of the first plastic sheet. The stream of gas may have a shape selected from, for example, amorphous shapes, circular shapes, oval shapes, polygonal shapes (e.g., triangular, rectangular, square, pentagonal and hexagonal shapes, etc.), irregular shapes and combinations thereof. The stream of gas may be applied uniformly (e.g., across the entire width of) or non-uniformly against (e.g., across only a portion or portions of the width of) the first surface of the first plastic sheet. Typically, the stream of gas is applied uniformly against the first surface of the first plastic sheet, and more typically across the entire width of the first surface of the first plastic sheet. The shape of the stream of gas is generally controlled by the shape of the aperture (e.g., gas outlet aperture 471) from which it is expelled. The stream of gas may be applied from a single or a plurality of separate gas outlet apertures. Typically, the stream of gas is applied against the first surface of the first sheet from a single gas outlet aperture. In an embodiment of the present invention, the stream of gas is applied substantially uniformly across substantially the entire width of the portion (e.g., 453) of the first surface (e.g., 417) of the first plastic sheet (e.g., 411) in a shape that is substantially that of a narrow rectangle/slot (i.e., in which the width is much greater than the height of the rectangle/slot), and is formed by and expelled from a gas outlet aperture having a substantially narrow rectangular or slotted shape (i.e., in which the width is much greater than the height of the rectangle/slot), as will be discussed in further detail herein.

After its formation, and while still retaining residual heat of formation sufficient so as to also possess a temperature allowing it to be thermoformable, the second surface of the heated multilayered thermoplastic sheet is brought into contour matching contact with the interior mold surface of the first mold portion. The second surface of the heated multilayered thermoplastic sheet may be brought into contour matching contact with the interior mold surface of the first mold portion by merely laying the heated thermoplastic sheet across the first mold portion. More typically, contour matching contact between the second surface of the heated multilayered thermoplastic sheet and the interior surface of the first mold portion is achieved by drawing the heated multilayered thermoplastic sheet into intimate contact with the interior mold surface (e.g., by means of reduced pressure and/or physically pulling the heated multilayered sheet into and/or onto the interior mold surface).

In an embodiment of the present invention, contour matching contact may be achieved by drawing reduced pressure between the second surface of the heated multilayered thermoplastic sheet and the interior mold surface of the first mold portion. In this particular embodiment, the interior mold surface of the first mold portion comprises a plurality of perforations, and a portion of the second surface of the heated multilayered thermoplastic sheet is contacted with at least a portion (and typically less than the whole of) the interior mold surface of the first mold portion. Reduced pressure is then drawn through the plurality of perforations of the interior mold surface of the first mold portion, thereby bringing the second surface of the heated multilayered thermoplastic sheet into contour matching contact with the interior mold surface of the first mold portion.

Figure 11:
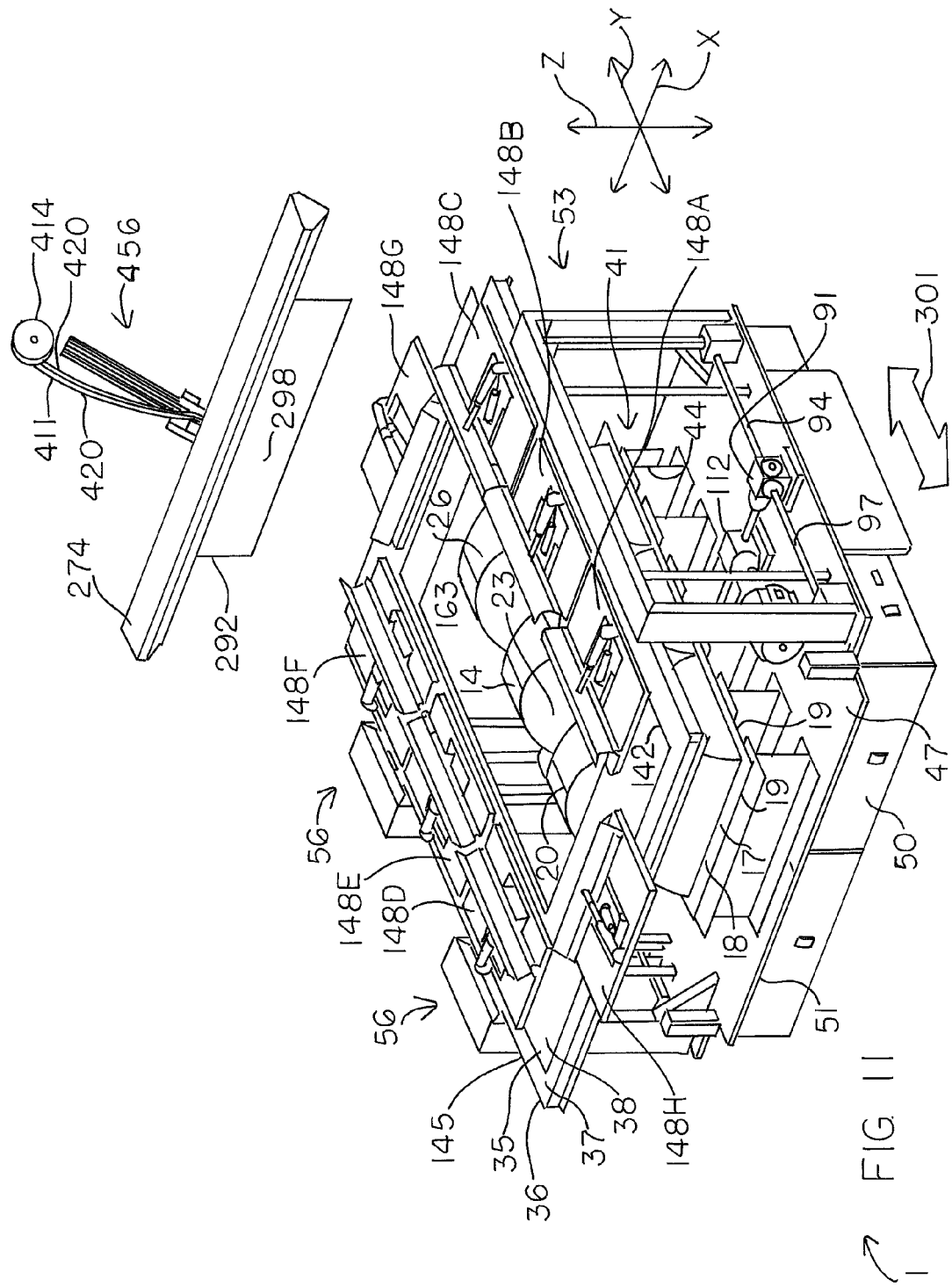
FIG. 11 is a representative perspective view of a sheet molding apparatus according to the present invention, that includes a sheet die, the sheet guide apparatus of FIG. 1, a first mold portion, a vertically positionable frame surrounding the first mold portion, and a plurality of sheet retainers on the frame.
Figure 12:
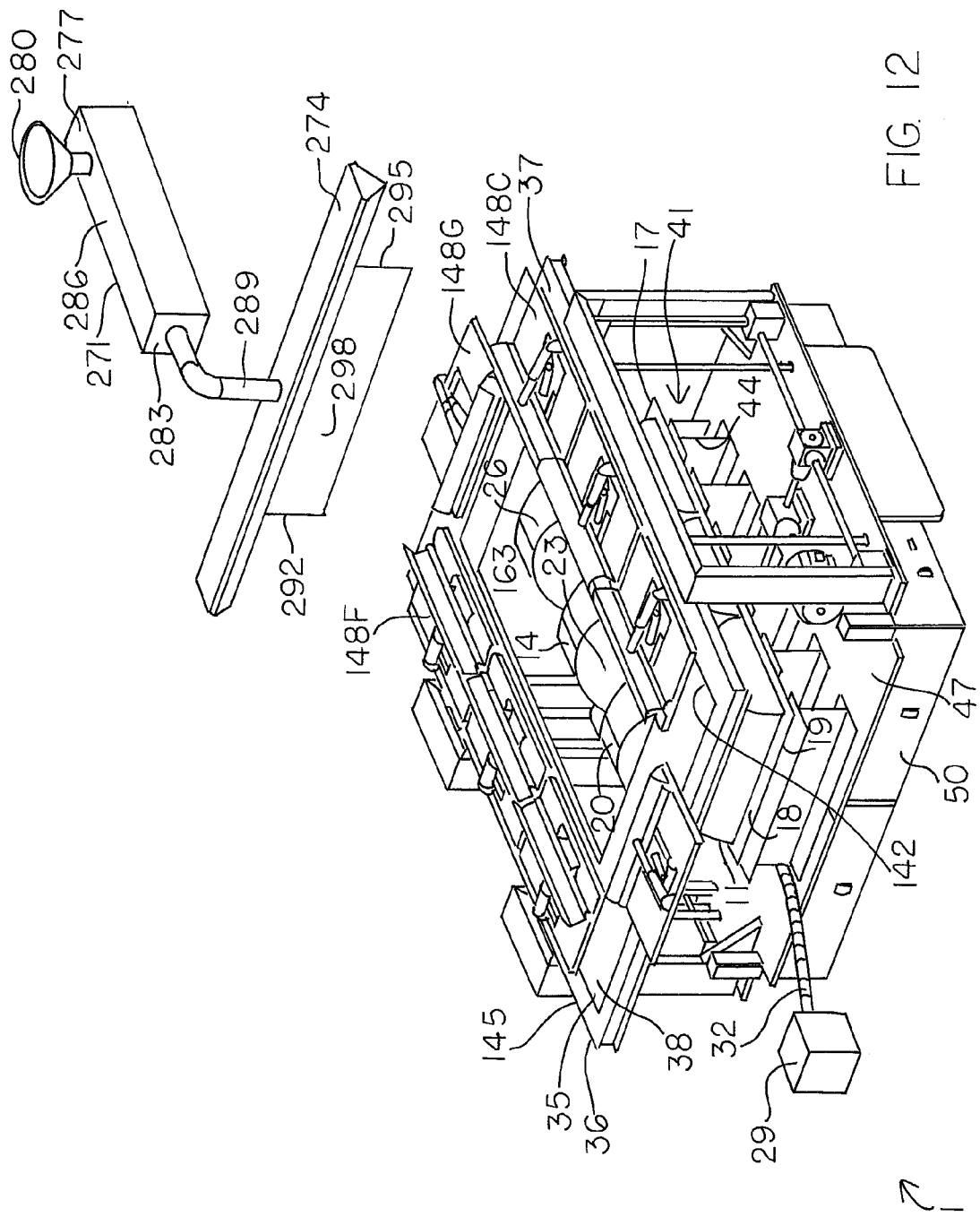
FIG. 12 is a representative perspective view of the sheet molding apparatus of FIG. 11, further including an extruder and a separate vacuum pump for the first mold portion, and in which the sheet guide apparatus is not shown for purposes of clarity.

With reference to FIG. 11, interior mold surface of first mold portion 11 has a plurality of perforation 26 through which reduced pressure may be drawn (e.g., by means of vacuum pump 29 and conduit 32, as depicted in FIG. 12). For purposes of clarity, only a portion of interior mold surface 14 is depicted as having perforations 26. Perforations 26 may be present in uniform or non-uniform patterns across substantially the entirety of interior mold surface 14. Perforations 26 may have any suitable shape and dimension, provided they: (i) are not fouled by the thermoplastic material of the heated thermoplastic multilayered sheet; and (ii) do not result in the formation of undesirable surface features, such as plastic nubs, on the second surface of the final shaped molded multilayered article. The shape and dimensions of the perforations of the interior mold surface of the first mold portion will be discussed in further detail herein.

Figure 23:
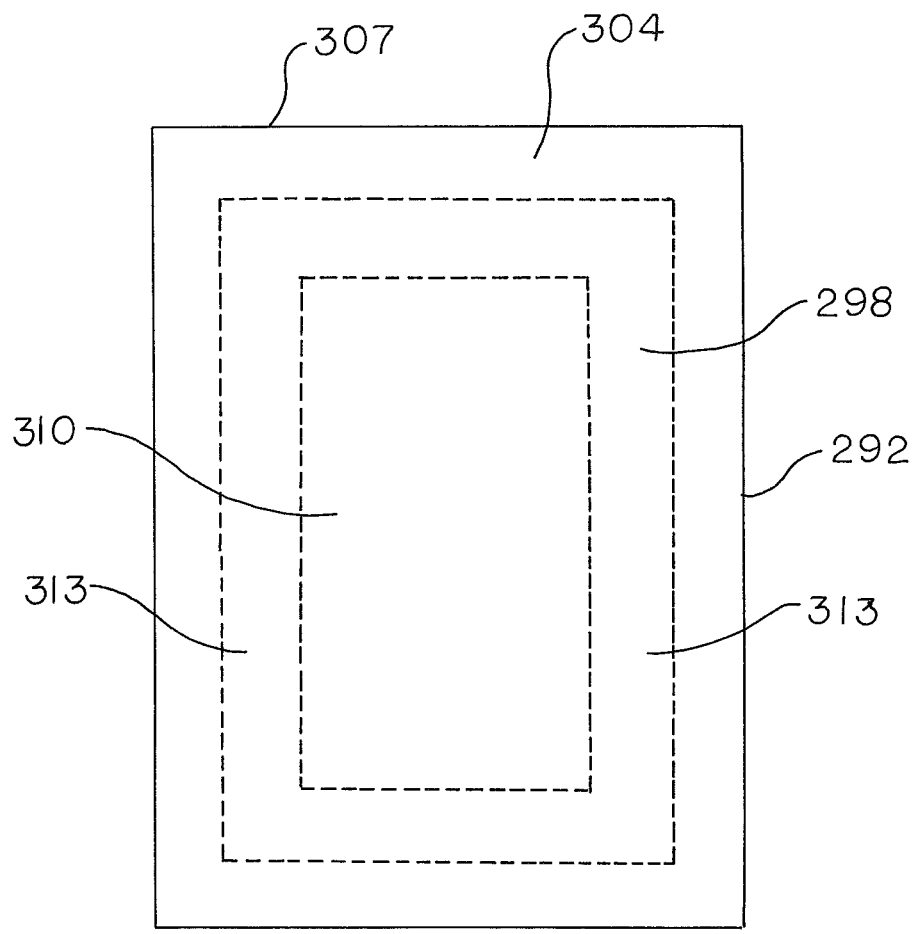
FIG. 23 is a representative plan view of the second surface of a heated multilayered thermoplastic sheet that is formed and used in the method of the present invention, and in which first, second and third portions thereof are diagrammed.

So as to better ensure that reduced pressure drawn through the plurality of perforations results in the second surface of the heated multilayered thermoplastic sheet being drawn into contour matching contact with the interior mold surface, the first mold portion is typically provided with a perimeter edge that is contacted with a further portion of the second surface of the heated multilayered thermoplastic sheet. With reference to FIGS. 11 and 23, a third portion 313 of second surface 298 of heated multilayered thermoplastic sheet 292 is contacted with perimeter edge 17 of first mold portion 11, which results in the formation of a substantially sealed space defined by interior mold surface 14 and a second portion 310 of the second surface 298 of heated multilayered thermoplastic sheet 292. Third portion 313 is outward relative to and encompasses second portion 310 of second surface 298 of heated multilayered thermoplastic sheet 292. Typically, a portion of second portion 310 of second surface 298 of heated multilayered thermoplastic sheet 292 is contacted with interior mold surface 14. When reduced pressure is drawn through perforations 26, reduced pressure is formed within the defined sealed space, and second portion 310 of second surface 298 of heated multilayered thermoplastic sheet 292 is drawn into contour matching contact with interior mold surface 14.

While in contour matching contact with the interior mold surface of the first mold portion, the heated multilayered thermoplastic sheet is cooled, thereby forming a shaped multilayered article that retains the contour of the interior mold surface. Typically, while in contour matching contact with the interior mold surface, the heated multilayered thermoplastic sheet is cooled to a temperature that is less than the melting temperature, and more typically less than the glass transition (Tg) temperature of the multilayered thermoplastic sheet. The heated multilayered thermoplastic sheet may be cooled by suitable methods. For example, the first surface of the heated multilayered thermoplastic sheet may be contacted with: (i) a mist or spray of chilled liquid, such as water; and/or (ii) a stream or curtain of ambient or chilled gas, such as air. In addition or alternatively to cooling the first surface, the second surface of the contour matched heated multilayered thermoplastic sheet may be cooled by contact with an ambient or chilled fluid, such as a gas, and in particular air. Ambient or chilled air may, for example, be passed out through the perforations (e.g., 26) in the interior mold surface (e.g., 14) of the first mold portion, and thereby contact the second surface of and cool the contour matched heated multilayered thermoplastic sheet.

After the multilayered thermoplastic sheet has been sufficiently cooled, the resulting shaped multilayered thermoplastic article/sheet is removed from the first mold portion. Removal of the shaped multilayered thermoplastic article from the first mold portion may be achieved by art-recognized methods. For example, one or more ejector cores (not shown) may extend reversibly outward from the interior mold surface, in effect pushing the shaped multilayered thermoplastic article off of and away from the first mold portion. Alternatively, or in addition thereto, a gas (e.g., air) may be passed under pressure through the plurality of perforations (e.g., 26) in the interior mold surface, thereby lifting the shaped multilayered thermoplastic article off of and away from the first mold portion.

In a particular embodiment of the method of the present invention the first plastic sheet and the heated thermoplastic sheet are brought into melt-bonding contact only by application of the stream of gas against the first surface of the first plastic sheet. In particular, melt-bonding between the first plastic sheet and the heated thermoplastic sheet is not achieved by contacting the sheets together or separately with one or more rolls. More particularly, the method of the present invention typically is free of (as it does not require): passing the first plastic sheet and the heated thermoplastic sheet together (and/or the heated multilayered thermoplastic sheet, e.g., 292) through the nip of a pair of compressive rolls (e.g., a pair of counter-rotating compressive rolls); and/or passing the first plastic sheet and the heated thermoplastic sheet together (and/or the heated multilayered thermoplastic sheet, e.g., 292) over at least a portion of a surface of an individual roll (i.e., a roll that is not paired with and does not form a nip with another roll).

Correspondingly, the sheet molding apparatus of the present invention is free of a pair of (i.e., one or more pairs of) compressive rolls (e.g., a pair of counter-rotating compressive rolls) forming a nip positioned: downstream relative to the elongated sheet slot of the sheet die; and for receipt of the first plastic sheet (e.g., 411) and the heated thermoplastic sheet (e.g., 423) together (and/or the heated multilayered thermoplastic sheet, e.g., 292) through the nip thereof. In addition, the sheet molding apparatus is free of one or more individual rolls positioned: downstream relative to the elongated sheet slot of the sheet die; and so as to contact the first plastic sheet and the heated thermoplastic sheet together (and/or the heated multilayered thermoplastic sheet, e.g., 292).

To assist in positioning a portion (e.g., 441) of the second surface (e.g., 420) of the first plastic sheet in opposition with a portion (e.g., 444) of the first surface (e.g., 432) of the heated thermoplastic sheet, the method of the present invention may further include providing a guide apparatus for the first plastic sheet. The guide apparatus includes an elongated arm having a forward portion that has a guide slot. The guide slot is dimensioned to receive a sheet, and in particular the first plastic sheet therethrough. The elongated arm, and in particular the forward portion of the elongated arm, is positioned downstream relative to the elongated sheet slot (e.g., 426) of the sheet die (e.g., 429). In addition, the elongated arm is reversibly positionable so as to position the forward portion thereof in opposition to the portion (e.g., contact/melt-bond portion 444) of the first surface of the heated thermoplastic sheet. The forward portion of the elongated arm further includes a conduit having a gas outlet aperture that resides beneath the guide slot. The gas outlet aperture is dimensioned to allow the stream of gas to pass outward therefrom (e.g., therethrough).

With the guide apparatus so provided and the elongated arm thereof so positioned (towards the first surface of the heated thermoplastic sheet), the method of the invention further includes, passing the first plastic sheet through the guide slot such that a portion (e.g., 453, FIG. 26) of the first surface (e.g., 417) of the first plastic sheet passes in front of the gas outlet aperture. In addition, the first plastic sheet is passed through the guide slot such that the portion (e.g., contact/melt-bond portion 441) of the second surface (e.g., 420) of the first plastic sheet is positioned in opposition with the portion (e.g., contact/melt-bond portion 444) of the first surface (e.g., 432) of the heated thermoplastic sheet. With the first plastic sheet passing through the guide slot and interposed between the first surface of the heated thermoplastic sheet and the gas outlet aperture, the stream of gas (e.g., 450) is passed out through the gas outlet aperture and against the portion (e.g., 453) of the first surface (e.g., 417) of the first plastic sheet. With the gas stream so impinging upon the first surface of the first plastic sheet, the portion (e.g., contact/melt-bond portion 441) of the second surface (e.g., 420) of the first plastic sheet is driven (or urged) into contact with the portion (e.g., contact/melt-bond portion 444) of the first surface (e.g., 432) of the heated thermoplastic sheet. With the first plastic sheet driven (e.g., urged or pushed) by the stream of gas into contact with the heated thermoplastic sheet, the thermoplastic layer defining the second surface of the first plastic sheet and the heated thermoplastic sheet are melt-bonded continuously together, thereby forming continuously the heated multilayered thermoplastic sheet (e.g., 292).

With reference to FIGS. 1 through 5, sheet guide apparatus 456 includes an elongated arm 459 having a forward portion 462. Forward portion 462 includes a guide slot 465, which is dimensioned to receive the first plastic sheet 411 therethrough. More particularly, forward portion 462 has a front face 474, and guide slot 465 resides substantially within front face 474. As depicted in FIGS. 1, 2 and 26, elongated arm 459 of guide apparatus 456 is reversibly positionable so as to position forward portion 462 and front face 474 thereof in opposition to portion 444 of first surface 432 of heated thermoplastic sheet 423.

Guide slot 465 may have any suitable shape, provided it is sufficiently dimensioned to guide the first plastic sheet therethrough so as to pass it interposedly between contact/melt-bond portion 444 of first surface 432 of heated thermoplastic sheet 423 and gas outlet aperture 471. Typically, the guide slot is in the form of a laterally oriented narrow rectangular slot having a lateral dimension (or width) that is greater than the vertical dimension (or height) thereof. For example, the guide slot having a substantially rectangular shape may have a ratio of width to height of from 5 to 100, 10 to 50 or 20 to 40. In an embodiment, the guide slot has a ratio of width to height of 34. The guide slot (e.g., 465) typically has a height of from 0.75 mm to 30 mm, or from 2 mm to 20 mm, and a width from 3 cm to 5 m, or from 35 cm to 3 m. In an embodiment, the guide slot has a height of 3 mm (⅛ inch) and a width of 54 mm (2 and ⅛ inches).

Figure 4:
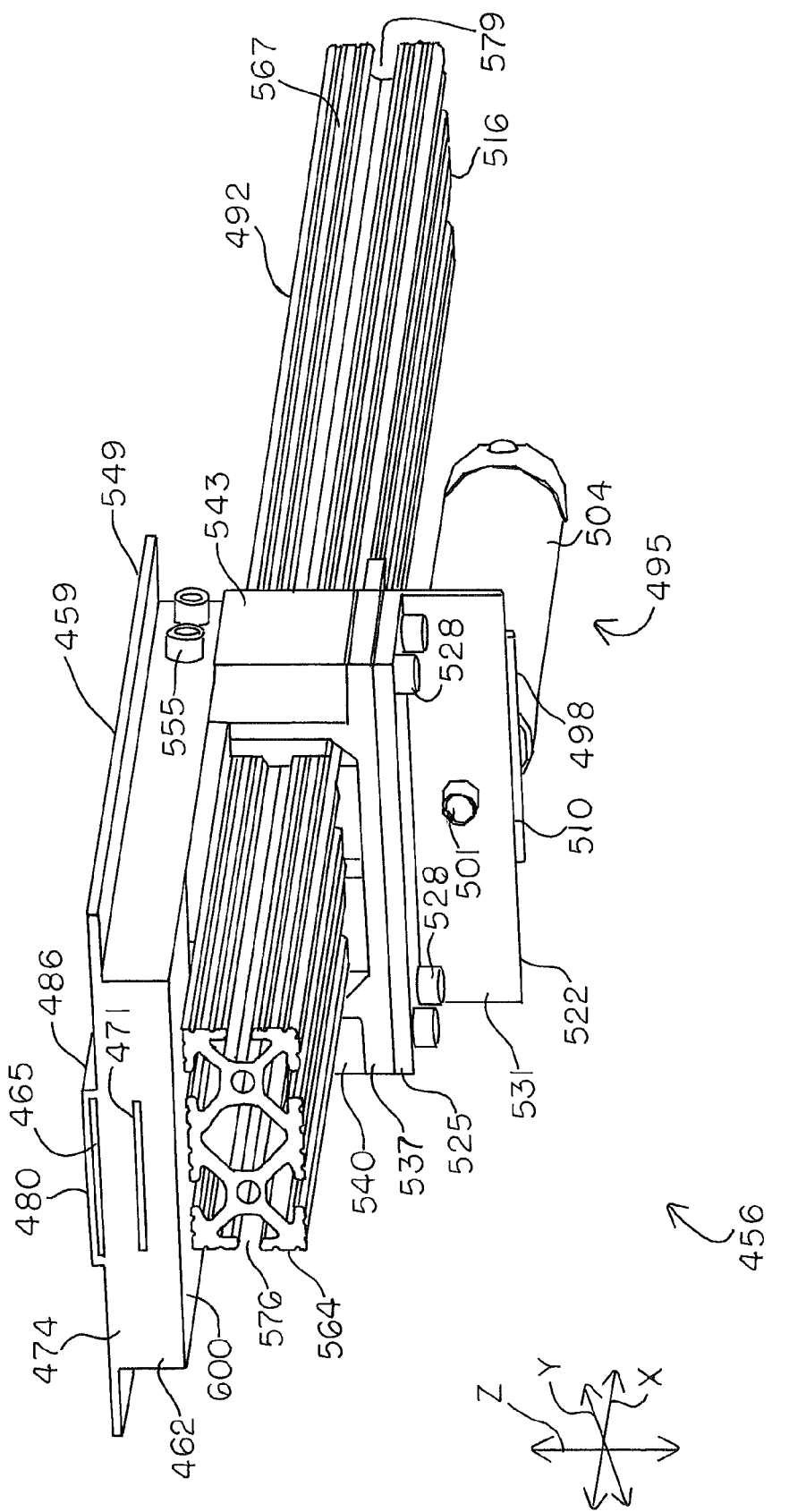
FIG. 4 is a representative front perspective view of the sheet guide apparatus of FIG. 1.

Forward portion 462 of elongated arm 459 of guide apparatus 456 also includes a conduit 468 that is in fluid communication with a gas outlet aperture 471. See FIGS. 3 and 5. Gas outlet aperture 471 is positioned and resides vertically beneath guide slot 465 (e.g., along the z-axis as represented in FIG. 4). With further reference to FIG. 4, gas outlet aperture 471 may also be positioned, along the y-axis (equivalently, the longitudinal axis of elongated arm 459), forward of, in line with, or rearward of guide slot 465. Typically, and as depicted in the drawings, gas outlet aperture 471 is positioned both vertically below (along the z-axis), and substantially in line with (along the y-axis), guide slot 465.

As discussed previously herein, the shape of the stream of gas that is applied against the first surface of the first plastic sheet is generally controlled by the shape of the gas outlet aperture. As such, the gas outlet aperture may have shapes selected from, for example, circular, oval, polygonal (e.g., triangular, rectangular, pentagonal, etc.), irregular and combinations thereof. Since the stream of gas is typically applied substantially uniformly across substantially the entire width of stream of gas impingement portion 453 of first surface 417 of first plastic sheet 411, gas outlet aperture 471 typically has a laterally oriented narrow rectangular shape, in which the width is much greater than the height thereof, as depicted in the drawings (e.g., FIGS. 3 and 4). The vertical dimension (height) of gas outlet aperture 471 may range, for example from, 0.05 cm to 3 cm. In an embodiment, gas outlet aperture 471 has a vertical dimension of 0.1 cm. The width (or lateral dimension) of gas outlet aperture 471 may be selected so as to be at least equivalent to the width of the first plastic sheet. Since the stream of gas typically expands in both width and height after emerging from the gas outlet aperture, the gas outlet aperture may have a width that is less than the width of the first plastic sheet. The width of the gas outlet aperture may range, for example, from 2.5 cm to 5 m, from 31 cm to 3 m, or from 61 cm to 2 m. In an embodiment, the gas outlet aperture has a width of 7.5 cm.

In an embodiment, the forward portion of the elongated arm of the guide apparatus further includes a bracket (or sheet guide bracket). The bracket includes a forward bracket portion that defines the guide slot, and two opposing sidewalls that together define a guide channel. The opposing sidewalls and accordingly the guide channel extends rearward from the forward bracket portion. The guide channel is dimensioned to receive and allow a sheet, and in particular the first plastic sheet to pass therethrough.

Figure 5:
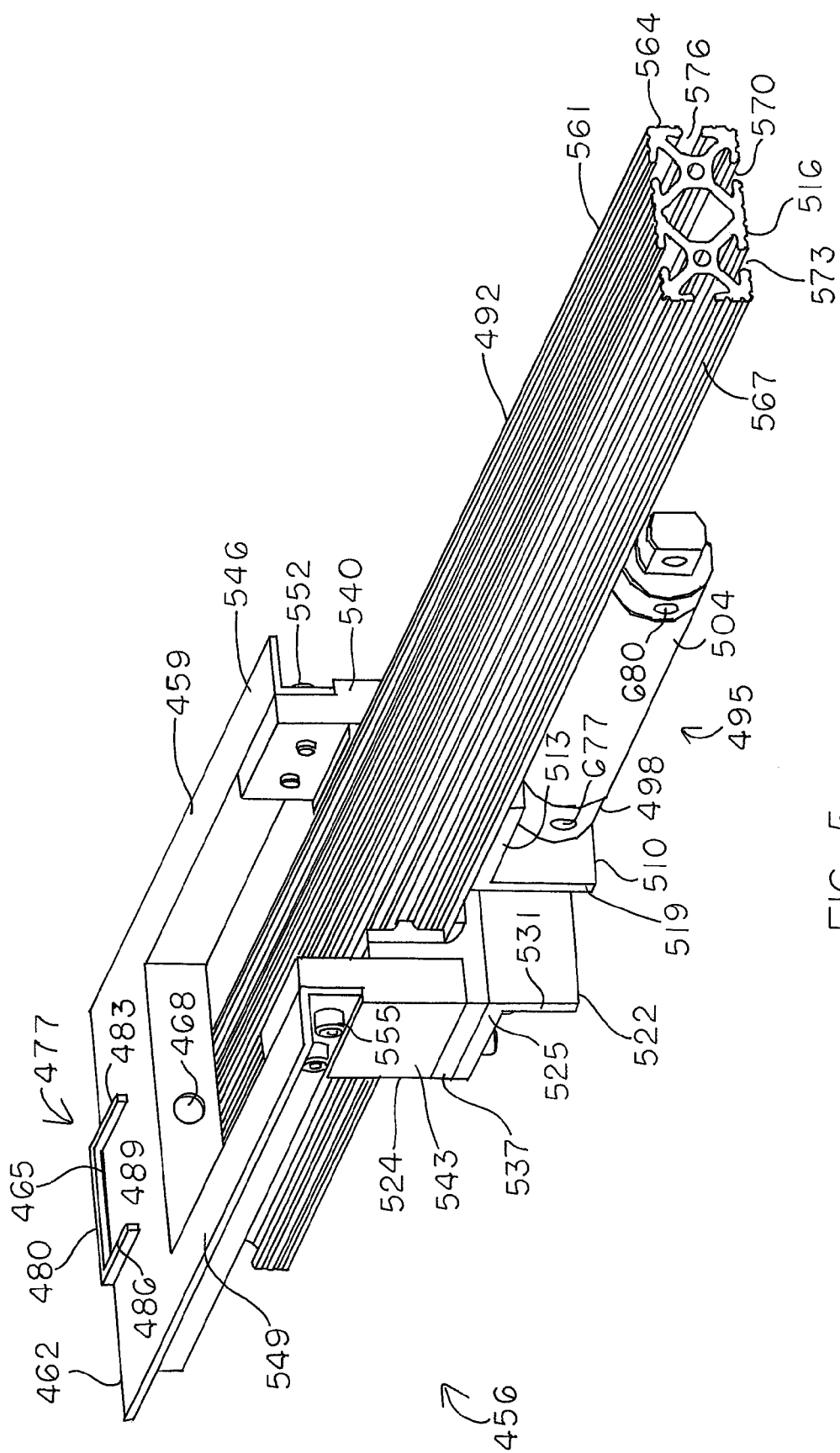
FIG. 5 is a representative rear and upper perspective view of the sheet guide apparatus of FIG. 1.

With reference to FIG. 5, forward portion 462 of elongated arm 459 of guide apparatus 456 includes a bracket 477. Bracket 477 includes a forward bracket portion 480, a first sidewall 483 and a second sidewall 486 that each extend rearward from forward bracket portion 480. Forward bracket portion 480 defines guide slot 465. First sidewall 483 and second sidewall 486 are in opposition to each other and together form opposing sidewalls 483, 486. First sidewall 483 and second sidewall 486, as opposing sidewalls, together define guide channel 489. Guide channel 489 extends rearward from forward bracket portion 480. Guide channel 489 may have any suitable shape, provided it is dimensioned to receive and allow a sheet, and in particular the first plastic sheet to pass therethrough. Typically, guide channel 489 has a substantially rectangular or square shape.

The guide apparatus may, in an embodiment, further include a guide rail to which the elongated arm is slidingly attached. The guide rail is substantially stationary relative to the elongated arm, and in particular relative to the sliding movement of the elongated arm. In addition to the guide rail, the guide apparatus also includes a linear actuator having a first portion and a second portion. The linear actuator is reversibly linearly expandable, such that the first portion and second portion thereof are reversibly linearly positionable. The first portion of the linear actuator is attached to the guide rail, and the second portion of the linear actuator is attached to the elongated arm, such that reversible linear expansion of the linear actuator provides reversible linear movement of the elongated arm along the guide rail. With the guide apparatus including the combination of the elongated arm, guide rail and linear actuator, the method further includes, actuating the linear actuator so as to move the elongated arm towards the first surface of a separate structure, and in particular towards the first surface of the heated thermoplastic sheet. As the elongated arm is so moved forward, the forward portion (and accordingly the front face) of the elongated arm is correspondingly positioned in opposition to the first surface of the heated thermoplastic sheet. Depending on how the linear actuator is positioned and oriented relative to the elongated arm, expansive actuation (expansion) of the linear actuator may result in the elongated arm moving towards or away from the heated thermoplastic sheet, as will be discussed in further detail herein.

With reference to FIGS. 1 through 5, guide apparatus 456 includes a guide rail 492, and a linear actuator 495 having a first portion 498 and a second portion 501. As used herein and in the claims, the term "linear actuator" means a device that is reversibly linearly expandable. Linear actuators, as used with regard to the guide apparatus (and the sheet retainers as will be discussed further herein) may be selected from art-recognized devices, such as linear screw actuators, hydraulic linear actuators, pneumatic linear actuators and combinations thereof. Linear actuator 495 of guide apparatus 456 is a pneumatic linear actuator, and includes a cylinder 504 containing a piston (not visible) and a reversibly retractable/extendable arm 507.

The first portion of the linear actuator may be attached directly to the guide rail. Typically the first portion of the linear actuator is attached to the guide rail by means of one or more brackets, which may have any suitable configuration (e.g., L-shaped or T-shaped brackets). As depicted in the drawings, first portion 498 of linear actuator 495 is attached to guide rail 492 by means of a first bracket 510. Bracket 510 is a substantially L-shaped bracket having an upper bracket portion 513 (which is substantially horizontal) that is attached (e.g., bolted) to an underside 516 of guide rail 492. Bracket 510 has a vertical bracket portion 519 that extends downwardly from upper bracket portion 513. First portion 498 of linear actuator 495 is attached fixedly to vertical bracket portion 519. See FIG. 5.

The second portion of the linear actuator may be attached directly to the elongated arm of the guide apparatus. Typically, the second portion of the linear actuator is attached to the elongated arm of the guide apparatus by means of one or more brackets, which may have any suitable configuration (e.g., L-shaped or T-shaped brackets). As depicted in the drawings, second portion 501 of linear actuator 495 is attached to elongated arm 459 by means of a second bracket 522. Bracket 522 is a substantially L-shaped bracket having an upper bracket portion 525 (which is substantially horizontal) that is attached (e.g., by means of bolts 528) to elongated arm 459. Bracket 522 has a vertical bracket portion 531 that extends downwardly from upper bracket portion 525. Second portion 501 of linear actuator 495 is attached fixedly to vertical bracket portion 531. See FIGS. 3 and 4.

The elongated arm of the guide apparatus is slidingly attached to the guide rail. To achieve such sliding attachment, the elongated arm typically further includes one or more brackets that slidingly engage with the guide rail. In an embodiment and as depicted in the drawings, elongated arm 459 of guide apparatus 456 includes a third bracket (or elongated arm bracket) 534 that includes a base 537 and a pair of opposed flanges 540 and 543 extending upwardly from base 537. Elongated arm 459 includes opposing extensions 546 and 549 extending rearward from forward portion 462. The opposing rearward extensions are each attached to an upwardly extending flange of the elongated arm bracket. First rearward extension 546 is attached to upwardly extending first flange 540 (e.g., by bolts 552), and second rearward extension 549 is attached to upwardly extending second flange 543 (e.g., by bolts 555). The base 537 and opposing upwardly extending first and second flanges 540 and 543 of elongated arm bracket 534 together define a space 558 into and through-which guide rail 492 is slidingly received.

The exterior surfaces (e.g., upper, side and/or lower surfaces) of the guide rail may include one or more longitudinal extensions that are dimensioned to be received within one or more longitudinal grooves of the elongated arm, or elongated arm bracket, so as to allow sliding movement of the elongated arm along the guide rail. Alternatively or in addition thereto, sliding movement of the elongated arm along the guide rail may be achieved by at least some of the exterior surfaces (e.g., upper, side and/or lower surfaces) of the guide rail including one or more longitudinal grooves that are dimensioned to receive one or more extensions from the elongated arm, or the elongated arm bracket.

In an embodiment, at least some of the exterior surfaces (e.g., upper, side and/or lower surfaces) of the guide rail include one or more longitudinal grooves that are dimensioned to receive one or more extensions from the elongated arm, or the elongated arm bracket, so as to allow sliding movement of the elongated arm along the guide rail. In a particular embodiment, guide rail 492 has a substantially rectangular cross-sectional shape and has an upper external surface 561, a first side external surface 564, a second side external surface 567 and a lower external surface 516. Lower surface 516 has a first longitudinal groove 570 and a second longitudinal groove 573; first side surface 564 has a longitudinal groove 576; and second side surface 567 has a longitudinal groove 579. Upper surface 561 includes first and second longitudinal grooves 582 and 585.

The base and opposing flanges of the elongated arm bracket each have at least one extension that extends into the space (e.g., 558) defined by the interior surfaces of the base and opposing flanges. The inwardly extending extensions of the elongated arm bracket are each received slidingly within an appropriately dimensioned and positioned longitudinal groove of the guide rail, thereby providing sliding attachment of the elongated arm to the guide rail. Base 537 of elongated arm bracket 534 has a first inwardly extending extension 588 that is received within first longitudinal groove 570, and base 537 has a second inwardly extending extension 591 that is received within second longitudinal groove 573 of lower surface 516 of guide rail 492. First flange 540 of elongated arm bracket 534 has an inwardly extending extension 594 that is received within longitudinal groove 576 of first side 564 of guide rail 492. Second flange 543 of elongated arm bracket 534 has an inwardly extending extension 597 that is received within elongated groove 579 of second side 567 of guide rail 492. The lower surface 600 of the forward portion 462 of elongated arm 459 may also include first and second extensions (not shown) that are received within the first and second longitudinal grooves 582 and 585 of upper surface 561 of guide rail 492. The receipt of the various inwardly extending extensions of the elongated arm bracket within the appropriately dimensioned and positioned longitudinal grooves of the exterior surface of the guide rail thereby provides sliding attachment of the elongated arm to the guide rail.

As described previously herein, second portion 501 of linear actuator 495 is attached to elongated arm 459 by means of second bracket 522. In particular, second portion 501 of linear actuator 495 is attached to vertical bracket portion 531, and upper bracket portion 525 of second bracket 522 is attached to elongated arm bracket 534. More particularly, upper bracket portion 525 of second bracket 522 is attached to base 537 of elongated arm bracket 534 (e.g., by means of bolts 528).

As discussed previously herein, expansive actuation (expansion) of the linear actuator may result in the elongated arm moving towards or away from the heated thermoplastic sheet, depending on how the linear actuator is positioned and oriented relative to the elongated arm. With reference to FIGS. 1 and 2, first portion 498 of linear actuator 495 is attached to guide rail 492 (by means of first bracket 510) at a point that is rearward relative to where second portion 501 of the linear actuator is attached to elongated arm 459 (by means of second bracket 522 and elongated arm bracket 534). In such a configuration as represented in FIGS. 1 and 2, expansion of linear actuator 495 results in movement of elongated arm 459 towards heated thermoplastic sheet 423, as depicted. Correspondingly, in the configuration as shown in the drawings, retraction/contraction of the linear actuator results in movement of the elongated arm back away from the heated thermoplastic sheet.

Alternatively, if first portion 498 of linear actuator 495 is attached to guide rail 492 at a point that is forward (not shown) relative to where second portion 501 of the linear actuator is attached to elongated arm 459 (e.g., via second bracket 522 and elongated arm bracket 534), then expansion of linear actuator 495 results in movement of elongated arm 459 back away from heated thermoplastic sheet 423. Correspondingly, with the alternative configuration, retraction/contraction of the linear actuator results in movement of the elongated arm toward the heated thermoplastic sheet. As such, in the method of the present invention, actuation of the linear actuator (whether expansion or retraction/contraction) is selected so as to achieve the desired movement of the elongated arm (either towards or away from the heated thermoplastic sheet), based on the relative attachment point of the first portion of the linear actuator relative to the attachment point of the second portion thereof.

Elongated arm 459 and guide rail 492 of sheet guide apparatus 456 are attachedly arranged such that forward portion 462 of elongated arm 459 moves reversibly along or above upper surface 561 of guide rail 492. The elongated arm and guide rail of the sheet guide apparatus may have alternative arrangements, such that, for example, the forward portion of the elongated arm moves reversibly along or beneath the lower surface of the guide rail.

Figure 8:
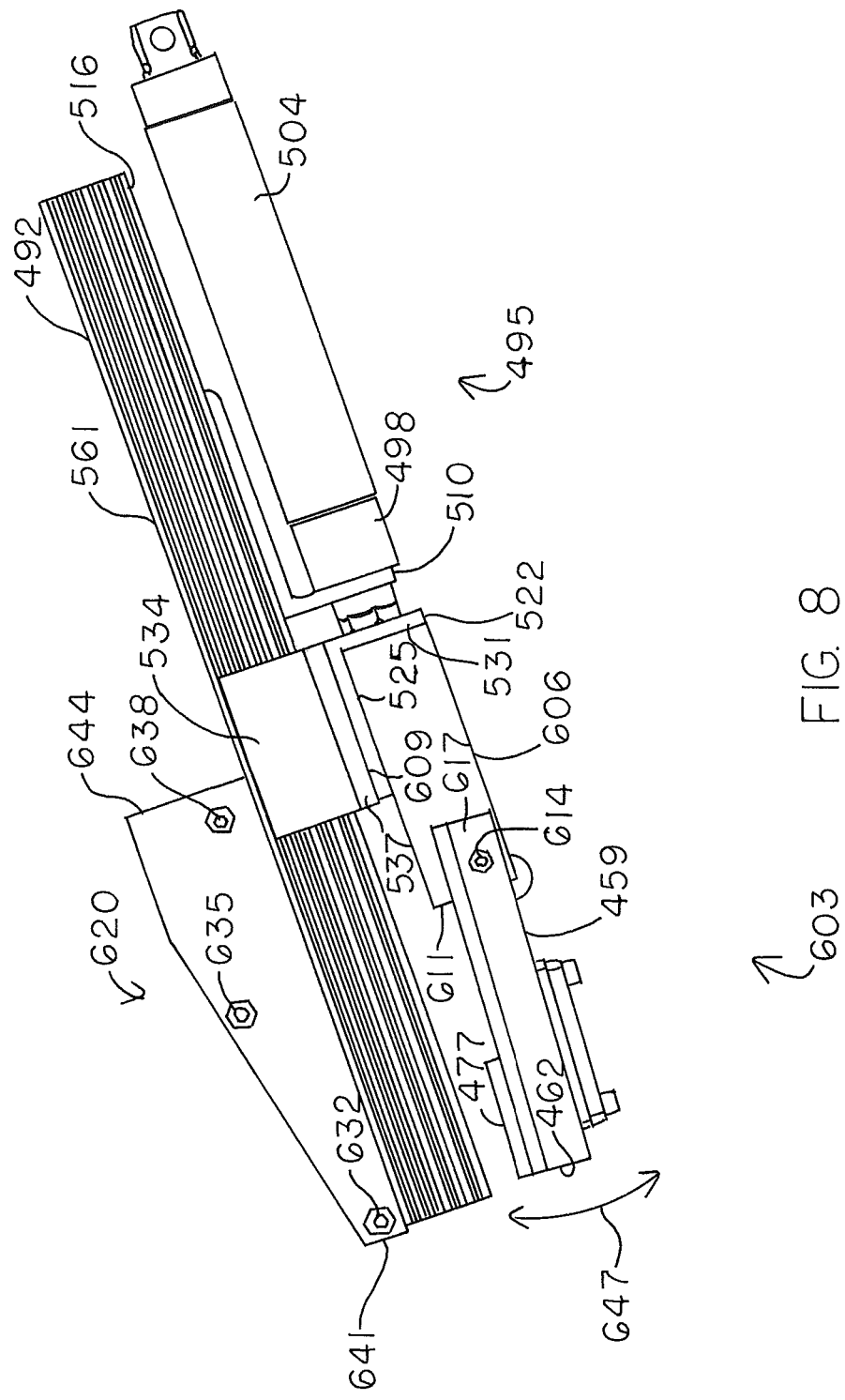
FIG. 8 is a representative side elevational view of a further sheet guide apparatus according to the present invention, which further includes an auxiliary sheet guide device attached to an upper surface of the guide rail, and in which the elongated arm is slidingly attached to and positioned under the guide rail.
Figure 9:
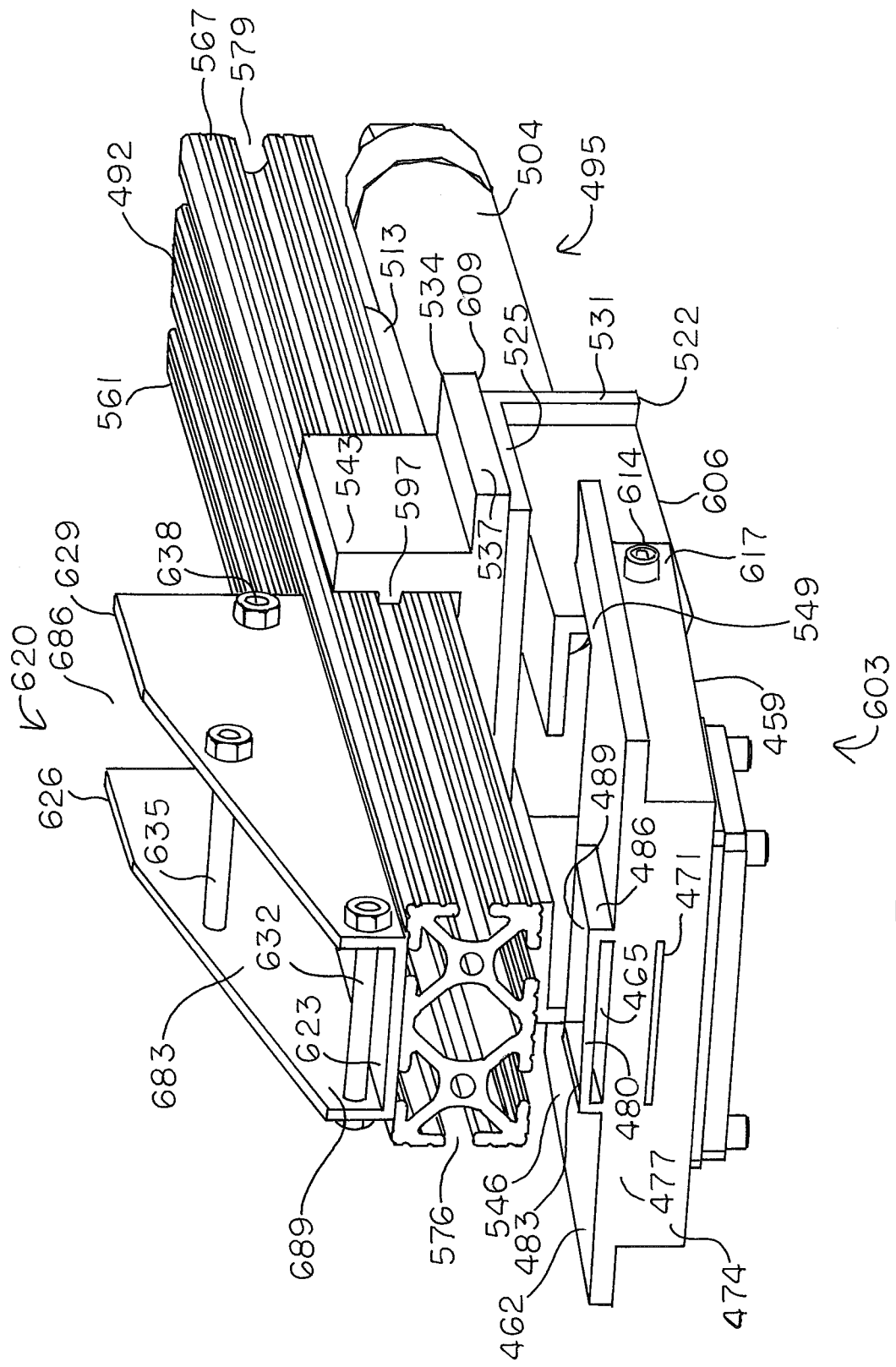
FIG. 9 is a representative front perspective view of the sheet guide apparatus of FIG. 8.
Figure 10:
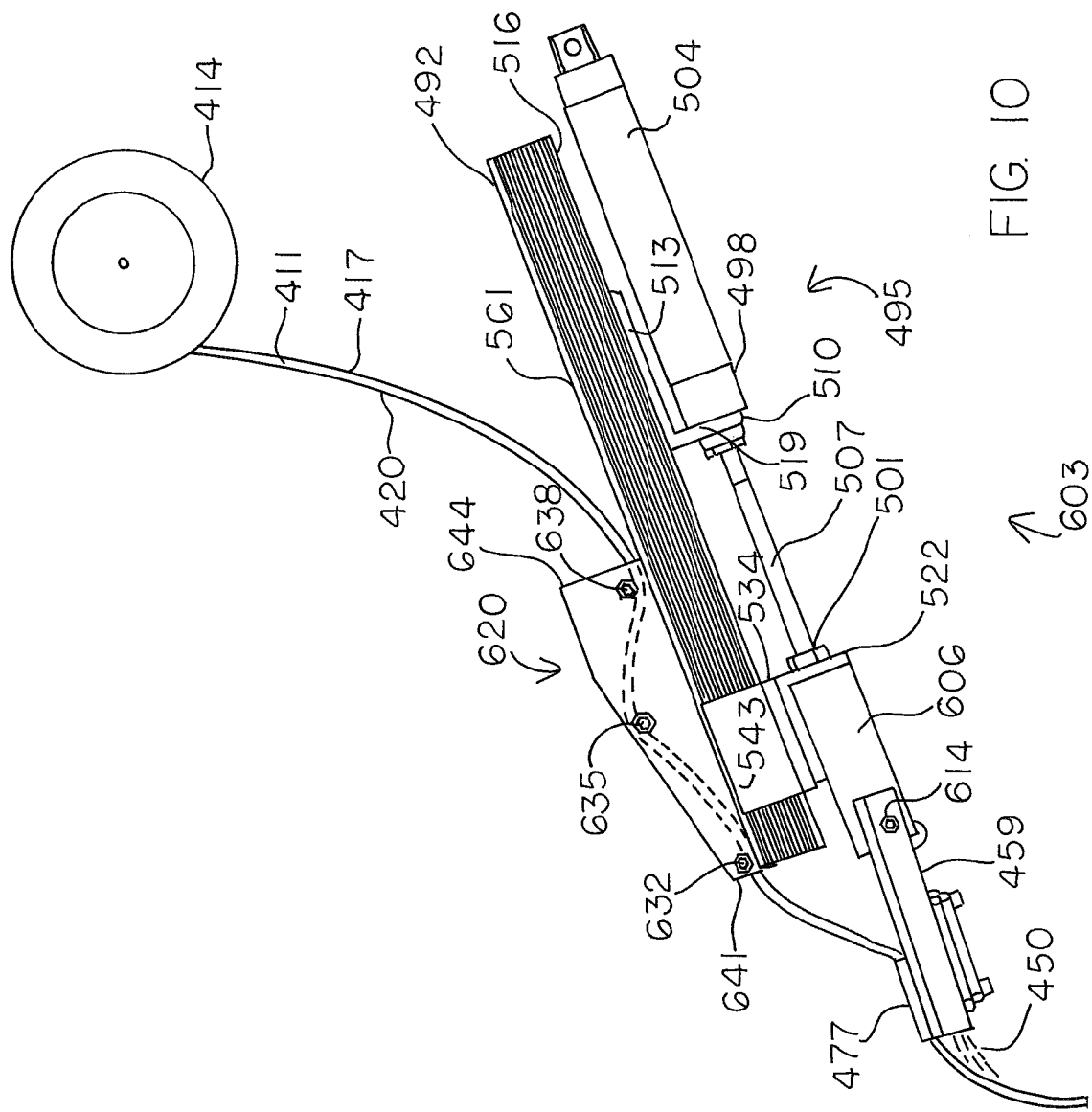
FIG. 10 is a representative side elevational view of the sheet guide apparatus of FIG. 8, in which the elongated arm is extended forward and a first plastic sheet is threaded and guided therethrough.

With reference to FIGS. 8 through 10, sheet guide apparatus 603 is configured such that the elongated arm 459 and the forward portion 462 thereof is reversibly moveable beneath lower surface 516 of guide rail 492. With sheet guide apparatus 603, elongated arm 459 is attached (via elongated arm extension 606) to base plate 537 of elongated arm bracket 534, rather than to the upper portions of upwardly extending flanges 540 and 543 of elongated arm bracket 534 as with sheet guide apparatus 456.

Elongated arm 459 of sheet guide apparatus 603 includes an elongated arm extension 606. Rear portions (e.g., 617) of each of opposing rearward extending extensions 546 and 549 of elongated arm 459 are attached to a forward portion 611 of elongated arm extension 606. In addition, upper bracket portion 525 of second bracket 522 is attached to lower surface 609 of base 537 of elongated arm bracket 534, and elongated arm extension 606 of elongated arm 459 is attached to upper bracket portion 525 and optionally to vertical bracket portion 531 of second bracket 522, with guide apparatus 603.

With guide apparatus 603, attachment between elongated arm 459 and elongated arm extension 606, allows for vertical pivotal movement of forward portion 462 and front face 474 of the elongated arm through an arc 647. The rear portions of the opposing rearward extending extensions 546 and 549 of elongated arm 459, of guide sheet 603, are each pivotally attached to forward portion 611 of elongated arm extension 606 by means of pivotal attachment points, such as fastener 614 in the case of extension 549. The pivotal attachment point between extension 546 and forward portion 611 of elongated arm extension 606 is not visible in the drawings, but is equivalent to that as represented by fastener 614. Vertical pivotal movement of forward portion 462 of elongated arm 459 through arc 647 allows for adjusting the position of forward portion 462 and front face 474 of elongated arm 459, when the elongated arm is moved towards the heated thermoplastic sheet. Correspondingly, such vertical pivotal adjustment of the forward portion and front face of the elongated arm also allows for adjusting the position of the second surface of the first plastic sheet relative to the first surface of the heated thermoplastic sheet, which results in improved (e.g., more efficient) contact and melt-bonding there-between, in the method of the present invention. Forward portion 462 (and correspondingly, front face 474) of elongated arm 459 of guide apparatus 603 is typically pivotally moved (and/or moveable) through an arc angle (e.g., 647) of from 15° to 90°, more typically from 30° to 60°, and further typically from 35° to 55° (e.g., 45° in an embodiment of the present invention).

The guide apparatus of the present invention, and as used in the method of the present invention, may include an auxiliary guide for the first plastic sheet. The auxiliary sheet guide is positioned vertically above the guide slot of the forward portion of the elongated arm. In the method, the first plastic sheet is fed and passed first through the auxiliary guide, and then through the guide slot of the forward portion of the elongated arm. Passing the first plastic sheet in tandem through the auxiliary guide and then the guide slot, minimizes mis-feeding (e.g., kinking) of the first plastic sheet as it passes through the guide slot. Accordingly, such tandem feeding and passing of the first plastic sheet through the auxiliary guide apparatus and the guide slot, also provides for smoother continuous positioning of the second surface of the first plastic sheet in opposition to the first surface of the heated thermoplastic sheet, and accordingly more efficient contact and melt-bonding there-between.

The auxiliary guide apparatus includes a forward portion, a rear portion, and first and second opposing sidewalls that extend upwardly from a base plate, which together define an elongated channel. The auxiliary guide apparatus further includes at least one rod residing within the elongated channel and extending laterally between the opposing sidewalls thereof. The forward portion and the rear portion of the auxiliary guide apparatus are each open so as to allow a sheet to enter the rear portion, pass through the elongated channel, and exit or emerge from the forward portion thereof. The auxiliary sheet guide is dimensioned to receive and guidingly pass a sheet, such as the first plastic sheet, through the rear portion, elongated channel and forward portion thereof. While passing from the rear portion to the forward portion and through elongated channel of the auxiliary guide, the sheet, and in particular the first plastic sheet, contacts (e.g., passes over or under) each of the rods extending laterally between the opposing sidewalls thereof. The sheet, e.g., the first plastic sheet, emerges from the forward portion of the auxiliary guide and drops down into and through the guide slot of the forward portion of the elongated arm.

The auxiliary guide may be attached to upper surfaces of the elongated arm, in particular when the elongated arm is positioned so as to move slidingly along or above the upper surface of the guide rail. For example, the auxiliary guide may be attached to the upper surfaces of rearward extending extensions 546 and 549 of elongated arm 459 of guide apparatus 456 (not so depicted in the drawings).

Alternatively, the auxiliary guide apparatus, and in particular the base plate thereof, may be attached to the upper surface of the guide rail, in particular when the elongated arm is positioned for sliding movement beneath the lower surface of the guide rail. With reference to FIGS. 8 through 10, guide apparatus 603 further includes an auxiliary guide apparatus 620 that has a base plate 623, a first sidewall 626 and a second sidewall 629 that each extend upwardly from base plate 623 and which are opposed to each other. Base plate 623, first sidewall 626 and second sidewall 629 together define elongated channel 683. Rear portion 644 has an opening 686, and forward portion 641 has an opening 689. As depicted in the drawings, the upper portion of guide apparatus 620 is open, but optionally may be closed, e.g., by means of a reversibly closeable lid (not shown).

Auxiliary guide 620 also includes a first rod 632, a second rod 635 and a third rod 638 (not fully visible) that each extend laterally between the opposing sidewalls 626 and 629, and each of which resides within elongated channel 683. The rods of the auxiliary guide may be selected from non-rotating (or static) rods, rotating rods (e.g., having rotatable cylindrical sheaths there-around) and combinations thereof. First rod 635 is positioned near the forward portion 641, third rod 638 is positioned near the rear portion 644 of auxiliary guide 620, and second rod 635 is interposed longitudinally between first rod 632 and third rod 638. In addition, third rod 638 is positioned vertically higher above base plate 623 than is first rod 632, and second rod 635 is positioned vertically higher above base plate 623 than are both of first rod 632 and third rod 638. In addition to their tandem longitudinal positioning, the variable vertical positioning of the rods as described allows the first plastic sheet to be passed in series alternately under and over the rods.

With reference to FIGS. 9 and 10, first plastic sheet 411 is passed in series: through opening 686 of rear portion 644; into elongated channel 683; under third rod 638 (with second surface 420 contacting third rod 638); then over second rod 635 (with first surface 417 contacting second rod 635); and then under first rod 632 (with second surface 420 contacting first rod 632). After passing under first rod 632, first plastic sheet 411 emerges out through opening 689 of forward portion 641 of auxiliary guide 620, passes down into and through guide channel 489 of bracket 477 of elongated arm 459, out through guide slot 465 and in front of gas outlet aperture 471. As first plastic sheet 411 passes in front of gas outlet aperture 471, the stream of gas 450 impinges upon the first surface 417 of the first plastic sheet, so as to drive the second surface 420 thereof against and into melt-bonding contact with the first surface (e.g., 432) of the heated thermoplastic sheet (e.g., 423), which is not shown in FIG. 10.

The guide apparatus of the present invention, and the various components thereof, such as the guide slot, may be more generally described as being dimensioned to receive a sheet having first and second surfaces therethrough. The sheet may be a plastic sheet (e.g., the first and/or second plastic sheets of the method of the present invention) or a non-plastic sheet (e.g., a paper sheet, a metal sheet, or a metal foil). In addition, the guide apparatus of the present invention may be further generally described as providing a stream of gas, from the gas outlet aperture, against the first surface of the sheet, so as to drive a portion of the second surface of the sheet against a first surface of a separate structure, which is positioned in opposition relative to the forward portion of the elongated arm. The separate structure may be the heated thermoplastic sheet, as discussed and described previously herein with regard to the method of the present invention. Alternatively, the separate structure may be in the form of a sheet or other shaped article, fabricated from (or in which the first surface thereof is fabricated from): non-plastic materials, such as, glass, ceramics, metal and/or wood; or non-thermoplastic materials, such as thermosetting materials, such as thermoset polyurethanes (e.g., in the form of a coating). When the second surface of the sheet and the first surface of the separate structure (i.e., the surfaces driven into abutment by the stream of gas) are in each case not defined by a thermoplastic material or layer, the guide apparatus of the present invention may be used to bond the abutting surfaces together by means of an adhesive or adhesive layer being interposed between the two surfaces.

In an embodiment, the method of the present invention further involves continuously melt-bonding a second plastic sheet to the second surface of the heated thermoplastic sheet, in addition to continuously melt-bonding the first plastic sheet to the first surface of the heated thermoplastic sheet. The second plastic sheet has a first surface and a second surface, the second surface of which is defined by a thermoplastic layer having a melting temperature. The second plastic sheet and the thermoplastic layer defining the second surface thereof are as described previously herein with regard to the first plastic sheet. The second plastic sheet and the thermoplastic layer defining the second surface thereof may be the same or different than the first plastic sheet. For example, the second plastic sheet may comprise a different number and types of layers than the first plastic sheet. In an embodiment of the present invention, the second plastic sheet is a single layer sheet in which the thermoplastic layer defining the second surface also defines the first surface thereof. The second plastic sheet is provided at a temperature that is less than the melting temperature of the thermoplastic layer that defines the second surface thereof. The temperature of the heated thermoplastic sheet is equal to or greater than the melting temperature of the thermoplastic layer defining the second surface of the second plastic sheet.

The dimensions of the second plastic sheet (i.e., the thickness, width and length thereof) may be described with reference to and selected from those values and ranges as discussed previously herein with regard to the first plastic sheet. In an embodiment, the second plastic sheet has a thickness, width and length that is substantially equivalent to that of the first plastic sheet.

A portion of the second surface of the second plastic sheet is positioned so as to be in opposition (e.g., facing opposition) with a portion of the second surface of the heated thermoplastic sheet. A second stream of gas is applied against a portion of the first surface of the second plastic sheet, so as to drive continuously the opposing portion of the second surface of the second plastic sheet into contact with the opposing portion of the second surface of the heated thermoplastic sheet (as the heated thermoplastic sheet is continuously formed). The second stream of gas is as described previously herein with regard to the first stream of gas. As the opposing surface portions of the second plastic sheet and heated thermoplastic sheet are driven into contact by the second stream of gas, the thermoplastic layer defining the second surface of the second plastic sheet and the second surface of the heated thermoplastic sheet are continuously melt-bonded together, thereby forming continuously the heated multilayered thermoplastic sheet. At least a portion of the first surface of the heated multilayered thermoplastic sheet is defined by the first surface of the first plastic sheet. The second surface of the heated multilayered thermoplastic sheet, in this embodiment, is at least partially defined by the first surface of the second plastic sheet. The heated multilayered thermoplastic sheet comprising the first plastic sheet, the heated thermoplastic sheet and the second plastic sheet has a temperature that allows it to be thermoformable, and may be molded in accordance with the description as provided above and below herein.

Figure 6:
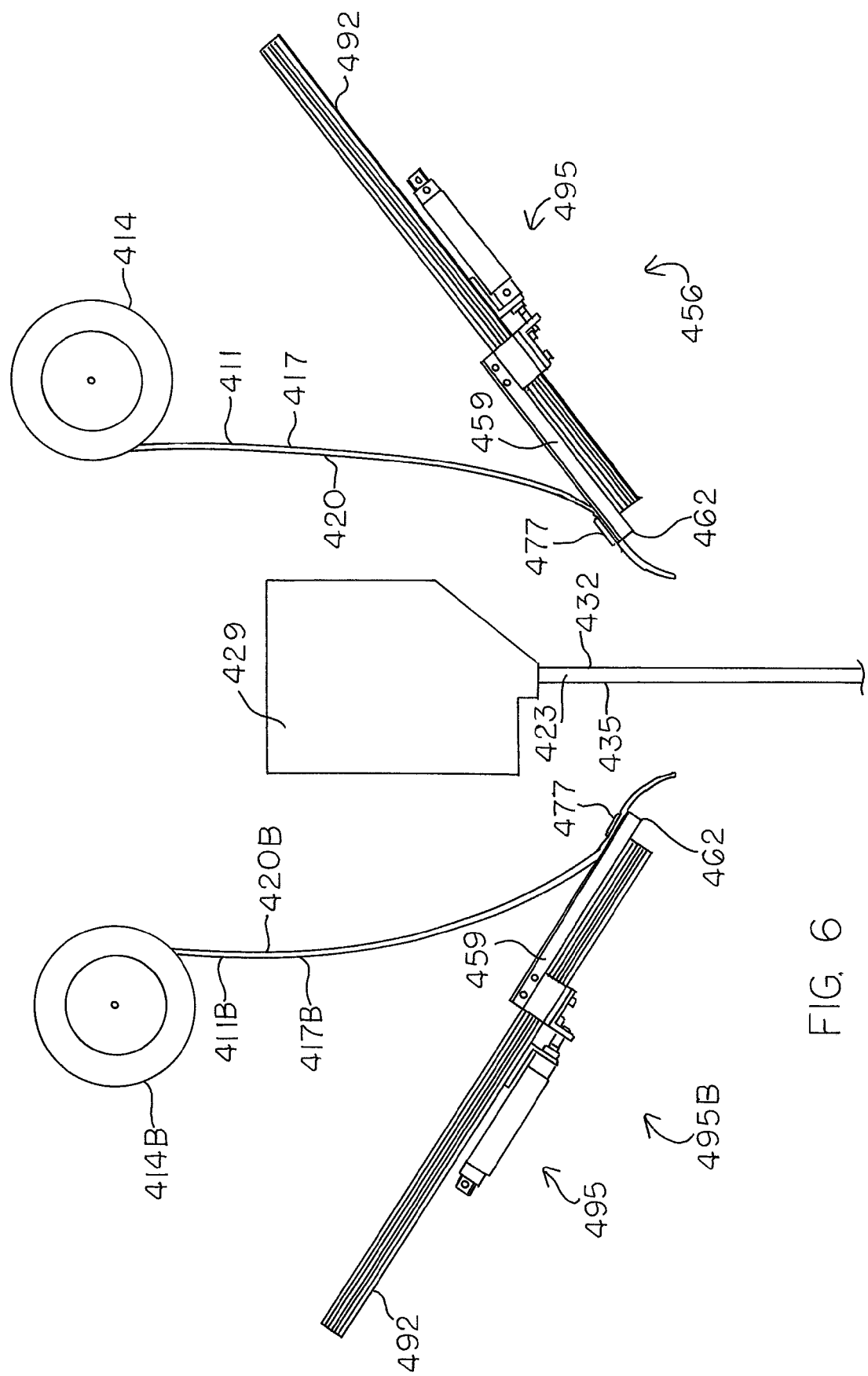
FIG. 6 is a representative side elevational view of a portion of a sheet molding apparatus according to the present invention that includes two separate sheet guide apparatae each positioned on opposite sides of a heated thermoplastic sheet as it emerges from the sheet die.
Figure 7:
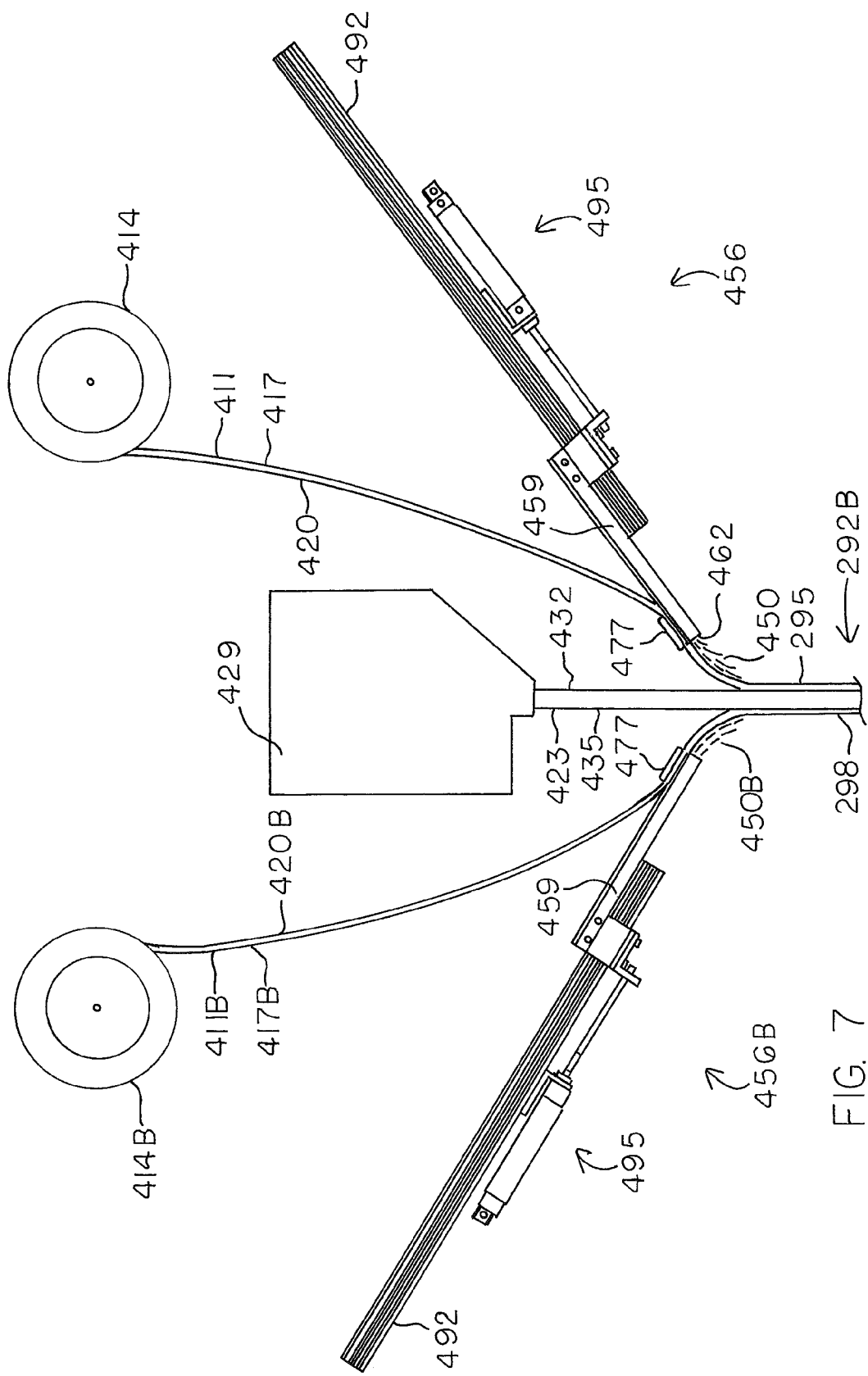
FIG. 7 is a representative side elevational view of the sheet molding apparatus of FIG. 6, in which the elongated arm of each sheet guide apparatus is extended towards an opposite side of the heated thermoplastic sheet as it emerges from the sheet die.

With reference to FIGS. 6 and 7 a particular embodiment of the method and apparatus used to form a heated multilayered thermoplastic sheet from first and second plastic sheets and the heated thermoplastic sheet, is described. A second roll 414B of a second plastic sheet 411B having a first surface 417B and a second surface 420B (defined by a thermoplastic layer) is provided. The second plastic sheet 411B is as described previously herein with regard to the first plastic sheet 411. A second guide apparatus 456B is also provided so as to reversibly position second surface 420B of second plastic sheet 411B towards (e.g., in opposition to) second surface 435 of heated thermoplastic sheet 423. In particular, second sheet guide apparatus 456B is positioned on the second surface (435) side of the heated thermoplastic sheet 423 as it emerges from sheet die 429. Second sheet guide apparatus 456B comprises substantially the same components (e.g., guide rail 492, elongated arm 459 and linear actuator 495) as described previously herein with regard to sheet guide apparatus 456.

Second plastic sheet 411B is drawn continuously off of second roll 414B and passes through guide bracket 477 and guide slot 465 of elongated arm 492 of second sheet guide apparatus 456B. Linear actuator 495 of second sheet guide apparatus 456B is actuated (and in particular expanded) so as to reversibly move forward portion 462 of elongated arm 459 thereof towards heated thermoplastic sheet 423, thereby positioning a portion of second surface 420B of second plastic sheet 411B in opposition to a portion of second surface 435 of heated thermoplastic sheet 423. A second stream of gas 450B is expelled from the gas outlet aperture 471 of second guide apparatus 456B, and impinges upon a portion of first surface 417B and drives continuously the opposing portion of second surface 420B of second plastic sheet 411B into contact with the opposing portion of the second surface 435 of heated thermoplastic sheet 423, as the heated thermoplastic sheet is formed and extends downstream (e.g., drops gravitationally downward) from sheet die 429. The thermoplastic layer defining second surface 420B of second plastic sheet 411B and second surface 435 of heated thermoplastic sheet 423 are thus continuously melt-bonded together. At the same time, sheet guide apparatus 456 is operated as described previously herein so as to continuously contact and melt-bond together the thermoplastic layer defining second surface 420 of first plastic sheet 411 and first surface 432 of heated thermoplastic sheet 423, thereby forming heated multilayer thermoplastic sheet 292B.

Heated multilayered thermoplastic sheet 292B, of FIG. 7, has a first surface 295 defined at least in part by first surface 417 of first plastic sheet 411. In addition, heated multilayered thermoplastic sheet 292B has a second surface 298 that is defined at least in part by first surface 417B of second plastic sheet 411B. Heated multilayered thermoplastic sheet 292B has a temperature that allows it to be thermoformable (i.e., a thermoformable temperature), and may be further processed in accordance with the method of the present invention. In particular, second surface 298 of heated multilayered thermoplastic sheet 292B is brought into contour matching contact with the interior mold surface of the first mold portion, allowed to cool to a temperature below its thermoformable temperature, thereby forming a shaped multilayered article that retains the contour of the interior mold surface of the first mold portion. The shaped multilayered article is then removed from the first mold portion.

With the method and the sheet molding apparatus of the present invention, there is optionally further provided an extruder having a terminal end that is in fluid communication with a sheet die having an elongated sheet slot dimensioned to form the heated thermoplastic sheet. The thermoplastic composition, from which the heated thermoplastic sheet is formed, is melted in the extruder thereby forming a molten thermoplastic composition that is then forwarded to the sheet die. The molten thermoplastic composition emerges from elongated sheet slot of the sheet die in the form of the heated thermoplastic sheet.

With reference to FIG. 12, the sheet molding apparatus 1 of the present invention may further include an extruder 271 and a sheet die 274. The extruder includes a feed end 277 having a feed port 280, and a terminal (or extrudate) end 283. Extruder 271 may be selected from single screw, or counter- or co-rotating twin screw extruders that are known to the skilled artisan. Extruder 271 typically includes one or more heated zones along the length of its barrel 286, the temperature(s) of which is controllable. A thermoplastic composition, typically comprising at least one thermoplastic polymer and optionally one or more additives (e.g., glass fibers and/or stabilizers, such as antioxidants), is introduced into feed port 280, is melted and compounded as it moves through barrel 286, and emerges from terminal end 283 as a molten thermoplastic composition.

Terminal end 283 of extruder 271 is in fluid communication with sheet die 274. Fluid communication between terminal end 283 and sheet die 274 is typically achieved by means of a conduit 289. Conduit 289 may optionally be heated. The molten thermoplastic composition is forwarded from terminal end 283 of extruder 271, through conduit 289, and into sheet die 274. Sheet die 274 typically includes at least one interior channel that is in fluid communication with conduit 289, and a slot, e.g., an elongated sheet slot (not shown in FIG. 12). In addition, sheet die 274 may be separately heated, so as to maintain the extruded thermoplastic material in a molten state. The slot is located on the bottom of sheet die 274, and the heated thermoplastic sheet 423 (which becomes heated multilayered sheet 292 after melt-bonding with the first plastic sheet, e.g., 411) emerges from the slot. Passage of the molten thermoplastic material through the interior channel(s) and slot of the sheet die results in formation of heated thermoplastic sheet 423 having first surface 432 and a second surface 435 (e.g., FIG. 1).

The sheet die, of the sheet molding apparatus of the present invention, may be a dynamic sheet die having a plurality of gates that may each be independently controllably and reversibly moved, by separate actuators, across the slot of the sheet die so as to control the amount of molten thermoplastic material passing there-through, and accordingly the thickness, width and shape of the heated thermoplastic sheet emerging therefrom and produced thereby. The gates may be operated so as to produce a heated thermoplastic sheet having openings (not depicted in the drawings) that are free of thermoplastic material. For example, as the heated thermoplastic sheet is formed, some of the gates forming interior portions of the sheet, may be closed for a predetermined amount of time and then reopened, thereby resulting in openings or slots being formed in the sheet.

Rather than a slot, the sheet die may have a plurality of laterally aligned openings through which the molten thermoplastic material emerges. The openings are typically positioned such that molten thermoplastic material emerging from one opening merges and becomes continuous with the molten thermoplastic material emerging from its adjacent/neighboring opening(s), thereby forming the heated thermoplastic sheet. The plurality of laterally aligned openings in effect act as and together form an elongated sheet slot with regard to formation of the heated thermoplastic sheet. Each opening may have a reversibly and controllably closeable gate associated therewith.

Figure 27:
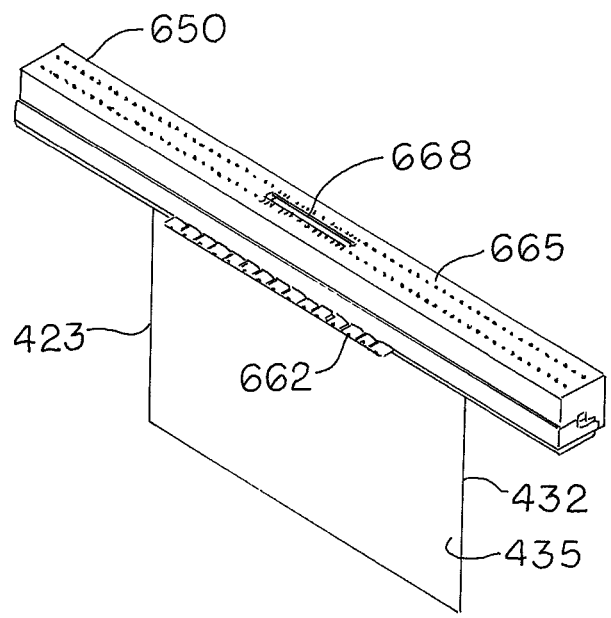
FIG. 27 is a perspective view of a sheet die having a heated thermoplastic sheet emerging from the elongated sheet slot thereof.
Figure 28:
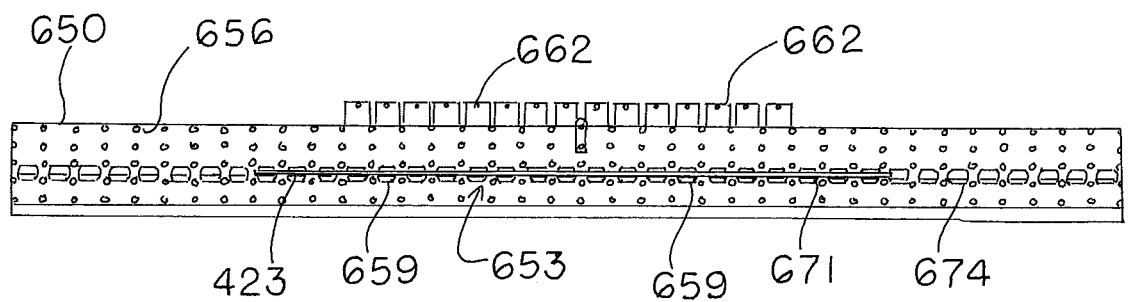
FIG. 28 is a plan view of the bottom of the sheet die of FIG. 27 showing the effective elongated sheet slot thereof.

For purposes of further illustration, and with reference to FIGS. 27 and 28, a sheet die 650 is depicted having heated thermoplastic sheet 423 emerging from the elongated sheet slot 653 thereof. The top 665 of sheet die 650 has an opening 668 into which the heated thermoplastic composition is received (e.g., from terminal end 283 extruder 277 via conduit 289 of FIG. 12). Opening 668 is in fluid communication with at least one interior channel (not shown) that provides fluid communication with the plurality of openings 659/elongated sheet slot 653 in the bottom 656 of sheet die 650. Elongated sheet slot 653 is located on the bottom 656 of sheet die 650, and is formed by a plurality of laterally aligned openings 659 through which the molten thermoplastic material emerges and forms heated thermoplastic sheet 423, as described above. At least some of the plurality of laterally aligned openings 659 each has a reversibly and controllably closeable gate 662 associated therewith. Each gate 662 may be independently controllably and reversibly moved, by separate actuators (not shown), across each opening 659 associated therewith, so as to control the amount of molten thermoplastic material passing through each opening 659, and accordingly the thickness, width and shape of the heated thermoplastic sheet (e.g., 423) emerging from the effective elongated sheet slot formed by the adjacent and laterally aligned openings 659. Some of the laterally aligned openings (e.g., 671) in bottom 656 of sheet die 650 may not have a gate 662 associated therewith, and the molten thermoplastic composition consequently flows substantially freely therethrough. In addition, some of the laterally aligned openings (e.g., 674) in bottom 656 of sheet die 650 may be sealed and do not have any molten thermoplastic composition flowing therethrough or emerging therefrom. The sheet dies shown in the drawings (e.g., sheet dies 429, 274 and 650) may be used interchangeably in the method and sheet molding apparatus of the present invention.

With the method and the sheet molding apparatus of the present invention, there is optionally further provided a mold apparatus that includes, the first mold portion as described previously herein having a perimeter edge, and in which the interior mold surface thereof has a plurality of perforations. The sheet molding apparatus further includes a frame (having an upper surface) surrounding at least a portion of the perimeter edge of the first mold portion. The first mold portion and the frame are reversibly positionable (e.g., vertically) relative to each other. Still further, the sheet molding apparatus also includes at least one sheet retainer, each having a clamp portion facing towards the perimeter edge of the first mold portion and comprising a clamp member and a clamp interior. The clamp member of each sheet retainer is reversibly closeable, and the clamp interior thereof is defined in part by the clamp member. Each sheet retainer is independently, reversibly and laterally attached to the upper surface of the frame such that the clamp portion of each thereof is reversibly and laterally positionable relative to the perimeter edge of the first mold portion.

With the sheet molding apparatus further including the first mold portion, frame and sheet retainer(s) as described above, the method includes positioning the first mold portion and the frame relative to each other, such that the upper surface of the frame is located above the perimeter edge of the first mold portion. The clamp member of each sheet retainer is positioned in an open position, so as to provide access to the clamp interior of each thereof. A first portion (e.g., 304, FIG. 23) of the second surface (e.g., 295) of the heated multilayered thermoplastic sheet is contacted with the clamp interior of at least one sheet retainer. The clamp member of each sheet retainer is positioned in a closed position, so as to clamp and retain the first portion of the heated multilayered thermoplastic sheet residing within the clamp interior. With the heated multilayered thermoplastic so retained within the clamps, the first mold portion and the frame are positioned (e.g., vertically) relative to each other so as to contact a second portion (e.g., 310, FIG. 23) of the second surface of the heated multilayered thermoplastic sheet with at least a portion of the interior mold surface of the first mold portion.

Each sheet retainer (with the heated multilayered thermoplastic sheet retained therein) is independently laterally moved to a lateral position that is towards the perimeter edge and/or away from the perimeter edge of the first mold portion. Lateral movement of the sheet retainers (with the heated multilayered thermoplastic sheet retained therein) before, during and/or after contact of the heated multilayered thermoplastic sheet with the interior mold surface serves to control at least a portion of the thickness of the second portion of the heated multilayered thermoplastic sheet that is contacted with the interior mold surface of the first mold portion. Reduced pressure is drawn through the plurality of perforations of the interior mold surface of the first mold portion, such that the second portion of the second surface of the heated multilayered thermoplastic sheet is drawn into contour matching contact with the interior mold surface.

The sheet molding apparatus of the present invention and as used in the method thereof may be described in further detail with reference to FIGS. 11 and 12. Mold apparatus 1, and more particularly a sheet molding apparatus 1, includes a first mold portion 11, having an interior mold surface 14, which has a plurality of perforation 26, and a perimeter edge 17, as described previously herein. Perimeter edge 17 typically defines the terminal extent of first mold portion 11 beyond which heated multilayered thermoplastic sheet, if any, extending there-beyond does not form a portion of the final molded article. Typically, multilayered thermoplastic sheet, if any, extending beyond perimeter edge 17 is removed (e.g., cut away) from the final molded article. Perimeter edge 17 may have any suitable shape, such as rounded, polygonal, irregular or combinations thereof. As depicted in the drawings, perimeter edge 17 is in the form of a substantially horizontal shelf having an upper surface 18 and a terminal edge 19.

For purposes of clarity, the plurality of perforations 26 are only depicted in FIGS. 11 and 12, and only over a portion of interior mold surface 14. Perforations 26 may be located over substantially the entirety of interior mold surface 14 or in zones (or clusters). Perforations 26 may be arranged substantially uniformly or non-uniformly (e.g., randomly) over interior mold surface 14. If located in zones, portions of interior mold surface 14 may be free of perforations. The plurality of perforations are typically arranged (or located) uniformly over substantially the entirety of interior mold surface 14.

The plurality of perforations are in fluid communication with at least one vacuum apparatus, such as a vacuum pump. Typically, first mold portion 11 has at least one interior chamber (not shown) that is in fluid communication with the plurality of perforations 26 and at least one vacuum apparatus, for example vacuum apparatus 29 by means of conduit 32, as depicted in FIG. 12. Conduit 32 may be a rigid conduit, but more typically is fabricated from a flexible material that may be reversibly coiled. Conduit 32 is depicted as passing beneath a portion of a structure 41 upon which first mold portion 11 rests and is supported. Support structure 41 includes a plurality of beams 44 (e.g., I-beams) that extend upwardly from the upper surface 47 of an underlying platform 50.

While depicted as being separated from first mold portion 11, vacuum apparatus 29 may alternatively be positioned more proximate thereto (e.g., residing on platform 50, not so depicted). Vacuum apparatus 29 controllably draws reduced pressure through the plurality of perforations in interior mold surface 14. For example, the reduced pressure drawn through perforations 26 may be ramped in stages with at least one pressure plateau, or the reduced pressure may be drawn at the full capacity of vacuum apparatus 29 from the instant it is turned on (or activated).

To assist removing the molded article from first mold portion 11, a gas (e.g., air) may be passed out of perforations 26 at elevated pressure (i.e., at a pressure greater than ambient atmospheric pressure). To pass a gas, such as air, at elevated pressure out through perforations 26, vacuum apparatus 29 may be operated in reverse, and/or a separate pressure pump (not shown) may be used in fluid communication with the internal chamber and correspondingly perforations 26 of first mold portion 11. In addition, the gas passed out of perforations 26 may be cooled to a temperature less than ambient temperature (e.g., a temperature less than 25° C., such as 5° C. to 15° C.) to further assist cooling the contoured matched heated multilayered thermoplastic sheet, such that it retains the contour shape of interior mold surface 14.

As discussed in part previously herein, the plurality of perforations in interior mold surface 14 may have any suitable shape and dimension, provided they: (i) are not fouled, occluded or otherwise clogged with thermoplastic material when the molded article is removed from first mold portion 11; and (ii) do not result in undesirable surface features or defects on the final molded article (e.g., plastic nubs extending from a surface thereof). The perforations in interior mold surface 14 may have cross-sectional shapes selected from polygonal shapes (e.g., triangles, rectangles, squares, pentagons, hexagons, heptagons, octagons, etc., and combinations thereof), circles, ovals, irregular shapes, and combinations thereof. Typically, the perforations of interior mold surface 14 have substantially circular cross-sectional shapes having diameters of from 0.1 mm to 7 mm, more typically from 0.5 mm to 5 mm, and further typically from 1 mm to 3 mm. In an embodiment of the present invention, the perforations of interior mold surface 14 have substantially circular cross-sectional shapes having diameters of 1.6 mm (1/16 inch).

The sheet molding apparatus of the present invention also includes a frame 35 that surrounds at least a portion of perimeter edge 17 of first mold portion 11. Frame 35 has an upper surface 38, and includes an opening 163 that is dimensioned to allow first mold portion 11, and, in particular, perimeter edge 17 thereof to pass at least partially there-through. Frame 35 and first mold portion 11 are reversibly vertically positionable relative to each other (e.g., along the z-axis as depicted in FIG. 11), which allows for a heated multilayered thermoplastic sheet to be brought into contact with interior mold surface 14 of first mold portion 11, as will be discussed in further detail herein. For example, first mold portion 11 and frame 35 may each independently be reversibly vertically positionable by art-recognized means, such as by pistons, scissor jacks, and/or screw jacks.

Frame 35 may be used alone. Alternatively, frame 35 may be used in conjunction with a frame support 36, which resides abuttingly beneath and provides support for frame 35. The use of a separate frame 35 and a support frame 36 is advantageous as it allows for separate frames having, for example, different sheet retainers and/or different sheet retainer configurations, to be quickly interchanged (e.g., on and off of support frame 36). Being able to quickly interchange frames with associated sheet retainers thereon, may be desirable when the mold apparatus is fitted with different first mold portions having different dimensions and/or configurations. Upper surface 38 of frame 35 resides above upper surface 37 of support frame 36. Frame 35 has an outer edge 142. Frame 35 is typically dimensioned such that its outer edge 142 is inward relative to the outer edge 145 of support frame 36. Such dimensioning, allows for each sheet retainer 148 to be laterally moveable over (e.g., slidingly over) upper surface 38 of frame 35, and at the same time a rear portion 204 thereof to be laterally moveable over and separated from upper surface 37 of support frame 36, as will be discussed in further detail herein.

In an embodiment of the present invention, first mold portion 11 is substantially stationary relative to vertical positioning, and frame 35 is reversibly and controllably vertically positionable. In a particular embodiment, frame 35 is reversibly vertically positionable by means of a first screw actuator assembly 53 and a second screw actuator assembly 56, which are located on opposite sides of the frame. The screw actuator assemblies (e.g., 53 and 56) are typically positioned so as to minimize the likelihood that they will come into direct contact with the heated multilayered thermoplastic sheet as it is laid down across the sheet retainers, as will be discussed in further detail herein.

Figure 13:
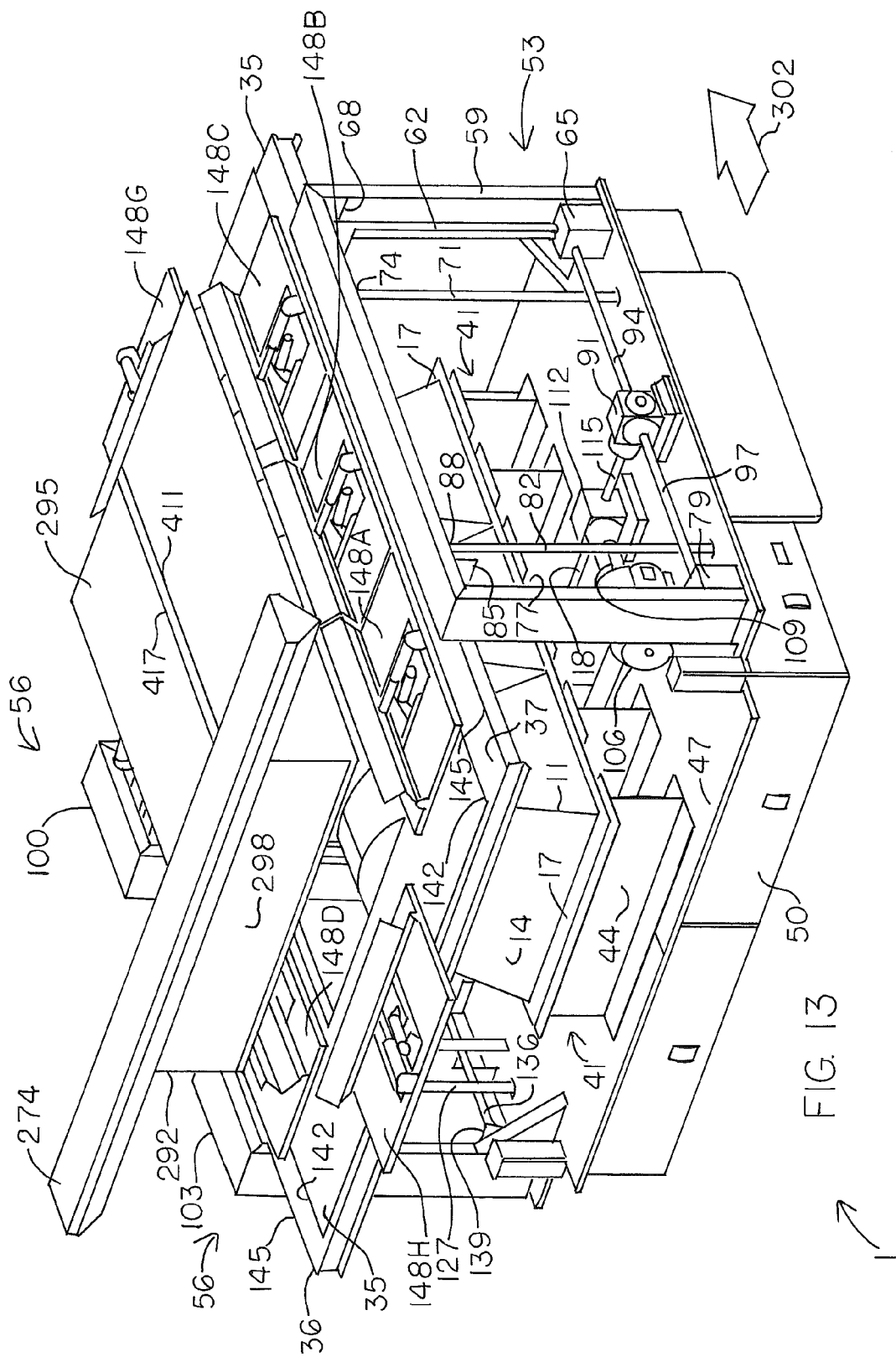
FIG. 13 is a representative perspective view of the sheet molding apparatus of FIG. 11, in which the heated multilayered thermoplastic sheet extends across a portion of the sheet retainers and over a portion of the first mold portion, and in which the sheet guide apparatus is not shown for purposes of clarity.

With reference to FIG. 13, screw actuator assembly 53 includes a box frame 59 that is attached to and extends upwardly from upper surface 47 of platform 50. First screw actuator assembly 53 further includes a first screw 62 that extends vertically upwardly from a first screw transfer gear box 65, and a first guide rod 71 that extends vertically upward from upper surface 47 of platform 50. First screw 62 engages threadingly with a first threaded eyelet 68 that extends laterally outward from support frame 36. First guide rod 71 is not threaded and engages slidingly with a first non-threaded guide eyelet 74 that extends laterally outward from support frame 36. First actuator assembly 53 also includes a second screw 77 (only partially visible in the drawing figures) that extends vertically upward from a second screw transfer gear box 79, and a second guide rod 82 that extends vertically upward from upper surface 47 of platform 50. Second screw 77 engages threadingly with a second threaded eyelet 85 that extends laterally outward from support frame 36. Second guide rod 82 is not threaded and engages slidingly with a second non-threaded guide eyelet 88 that extends laterally outward from support frame 36.

First screw actuator assembly 53 also includes a primary transfer gear box 91. Primary transfer gear box 91 has a first lateral shaft 94 that extends laterally outward therefrom and engages with first screw transfer gear box 65, and a second lateral shaft 97 that extends laterally outward therefrom and engages with second screw transfer gear box 79.

Figure 15:
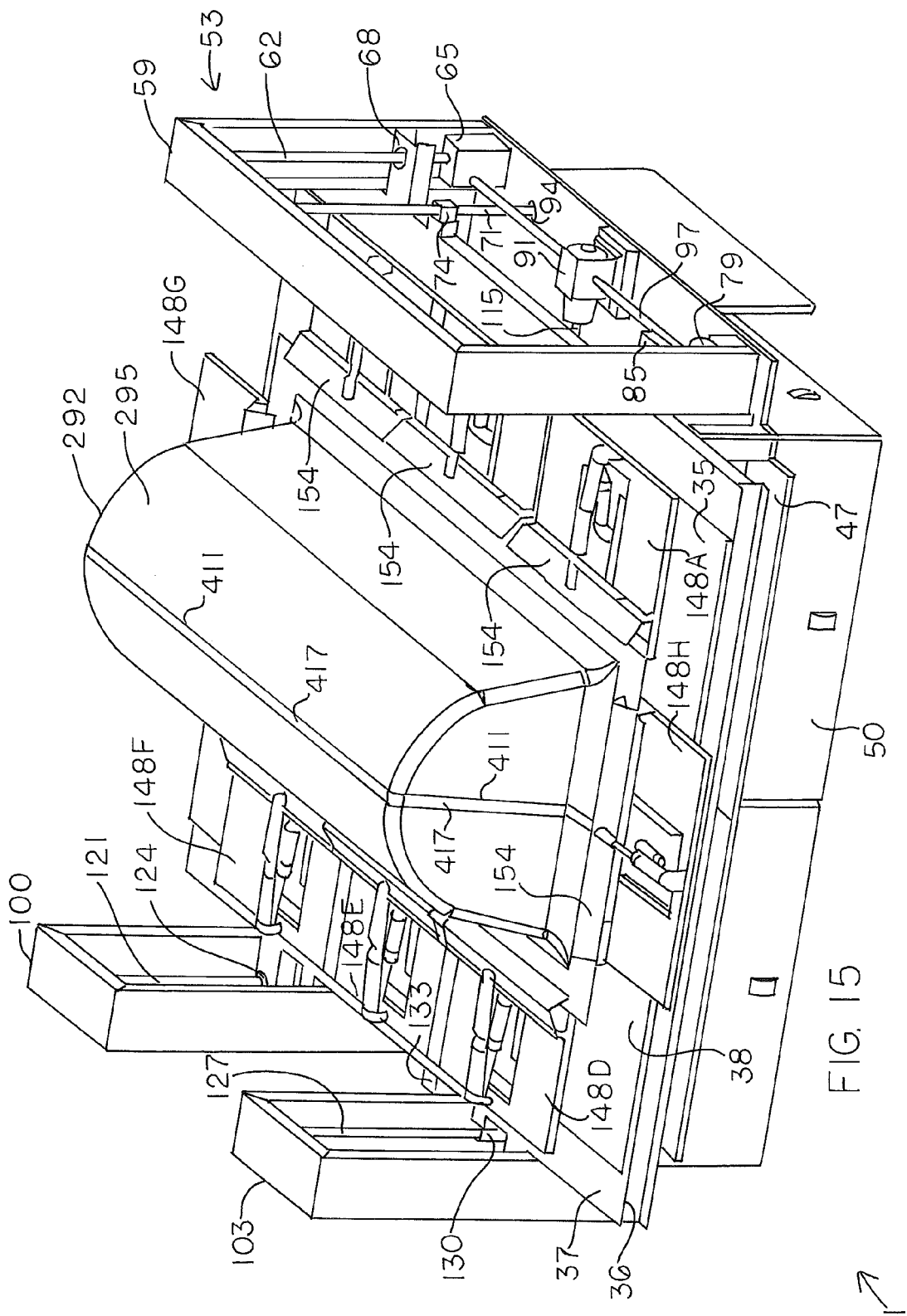
FIG. 15 is a representative perspective view of the sheet molding apparatus of FIG. 14, in which the frame has been moved vertically downward with the heated multilayered thermoplastic sheet retained within the clamp portions of each sheet retainer.
Figure 22:
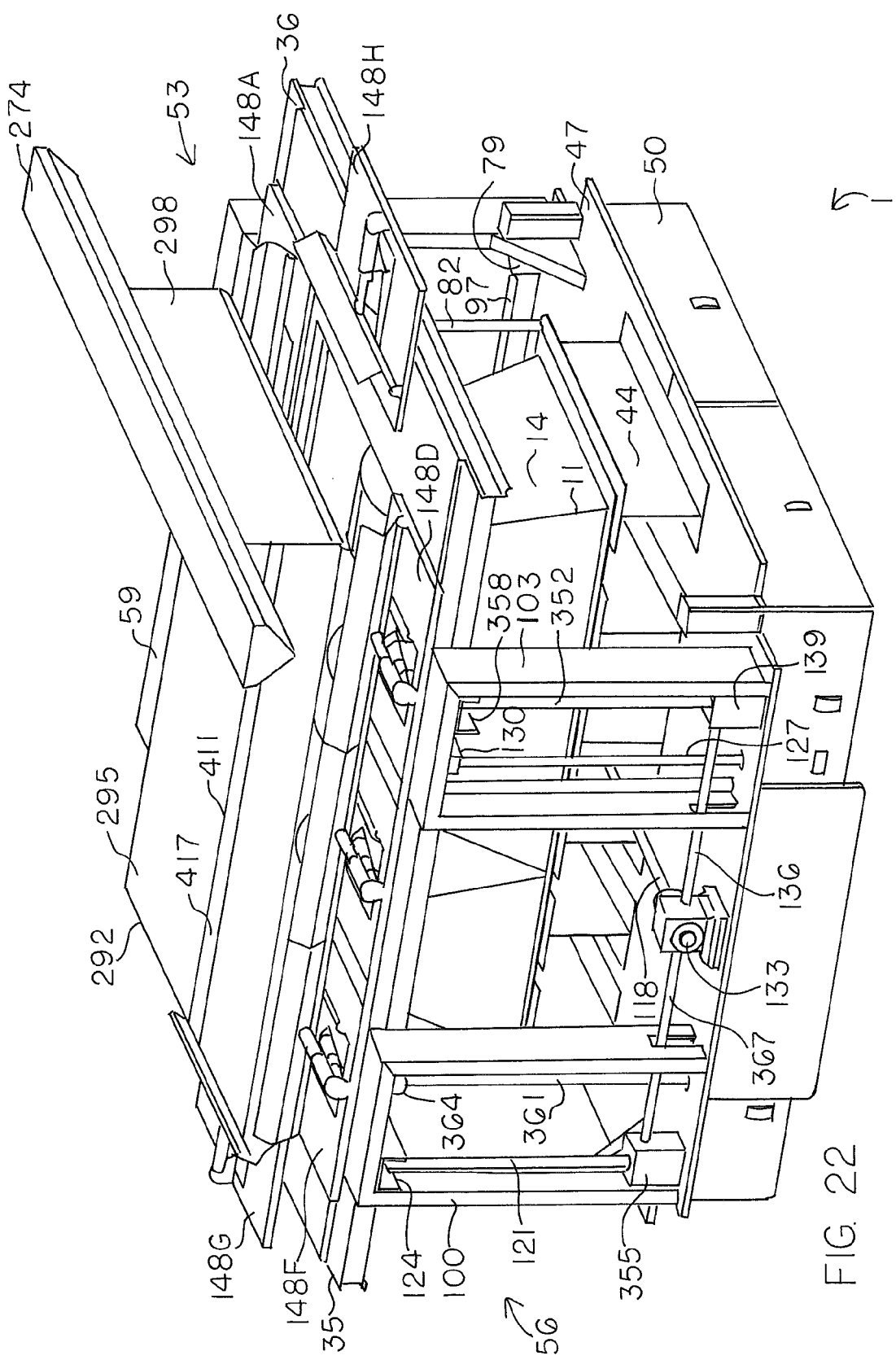
FIG. 22 is a representative alternate perspective view of the sheet molding apparatus of FIG. 13, which provides a perspective view of the second screw actuator assembly (56)

Second screw actuator assembly 56 is substantially the same as first screw actuator assembly 53. With reference to FIGS. 13, 15 and 22, second screw actuator assembly 56 includes: first 121 and second 352 screws that each extend vertically upward from respective first 355 and second 139 screw transfer gear boxes, and engage threadingly with respective first 124 and second 358 threaded eyelets; first 361 and second 127 guide rods that each extend vertically upward from the upper surface 47 of the platform 50, and engage slidingly with respective first 364 and second 130 non-threaded eyelets; and a primary transfer gear box 133 having first 367 and second 136 lateral shafts that each engage respectively with the first 355 and second 139 screw transfer gear boxes. Rather than having a single box frame (such as box frame 59 of first screw actuator assembly 53) second screw actuator assembly 56 has two separate box frames 100 and 103. Box frame 100 contains first screw 121 and first guide rod 361, and box frame 103 contains second screw 352 and second guide rod 127 of second screw actuator assembly 56.

The first and second screw actuator assemblies may each be driven independently or in concert, and may be manually or mechanically driven. Typically, the first and second screw actuator assemblies are each mechanically driven, and more typically mechanically driven in concert. Separate motors may be used to drive each screw actuator assembly. In an embodiment and with reference to FIGS. 13 and 22, the first 53 and second 56 screw actuator assemblies are driven in concert by means of a single drive motor 106. Drive motor 106 may be selected from known motors, and is typically an electric motor. Drive motor 106 has a drive shaft 109 (only partially visible in the drawings) that extends outward therefrom and engages with a global transfer gear box 112 that has a first global lateral shaft 115 that extends outward therefrom and engages with primary transfer gear box 91 of first screw actuator assembly 53. Global transfer gear box 112 has a second global lateral shaft 118 that extends outward therefrom, passes through/under support structure 41 and engages with the primary transfer gear box 133 of second screw actuator assembly 56.

When activated and engaged, drive motor 106 turns drive shaft 109, which through global transfer gear box 112 causes the first 115 and second 118 global lateral shafts to turn. First global lateral shaft 115, through primary transfer gear box 91, causes the first 94 and second 97 shafts to turn, which through first 65 and second 79 screw transfer gear boxes causes the first 62 and second 77 screws of first screw actuator assembly 53 to turn. At the same time, second global lateral shaft 118, through primary transfer gear box 133, causes the first 367 and second 136 global lateral shafts of the second screw actuator assembly 56 to turn, which correspondingly through the first 355 and second 139 screw transfer boxes thereof cause the first 121 and second 352 screws of the second screw actuator assembly 56 to turn. The screws (62 and 77; 121 and 352) engage threadingly with their respective threaded eyelets (68 and 85; 124 and 358) and thus cause frame 35 to move vertically up or down, depending, for example, on which way drive motor 106 and drive shaft 109 are turned. Further, correspondingly, the non-threaded guide rods (71 and 82; 361 and 127) engage slidingly with their respective non-threaded eyelets (74 and 88; 364 and 130) so as to stabilize the vertical movement of frame 35. As a result of the arrangement of the various shafts and transfer gear boxes, the first and second screw actuator assemblies are driven controllably in concert.

The mold apparatus of the present invention also includes at least one sheet retainer 148. With reference to FIGS. 17 through 21, each sheet retainer has a clamp portion 151 that faces towards (or in the direction of) perimeter edge 17 of first mold portion 11. Clamp portion 151 includes a clamp member 154 and a clamp interior 157. Clamp member 154 is reversibly closeable. Clamp interior 157 is defined in part by clamp member 154, and more particularly at least in part by interior (or under) surface 160 of clamp member 154. Clamp interior 157 may be defined by a combination of interior surface 160 of clamp member 154 and: the portion of upper surface 38 of frame 35 residing there-under; or more typically the upper surface of a forward portion of a base plate of sheet retainer 148 residing there-under, as will be discussed in further detail herein. Each sheet retainer 148 is independently, reversibly and laterally attached to the upper surface 38 of frame 35, such that clamp portion 151 is reversibly and laterally positionable relative to perimeter edge 17 of first mold portion 11.

Figure 17:
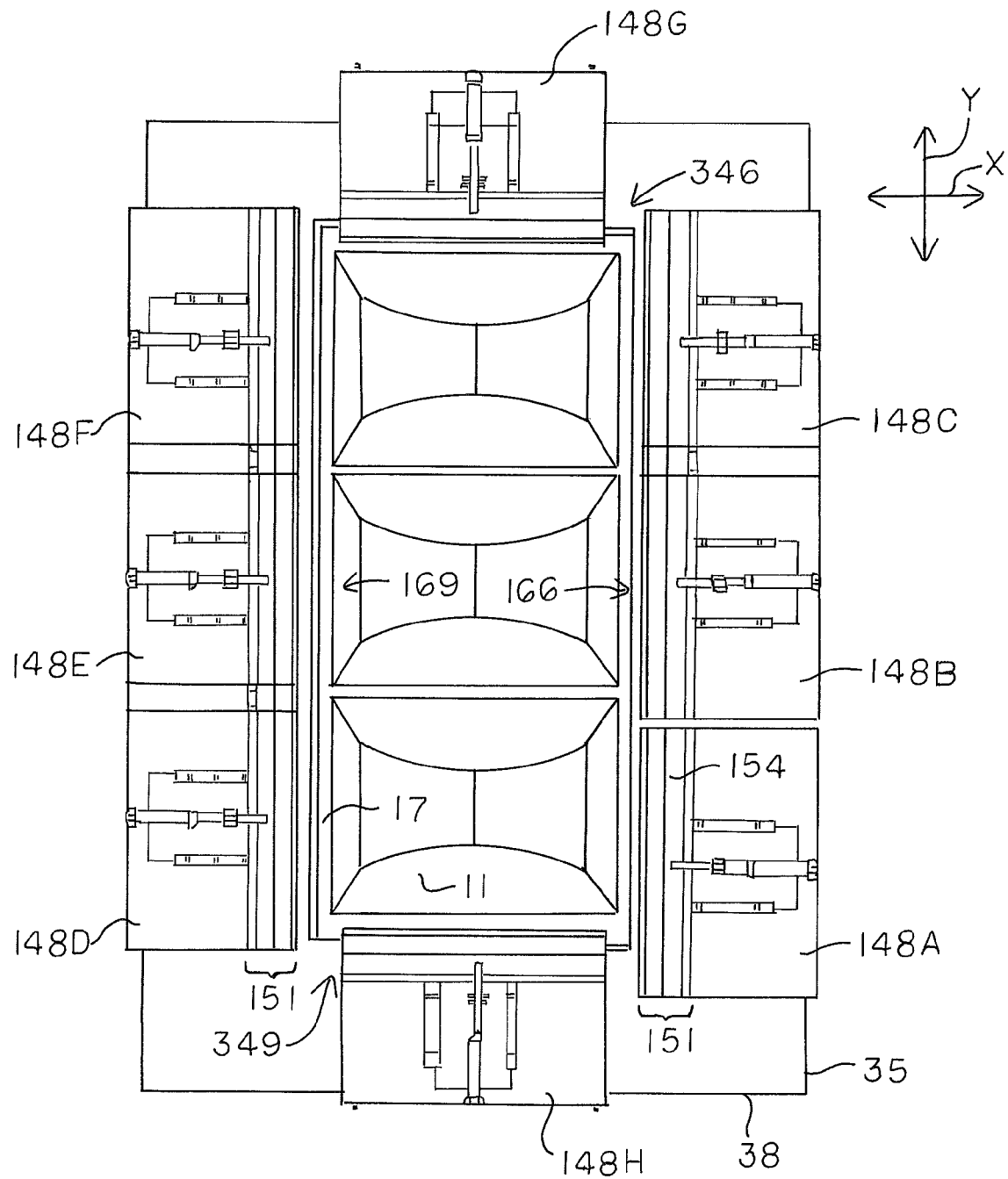
FIG. 17 is a representative top plan view of the first mold portion, frame and sheet retainers alone, with the frame positioned substantially near the bottom of its vertical drop, and showing the sheet retainers in various lateral positions relative to the perimeter edge of the first mold portion.

While the mold apparatus of the present invention includes at least one sheet retainer, it more typically includes at least two separate and independent sheet retainers (e.g., 2, 3, 4, 5, 6, 7, 8, 9, 10 or more separate and independent sheet retainers). The sheet retainers 148 may be positioned in any arrangement (e.g., symmetrically or asymmetrically) on frame 35 around opening 163, provided the clamp portion 151 of each sheet retainer faces or is oriented towards (in the direction of) perimeter edge 17 of first mold portion 11. In an embodiment, the mold apparatus includes eight sheet retainers 148A, 148B, 148C, 148D, 148E, 148F, 148G and 148H. See, for example, FIG. 17. First mold portion 11 has a generally rectangular plan view shape, and the sheet retainers are arranged symmetrically along the long sides and at the ends of the first mold portion, with: sheet retainers 148A, 148B and 148C positioned along first long side 166 of first mold portion 11; sheet retainers 148D, 148E and 148F positioned along second long side 169 of first mold portion 11; sheet retainer 148G positioned at first end 346; and sheet retainer 148H positioned at second end 349 (FIG. 17). The sheet retainers along first long side 166 (148A, 148B and 148C) are located in substantially opposing symmetrical relation relative to the sheet retainers along second long side 169 (148D, 148E and 148F). The sheet retainer 148G at first end 346 is located in substantially opposing symmetrical relation relative to the sheet retainer 148H at opposite second end 349.

Sheet retainer 148 may further include a base plate 172 having an upper surface 175, a lower surface 178 and a forward portion 181. See, in particular, FIG. 20. Clamp member 154 is hingedly attached to an upper surface 183 of forward portion 181 of base plate 172. More particularly, clamp member 154 is attached to upper surface 183 by means of a hinge member 185 that engages hingedly (or rotationally) with hinge retainers 188 and 191, which are opposingly positioned on (relative to each other) and extend upwardly from upper surface 183 of forward portion 181. Clamp portion 151 of sheet retainer 148 is defined by clamp member 154 and forward portion 181 of base plate 172. The upper surface 183 of forward portion 181 of base plate 172 and inner surface 160 of clamp member 154 together define clamp interior 157.

Figure 21:
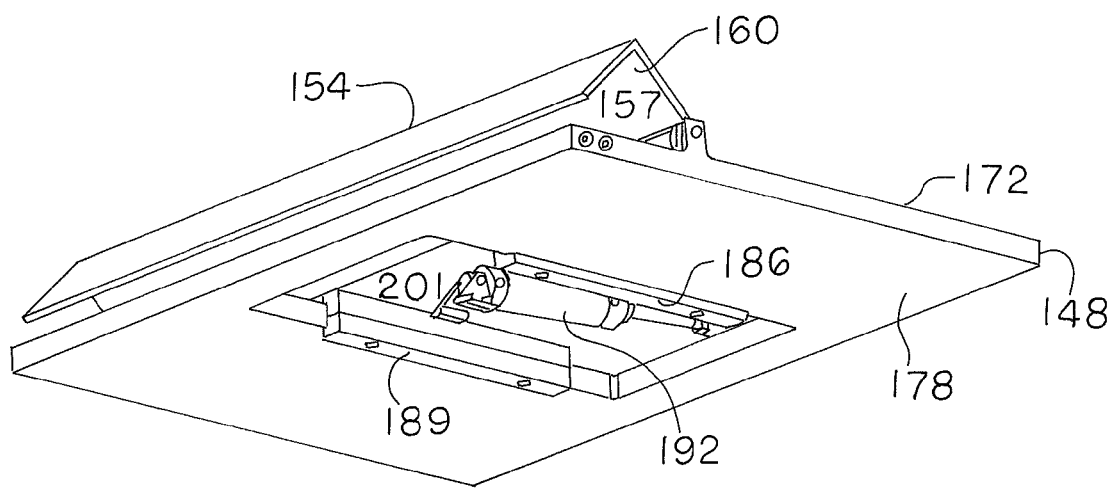
FIG. 21 is a perspective view towards the forward portion of the sheet retainer of FIG. 19 showing the underside of the sheet retainer.

At least a portion of lower surface 178 of base plate 172 is in sliding and abutting relationship with upper surface 38 of frame 35. In an embodiment, sheet retainer 148 further includes at least one elongated guide extending from lower surface 178 of base plate 172, which is received within a suitably dimensioned groove or slot (not shown) within upper surface 38 of frame 35. The elongated guides are oriented laterally outward from (e.g., orthogonal to) perimeter edge 17 of first mold portion 11, and provide improved control (e.g., orientation) over the reversible lateral movement of the sheet retainers with the apparatus and in the method of the present invention. With reference to FIG. 21, sheet retainer 148 has a first elongated guide 186 and a second elongated guide 189 extending outward (downward) from lower surface 178 of base plate 172, which are slidingly received within suitably dimensioned grooves or slots (not shown) within upper surface 38 of frame 35. Sliding receipt of the elongated guides (186, 189) within the grooves in upper surface 38 of frame 35, serves to maintain sheet retainer 148 in a desired orientation (e.g., clamp portion 151 facing towards perimeter edge 17 of first mold portion 11) as it is reversibly laterally repositioned in the method of the present invention.

Reversible lateral movement of each sheet retainer may be achieved manually, or more typically mechanically. Sheet retainer 148 further includes, in an embodiment and with reference to FIGS. 19 and 20, a first linear actuator 192 having a first end 195 and a second end 198. Linear actuators, as used with regard to the sheet retainer, may be selected from art-recognized devices, such as linear screw actuators, hydraulic linear actuators, pneumatic linear actuators and combinations thereof. Base plate 172 of sheet retainer 148 further includes a slot (or elongated hole/aperture) 201 and a rear portion 204 having an upper surface 207.

First end 195 of first linear actuator 192 is located within slot 201 and is fixedly attached to upper surface 38 of frame 35. First end 195 of first linear actuator 192 is typically pivotally attached to a bracket 210 that is attached to upper surface 38 of frame 35. Pivotal attachment between first end 195 and bracket 210 may be achieved by art-recognized means, such as a pin extending laterally through bracket 210 and a hole in first end 195. Second end 198 of first linear actuator 192 is fixedly attached to upper surface 207 of rear portion 204 of base plate 172. More typically, second end 198 of first linear actuator 192 is pivotally attached to a bracket 213 which extends upward from upper surface 207 of rear portion 204 of base plate 172. Pivotal attachment between second end 198 and bracket 213 may be achieved by art-recognized means, such as a pin 237 extending laterally through bracket 213 and a hole in second end 198.

First linear actuator 192, as depicted in the drawings, includes a cylinder 216 containing a piston (not visible) and a reversibly retractable arm 219 that is threadingly connected to second end 198. Reversible linear expansion of first linear actuator 192 provides reversible lateral movement of sheet retainer 148 relative to perimeter edge 17 of first mold portion 11. More particularly, as retractable arm 219 is extended, sheet retainer 148 is laterally (e.g., along the x-axis in the case of sheet retainer 148A, or along the y-axis in the case of sheet retainer 148G) moved away from perimeter edge 17 of first mold portion 11. Correspondingly, as retractable arm 219 is retracted within cylinder 216, sheet retainer 148 is laterally (e.g., along the x-axis in the case of sheet retainer 148A, or along the y-axis in the case of sheet retainer 148G) moved towards perimeter edge 17 of first mold portion 11. See, for example, FIG. 17.

Clamp member 154 of sheet retainer 148 may be manually or, more typically, mechanically reversibly closed/opened. Sheet retainer 148 further includes, in an embodiment and with further reference to FIGS. 19 and 20, a second linear actuator 222 having a first end 225 and a second end 228. As with the first linear actuator 192, second linear actuator 222 is reversibly linearly expandable, and may be selected from known linear actuators, such as linear screw actuators, hydraulic linear actuators, pneumatic linear actuators and combinations thereof.

First end 225 of second linear actuator 222 is pivotally attached to the exterior surface 231 of clamp member 154. More typically, first end 225 of second linear actuator 222 is pivotally attached to a bracket or extension 234 that extends outwardly from exterior surface 231 of clamp member 154. As depicted in the drawings, first end 225 of second linear actuator 222 is in the form of a bracket, into which extension 234 is received, and pivotal attachment there-between may be achieved by art-recognized methods, such as a pin attached to first end 225 and extending through a hole in extension 234 (not visible in the drawing figures). Second end 228 of second linear actuator 222 is attached to upper surface 207 of rear portion 204 of base plate 172. Typically, second end 228 is pivotally attached to a bracket (e.g., bracket 213) that extends upwardly from upper surface 207 of rear portion 204 of base plate 172. Pivotal attachment between second end 228 and bracket 213 may be achieved by art-recognized methods, such as a pin extending through bracket 213 and second end 228.

In an embodiment, second end 198 of first linear actuator 192 and second end 228 of second linear actuator 222 are both attached to the same bracket (e.g., bracket 213). In this particular embodiment, and as depicted in the drawings, second end 228 of second linear actuator is pivotally attached to an upper portion of bracket 213, and second end 198 of first linear actuator 192 is attached to a lower portion of bracket 213, beneath the attachment point of second end 228.

Second linear actuator 222, as depicted in the drawings, includes a cylinder 240 containing a piston (not visible) and a reversibly retractable/extendable arm 243 that is threadingly connected to first end 225. Reversible linear expansion of second linear actuator 222 provides reversible closing (and, correspondingly, opening) of clamp member 154. In particular, as reversibly retractable arm 243 is extended, clamp member 154 is moved to or towards a closed position, and correspondingly as reversibly retractable arm 243 is retracted (within cylinder 240) clamp member 154 is moved to or towards an open position.

Figure 20:
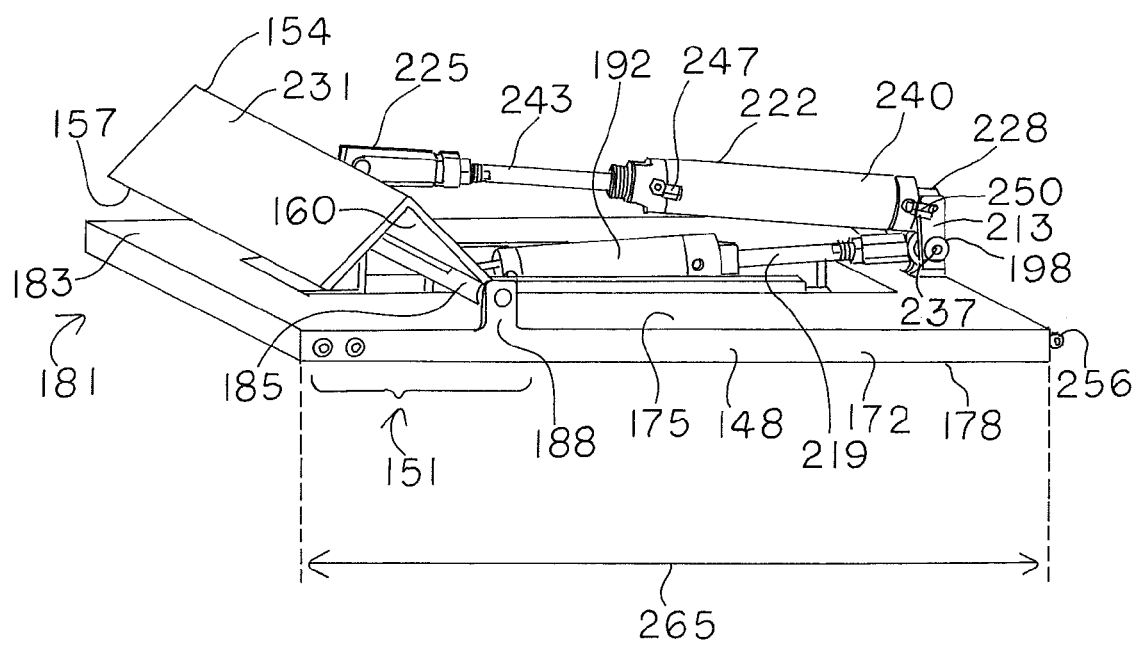
FIG. 20 is a perspective view towards the forward portion of the sheet retainer of FIG. 19.

In the case of hydraulic and/or pneumatically driven linear actuators, the linear actuators of the sheet retainer may be fitted with ports through which a fluid (e.g., air and/or a liquid, such as hydraulic fluid/oil) are introduced (typically, under elevated pressure) for purposes of linearly expanding and retracting the linear actuator. With reference to FIG. 20, and for purposes of illustration, second linear actuator 222 includes a first port 247 and a second port 250 through which a fluid (e.g., air and/or a liquid, such as oil) may be introduced, under elevated pressure, for purposes of linearly extending and retracting arm 243, and thereby reversibly closing and opening clamp member 154. First linear actuator 192 may be similarly fitted with such ports (not shown).

As with the first and second linear actuators of the sheet retainers, the linear actuator of the sheet guide apparatus may be fitted with ports through which one or more fluids (e.g., air and/or a liquid, such as hydraulic fluid/oil) are introduced (typically, under elevated pressure) for purposes of linearly expanding and retracting the linear actuator. With reference to FIG. 5, linear actuator 495 of sheet guide apparatus 456 includes a first port 677 and a second port 680 through which a fluid (e.g., air and/or a liquid, such as oil) may be introduced, under elevated pressure, for purposes of linearly extending and retracting arm 507.

In an embodiment, and as discussed previously herein, frame 35 may reside on and be supported by an underlying frame support 36. Outer edge 142 of frame 35 is dimensioned so as to be inward relative to outer edge 145 of frame support 36. The inward positioning of outer edge 142 of frame 35 relative to outer edge 145 of frame support 36 may be selected such that reversible lateral movement of the sheet retainers results in rear portion 204 of each sheet retainer 148 moving laterally over, above and separated from upper surface 37 of support frame 36. See, for example, FIGS. 11, 17 and 18. More particularly, in this embodiment, that portion of lower surface 178 residing in (or under) rear portion 204 of base plate 172 is moved laterally over, above and separated from upper surface 37 of support frame 36. Such an arrangement may be desirable for reasons including, but not limited to, allowing lubricant to be applied to lower surface 178 of base plate 172, including, for example, elongated guides 186 and 189, while the sheet retainers 148 are in use (e.g., in the course of performing the method of the present invention).

During the sheet molding process of the present invention, a portion of a heated multilayered thermoplastic sheet is contacted with the clamp interior 157 of the clamp portion 151 of the sheet retainer 148, as will be discussed further herein. Typically, a portion of the heated thermoplastic sheet is contacted with upper surface 183 of forward portion 181 before and after clamp member 154 is clamped down and the heated sheet thus being retained within clamp interior 157. To prevent or minimize fouling of the clamp portion 151 of the sheet retainer 148 (e.g., by molten or nearly molten thermoplastic material being retained thereon), it may be desirable to provide temperature control (e.g., cooling) to at least the forward portion 181 of sheet retainer 148. In an embodiment, base plate 172 of sheet retainer 148 is provided with at least one enclosed passage 253 which extends into forward portion 181 of base plate 172. See, for example, sheet retainer 148B of FIG. 18, in which the terminal points of enclosed passage 253 are depicted in rear portion 204 of base plate 172. The enclosed channel may extend through base plate 172, or it may be in the form of a conduit (not shown) attached to the exterior surface (e.g., upper surface 175) of base plate 172.

Enclosed passage 253 is dimensioned for the receipt and passage of a heat exchange fluid therethrough. The heat exchange fluid may be selected from those known to the skilled artisan, such as water, glycols (e.g., alkylene glycols, such as ethylene glycol, propylene glycol and/or poly-alkylene glycols), alcohols (e.g., methanol, ethanol, n-propanol and/or iso-propanol), and mixtures thereof. For example, and with reference to FIG. 19, a heat exchange fluid may be drawn from the reservoir of a heat exchanger (not shown), introduced through port 256 and removed through port 259 (and returned to the reservoir of the heat exchanger). The heat exchange fluid is typically introduced into enclosed passage 253 at a reduced temperature (e.g., a temperature less than that of the heated multilayered thermoplastic sheet, such as less than or equal to room temperature, 20° C., 15° C. or 10° C.). The heat exchange fluid passes through enclosed passage 253 into forward portion 181 (not depicted in the drawings) and serves to remove heat energy therefrom, as the heat exchange fluid is removed from port 259.

The sheet retainers, and the various components thereof, such as the base plate and clamp member, may be fabricated from any suitable rigid material. For example, each sheet retainer may be fabricated from metals, thermoset plastic materials, thermoplastic materials, ceramic materials and combinations thereof. Typically, the sheet retainers are fabricated from metals (e.g., steel).

Figure 19:
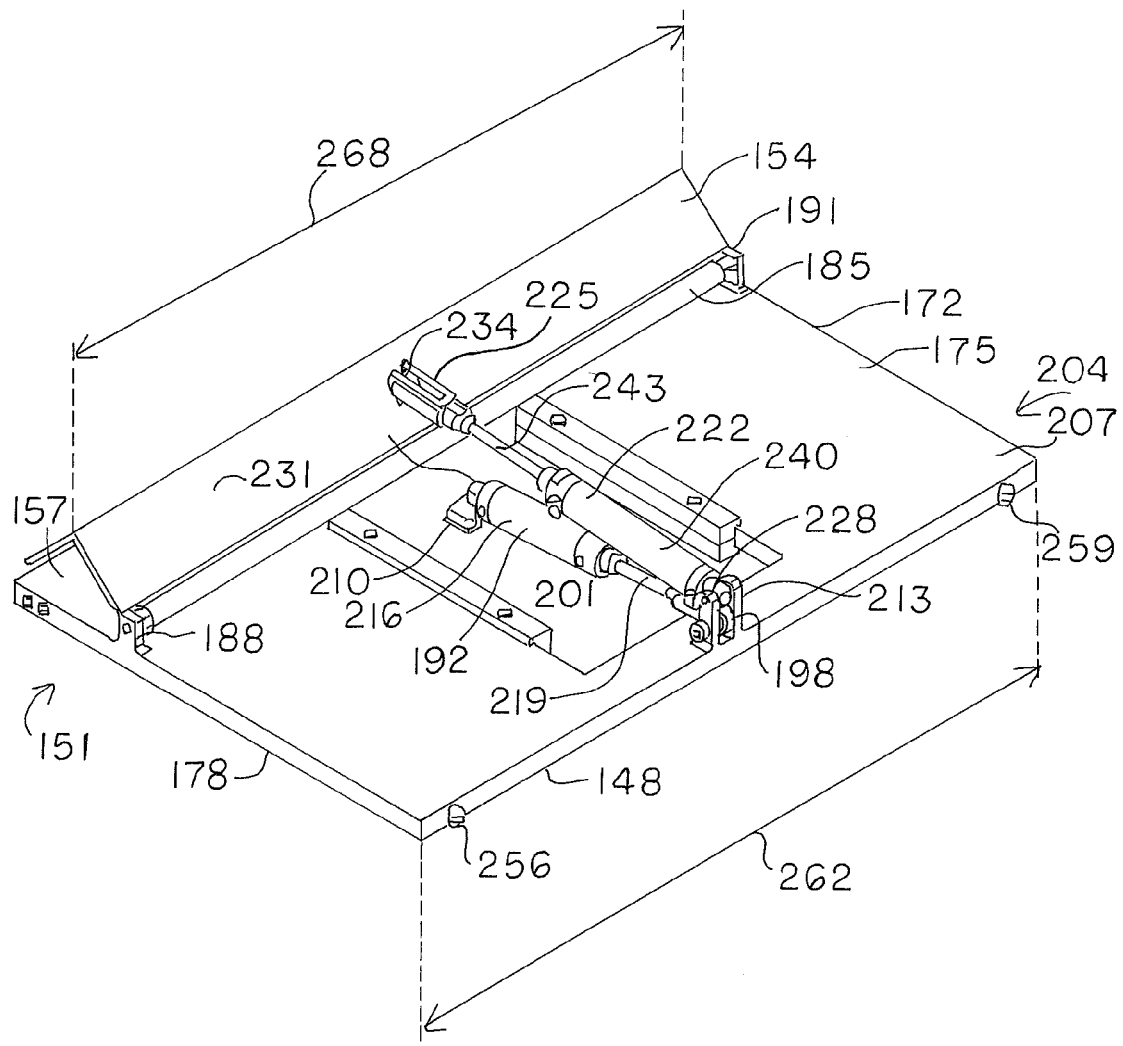
FIG. 19 is a representative perspective view towards the rear portion of a sheet retainer according to the present invention.

The sheet retainers may have any suitable dimension, provided they are able to retain a portion of the heated multilayered thermoplastic sheet within the clamp portion thereof. With reference to FIGS. 19 and 20, base plate 172 typically has a width 262 of from 7.62 cm to 127 cm, more typically from 15.24 cm to 101.6 cm, and further typically from 30.48 cm to 60.96 cm. In an embodiment, base plate 172 has a width 262 of 50.75 cm. Base plate 172 typically has a length 265 of from 7.62 cm to 127 cm, more typically from 15.24 cm to 101.6 cm, and further typically from 30.48 cm to 60.96 cm. In an embodiment, base plate 172 has a length 265 of 45.72 cm. Clamp member 154 typically has a width 268 of from 7.62 cm to 127 cm, more typically from 15.24 cm to 101.6 cm, and further typically from 30.48 cm to 60.96 cm. In an embodiment, clamp member 154 has a width 268 of 50.75 cm, which is substantially equivalent to the width 262 of base plate 172. Alternatively, the rear portion 204 and the forward portion 181 of base plate 172 may have different widths 262. For example, width 262 of rear portion 204 may be greater than (or less than) width 262 of forward portion 181.

The sheet die (e.g., 274), and first mold portion 11, frame 35 and the sheet retainers 148 may be positioned relative to each other in any suitable way, provided that the heated multilayered thermoplastic sheet 292 extending downstream from the elongated sheet slot of the sheet die (e.g., 274) may be contacted with the clamp interior 157 of each sheet retainer 148 and interior mold surface 14 of first mold portion 11. For example, sheet die 274 may be positioned so as to produce a heated thermoplastic sheet (e.g., 423) that is melt-bonded with first plastic sheet 411 (as previously described) so as to result in the continuous formation of heated multilayered thermoplastic sheet 292, which extends downstream from the elongated sheet slot of the sheet die (e.g., dropping gravitationally downward, as depicted), and first mold portion 11, frame 35 and the sheet retainers 148 may together be positioned vertically (not depicted) so as to be parallel with the plane of the gravitationally dropping heated multilayered thermoplastic sheet.

In an embodiment of the present invention and as depicted in the drawings, first mold portion 11, frame 35 and the sheet retainers 148 are together positioned in a plane beneath sheet die 274 (e.g., the plane defined by the x- and y-axes shown in FIG. 11). For purposes of reference, perimeter edge 17 lies substantially within the plane defined by the x- and y-axes of FIG. 11. As the heated multilayered thermoplastic sheet 292 is formed (by melt-bonding of the heated thermoplastic sheet 423 and first plastic sheet 411 together) and extends downstream (e.g., dropping vertically and gravitationally downward) from the elongated sheet slot of sheet die 274: (i) sheet die 274 may be reversibly moveable within a plane above the plane in which first mold portion 11, frame 25 and each sheet retainer 148 resides; and/or (ii) first mold portion 11, frame 35 and each sheet retainer 148 may together be reversibly positionable in the plane beneath sheet die 274. Such relative movement of sheet die 274, and first mold portion 11, frame 35 and each sheet retainer 148 provides for contact of second sheet surface 298 with clamp interior 157, and optionally interior mold surface 14 of first mold portion 11. Sheet die 274 may be reversibly moveable by known means, such as on tracks or rails (not shown).

In an embodiment of the present invention, first mold portion 11, frame 35 and each sheet retainer 148 are together positioned and are reversibly moveable in a plane beneath sheet die 274, and sheet die 274 is substantially stationary.

To achieve reversible lateral movement of first mold portion 11, frame 35 and the sheet retainers 148 in concert in the plane beneath sheet die 274, first mold portion 11, frame 35 and each sheet retainer 148 together reside on platform 50. As described previously herein, first mold portion 11 rests on support structure 41, which includes a plurality of I-beams 44 extending upwardly from upper surface 47 of platform 50. Sheet retainers 148 rest on upper surface 38 of frame 35, which rests on support frame 36, which is (reversibly vertically) supported by the first and second screw actuator assemblies (53 and 56), which are attached to upper surface 47 of platform 50, as described previously herein in further detail. Platform 50 is positioned and reversibly moveable in the plane beneath sheet die 274 along the y-axis (e.g., as represented by the two headed arrow 301 of FIG. 11).

Platform 50 may be reversibly moveable in the plane beneath sheet die 274 by known locomotion means, such as skids, tracks, wheels alone, wheels in conjunction with rails, and combinations thereof (not shown). Platform 50 may be more particularly described as including a top plate 51, and upper surface 47 being the upper surface of top plate 51. Top plate 51 may itself be vertically and reversibly positionable (e.g., by pistons, not shown), such that everything residing on and/or attached to upper surface 47 (e.g., first mold portion 11, frame 35, sheet retainers 148, the first and second screw actuator assemblies 53 and 56, etc.) is vertically repositionable in concert along the z-axis. Vertically positioning the first mold portion 11, frame 35 and sheet retainers 148 together in concert may be undertaken for reasons including, but not limited to, positioning the clamp interiors 157 of each sheet retainer 148, and optionally interior surface 14 of first mold portion 11 closer to or further from sheet die 274, and more particularly closer to/further from the slot of sheet die 274 from which the heated thermoplastic sheet 292 emerges. Such vertical positioning of top plate 51 may be desirable for reasons including, but not limited to, controlling the thickness of the heated thermoplastic sheet 292 as it is contacted with clamp interiors 157 and interior surface 14 of first mold portion 11, and achieving such contact prior to necking of the extruded/heated multilayered thermoplastic sheet 292, as will be discussed in further detail herein.

In the method of the present invention, initially first mold portion 11 and frame 35 (along with sheet retainers 148) are positioned relative to each other such that upper surface 38 of frame 35 is located above perimeter edge 17 of first mold portion. See, for example, FIGS. 11 and 12. When the first mold portion is a first male mold portion (as depicted in the drawings), the initial position of the upper surface of the frame may be, in addition to being above the perimeter edge: (i) above the upper terminus of the interior mold surface of the first male mold portion; or (ii) above the perimeter edge and below the upper terminus of the interior mold surface of the first male mold portion. As depicted in the drawing figures, the upper surface 38 of frame 35 is initially positioned above perimeter edge 17 and above the upper terminus of interior mold surface 14. In the case of a female first mold portion (that is substantially recessed below the perimeter edge), the initial position of the frame is such that the upper surface thereof is above the perimeter edge and interior mold surface of the first female mold portion.

The relative positioning of frame 35 and first mold portion 11 may be achieved in accordance with the description provide previously herein. For example, the first and second screw actuator assemblies (53, 56) may be activated (e.g., by motor 106, and the various shafts and transfer gear boxes) so as to move frame support 36 and frame 35 (and, correspondingly, sheet retainers 148) vertically upward along the z-axis, such that upper surface 38 of frame 35 resides above perimeter edge 17, and as depicted in the drawings, the upper terminus of interior surface 14 of first mold portion 11.

The clamp member 154 of each sheet retainer 148 is adjusted to an open position, in the method of the present invention. Each clamp member 154 is positioned in an open position so as to provide access to each clamp interior 157, in particular from above each sheet retainer 148. See, for example, clamp member 154 of sheet retainer 148C of FIG. 18, and the clamp members 154 of each sheet retainer 148A-148C visible in FIG. 13, all of which are in an open position. In an embodiment, arm 243 of second linear actuator 222 is retracted (e.g., within cylinder 240), which serves to draw clamp member 154 rotationally backwards on hinge member 185, thus positioning clamp member 154 in an open position.

A heated thermoplastic sheet (e.g., 423) having a first surface (e.g., 432) and a second surface (e.g., 435) is formed from at least one thermoplastic composition, in the method of the present invention. A first plastic sheet (e.g., 411) is melt-bonded to the first surface (e.g., 432) of the heated thermoplastic sheet (e.g., 423), which results in the continuous formation of a heated multilayered thermoplastic sheet (e.g., 292) having a first surface (e.g., 295) that is defined at least in part by the first surface (e.g., 417) of the first plastic sheet (e.g., 411) and a second surface (e.g., 298). The heated multilayered thermoplastic sheet has a temperature that allows it to be thermoformable (e.g., a thermoformable temperature), in particular, when: (i) contacted with and retained within the clamp interior of each sheet retainer; and (ii) contacted and drawn into intimate contoured contact with the interior mold surface of the first mold portion. While the temperature of the heated multilayered thermoplastic sheet may be equal to or greater than the melting point of the multilayered thermoplastic sheet, the temperature of the heated multilayered thermoplastic sheet is more typically equal to or greater than the softening point (or glass transition temperature) of the multilayered thermoplastic sheet, and less than the melting point of the multilayered thermoplastic sheet.

Upon emerging from the sheet die, and, more particularly, the elongated sheet slot (e.g., 426 or 659) of the sheet die (e.g., 429 or 650), the heated thermoplastic sheet (e.g., 423) typically has a thickness of from 0.5 mm to 25 mm, more typically from 1.5 mm to 15 mm, and further typically from 6 mm to 12 mm. In an embodiment of the present invention, upon emerging from the elongated sheet slot of the sheet die, the heated thermoplastic sheet (e.g., 423) has a thickness of 9 mm. During the process of extending the heated multilayered thermoplastic sheet over and bringing it into contour matching contact with the interior mold surface of the first mold portion, the thickness of the heated multilayered thermoplastic sheet is typically reduced (relative to the heated thermoplastic sheet upon emerging from the sheet die slot). The shaped multilayered molded article prepared by the method of the present invention, typically has a thickness of from 0.25 mm to 12.5 mm, more typically from 0.75 mm to 8 mm, and further typically from 3 mm to 6 mm. In an embodiment of the present invention, the shaped multilayered molded article prepared by the method of the present invention has an average thickness of 4.5 mm.

The heated thermoplastic sheet and correspondingly the heated multilayered thermoplastic sheet formed by the method of the present invention may have any suitable width and length. Since the heated thermoplastic sheet is typically formed by means of a sheet die, the width thereof typically depends on and is limited by the width of the sheet die, and more particularly the width of the elongated sheet slot of the sheet die. The heated thermoplastic sheet and correspondingly the heated multilayered thermoplastic sheet may have a width of, for example, from 2.5 cm to 5 m, or from 31 cm to 3 m, or from 61 cm to 2 m. The heated multilayered thermoplastic sheet may have any suitable length, since it is typically formed continuously in the method of the present invention. For example, the heated multilayered thermoplastic sheet may have a length of from 31 cm to 10 m, or from 61 cm to 8 m. In a particular embodiment of the present invention, the heated multilayered thermoplastic sheet has a width of 3 m (about 10 feet), and a length of 5 m (about 16.5 feet).

The heated multilayered thermoplastic sheet 292 extends downstream from the elongated sheet slot of the sheet die (e.g., 274) such that the second surface 298 thereof faces (e.g., is in facing opposition to) the clamp interiors 157 of the sheet retainers 148 and interior mold surface 14 of first mold portion 11. The first surface 295 of heated multilayered thermoplastic sheet 292 faces away from (e.g., upward away from) the clamp interiors 157 of the sheet retainers 148 and interior mold surface 14.

The second surface 298 of the heated multilayered thermoplastic sheet 292, and the heated multilayered thermoplastic sheet 292 itself, may be described with regard to the present invention as having a first portion, a second portion, and a third portion. For purposes of illustration, and with reference to FIG. 23, first portion 304 of second surface 298 of heated multilayered thermoplastic sheet 292 is located generally near or towards the terminal edges 307 of sheet 292. Second portion 310 of second surface 298 is located generally in a central area of heated multilayered thermoplastic sheet 292. Third portion 313 of second surface 298 is located generally in an area between (e.g., interposed between) first portion 304 and second portion 310 of heated multilayered thermoplastic sheet 292. The first surface 295 also may be similarly described as having first 304, second 310 and third 313 portions that are on the opposite side (i.e., on first surface 295) relative to second surface 298 of heated multilayered thermoplastic sheet 292. In addition, the heated multilayered thermoplastic sheet 292 may be described more generally as having first 304, second 310 and third 313 portions corresponding to those portions as depicted in FIG. 23.

A first portion (e.g., 304) of the second surface 298 of the heated multilayered thermoplastic sheet is contacted with the clamp interior 157 of the clamp portion 151 of at least one sheet retainer 148, in the method of the present invention. Typically, as the heated multilayered thermoplastic sheet 292 is formed, it is sequentially contacted with the clamp interiors 157 of successively arranged sheet retainers 148. For example, as the heated multilayered thermoplastic sheet 292 extends downstream (or downward) from the elongated sheet slot of the sheet die (e.g., 274), frame 35, sheet retainers 148 and first mold portion 11 may be moved laterally (e.g., along the y-axis, FIG. 11) in a plane beneath sheet die 274 (as described previously herein), e.g., in the direction of arrow 302 of FIG. 13. With reference to FIGS. 11 and 13, as heated multilayered thermoplastic sheet 292 is formed and frame 35 and first mold portion 11 are moved laterally there-under, the first portion 304 of second surface 298 of heated multilayered thermoplastic sheet 292 is brought successively into contact with the clamp interior of sheet retainers 148 in the following sequential order: sheet retainer 148G; sheet retainers 148C and 148F; then sheet retainers 148B and 148E; sheet retainers 148A and 148D; and finally sheet retainer 148H.

In the method of the present invention, the clamp member 154 is next moved to a closed position so as to clamp and retain the first portion of the heated multilayered thermoplastic sheet received within the clamp interior 157. More particularly, a portion of clamp member 154 is brought into abutting and clamping/retaining relationship with first portion 304 of first surface 295 of heated multilayered thermoplastic sheet 292, while at the same time first portion 304 of second surface 298 of sheet 292 is retainingly abutted against upper surface 183 of forward portion 181 of base plate 172 of sheet retainer 148.

The clamp members of the sheet retainers may all be moved in unison to the closed position after the heated multilayered thermoplastic sheet has been contacted with the clamp interior of all the sheet retainers. For example, the clamp members 154 of sheet retainers 148A-148H may be moved to a closed position in unison. Alternatively, the clamp members of the sheet retainers may be sequentially moved to the closed position as the first portion of the second surface of the heated multilayered thermoplastic sheet is brought into successive contact with the clamp interiors of the sheet retainers. For example, the clamp members 154 of each sheet retainer 148 being moved to a closed position in the following sequential order: sheet retainer 148G; sheet retainers 148C and 148F; then sheet retainers 148B and 148E; sheet retainers 148A and 148D; and finally sheet retainer 148H.

In an embodiment, arm 243 of second linear actuator 222 is extended (e.g., out of cylinder 240), which serves to move clamp member 154 rotationally forward on hinge member 185, thus positioning clamp member 154 in a closed position.

Figure 14:
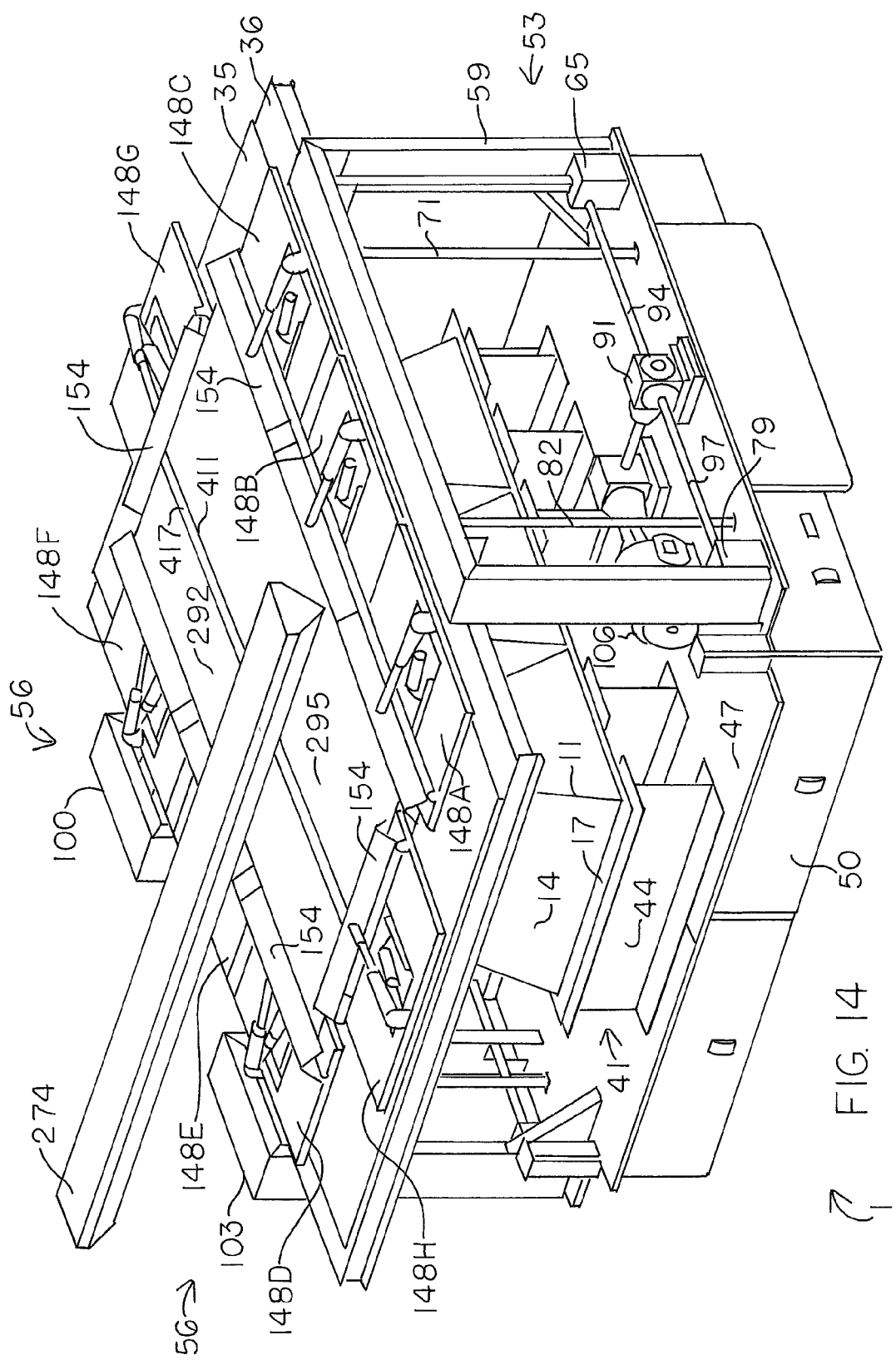
FIG. 14 is a representative perspective view of the sheet molding apparatus of FIG. 13, in which the heated multilayered thermoplastic sheet has been separated from the sheet die and is retained within the clamp portions of each sheet retainer.
Figure 18:
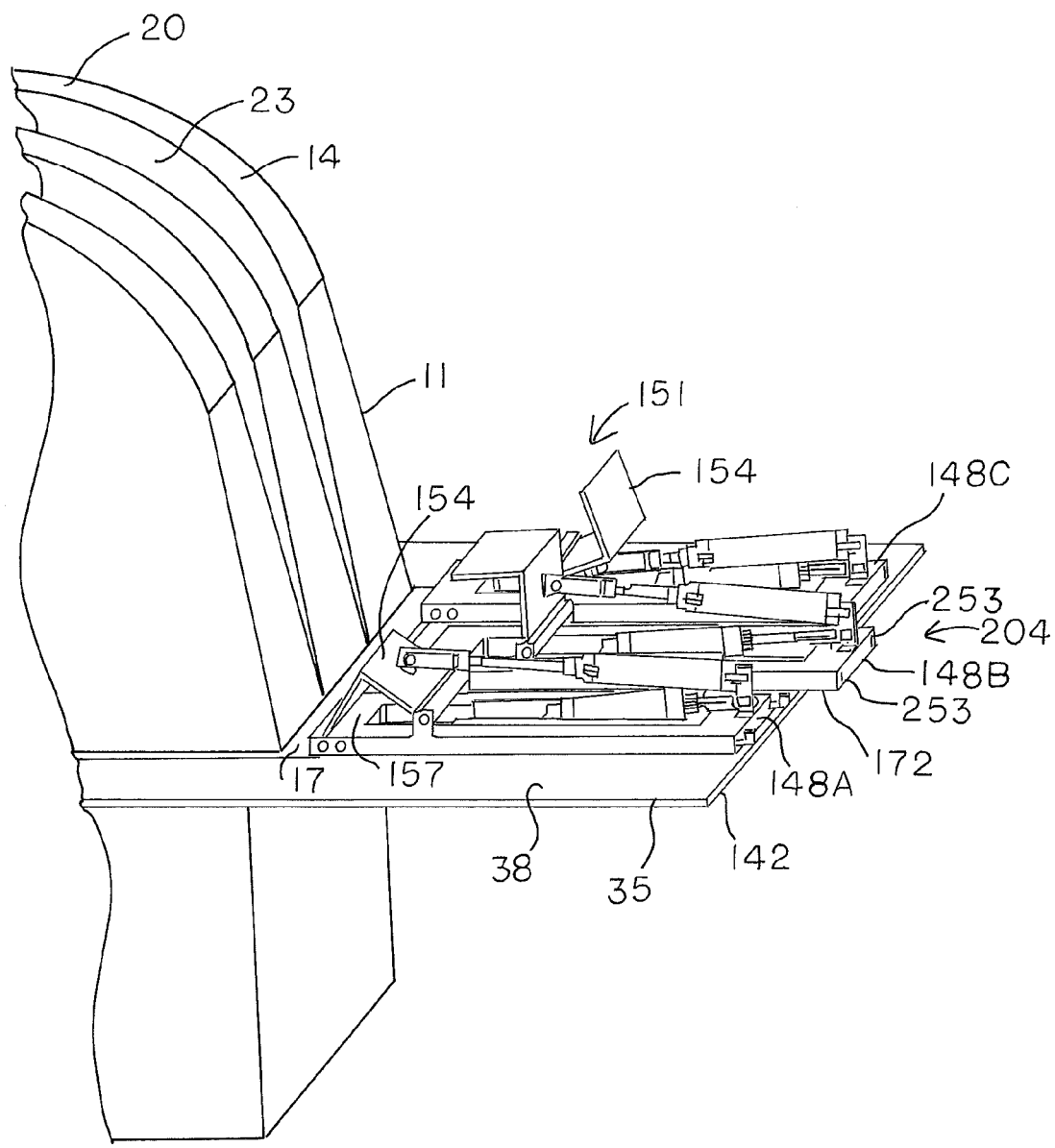
FIG. 18 is a representative partial cut-away perspective view of a first mold portion, frame and sheet retainer arrangement similar to that of FIG. 17, showing the clamp members of the sheet retainers in various stages between open and closed positions.

See for example, clamp member 154 of sheet retainer 148A of FIG. 18, which is in a closed position. With reference to FIG. 14, the clamp members 154 of all eight sheet retainers 148A-148H are in a closed position, with the first portion of the heated multilayered thermoplastic sheet 292 clamped and retained within the clamp interior 157 of each sheet retainer. In addition, in FIG. 14, the heated multilayered thermoplastic sheet 292 that is retained within the sheet retainers of frame 35, has been separated from sheet die 274. While not depicted in FIG. 14, a portion of heated multilayered thermoplastic sheet 292 may still be extending from the elongated sheet slot of sheet die 274, but separated from the heated multilayered thermoplastic sheet 292 retained within the sheet retainers 248.

As described previously herein, clamp interior 157 may be defined by a combination of interior surface 160 of clamp member 154 and: (i) that portion of upper surface 38 of frame 35 residing there-under; and/or (ii) upper surface 183 of forward portion 181 of base plate 172 of the sheet retainer. In an embodiment, the first portion of the heated multilayered thermoplastic sheet is retained within clamp interior 157, which is defined by a combination of interior surface 160 of clamp member 154 and upper surface 183 of forward portion 181 of base plate 172 of the sheet retainer. Accordingly, the first portion of the heated multilayered thermoplastic sheet is clamped/retained between at least a portion of interior surface 160 of clamp member 154 and upper surface 183 of forward portion 181 of base plate 172 of the sheet retainer.

With the first portion of the heated multilayered thermoplastic sheet retained within the clamp interiors of the sheet retainers, first mold portion 11 and frame 35 are positioned relative to each other so as to contact a second portion of the second surface (e.g., 310, FIG. 23) of heated multilayered thermoplastic sheet 292 with at least a portion of the interior mold surface 14 of first mold portion 11. To achieve contact of the second portion of the second surface of the heated multilayered thermoplastic sheet with at least a portion of the interior mold surface: (i) first mold portion 11 may be vertically repositionable (e.g., moved upward along the z-axis), while frame 35 and sheet retainers 148 are vertically stationary; (ii) first mold portion 11 is vertically stationary, while frame 35 and sheet retainers 148 are vertically repositionable (e.g., moved downward along the z-axis); or (iii) first mold portion 11 may be vertically repositionable (e.g., moved upward along the z-axis), while at the same time frame 35 and sheet retainers 148 are vertically repositionable (e.g., moved downward along the z-axis).

In an embodiment, and with reference to FIGS. 14 and 15, first mold portion 11 is substantially stationary relative to vertical positioning, and frame 35 (along with sheet retainers 148) is reversibly and controllably vertically positionable (e.g., along the z-axis). In this embodiment, frame 35 (and correspondingly sheet retainers 148) is reversibly, controllably and vertically positioned (e.g., vertically downward along the z-axis) relative to the vertically stationary first mold portion 11, thereby resulting in contact of the second portion (e.g., 310) of the second surface (298) of the heated multilayered thermoplastic sheet 292 with at least a portion of the interior mold surface 14 of first mold portion 11. Frame 35 along with the sheet retainers 148 may be moved along the z-axis so as to be positioned below the perimeter edge 17 of first mold potion 11. Frame 35 may be reversibly and vertically positioned by means of the first and second screw actuator assembles (53, 56) in accordance with the description as provided previously herein.

Depending on the initial position of frame 35 relative to interior mold surface 14, contact of the second portion of the second surface of the heated multilayered thermoplastic sheet with at least a portion of the interior mold surface of the first mold portion, may occur prior to, concurrently with or subsequently to contact (or clamping retention) of the first portion of the second surface of the heated multilayered thermoplastic sheet with/within the clamp interior 157 of the clamp portion 151 of the sheet retainers 148. For example, frame 35 may be initially positioned such that the upper surface 38 thereof is above perimeter edge 17 and below the upper terminus of interior mold surface 14 of the first mold portion 11 (in the case of a male first mold portion), in which case the second portion of the second surface of the heated multilayered thermoplastic sheet may contact a portion of the interior mold surface prior to or concurrently with contact and/or retention of the second portion of the heated sheet with/within the clamp interiors. In an embodiment of the present invention, contact of the second portion of the second surface of the heated multilayered thermoplastic sheet with at least a portion of the interior mold surface of the first mold portion, occurs after contact (or clamping retention) of the first portion of the second surface of the heated multilayered thermoplastic sheet with/within the clamp interior 157 of the clamp portion 151 of the sheet retainers 148.

Prior to, concurrently with or subsequent to contact of the second portion of the second surface of the heated multilayered thermoplastic sheet with at least a portion of the interior mold surface of the first mold portion, each sheet retainer (with a first portion of the heated sheet retained within the clamp interior thereof) is independently laterally moved to a lateral position selected from the perimeter edge 17 and/or away from the perimeter edge 17 of first mold portion 11. For example, as frame 35 is moved vertically downward (and the second surface of the heated multilayered thermoplastic sheet is brought into contact with at least a portion of the interior mold surface of the first mold portion) each sheet retainer 148 may be continually and/or intermittently laterally repositioned relative to (i.e., towards and/or away from) perimeter edge 17 of first mold portion 14. Alternatively, each sheet retainer 148 may be independently laterally repositioned relative to perimeter edge 17, prior to frame 35 being moved vertically downward, and the second surface of the heated multilayered thermoplastic sheet correspondingly being brought into contact with at least a portion of the interior mold surface of the first mold portion. Further alternatively, each sheet retainer 148 may be independently laterally repositioned relative to perimeter edge 17, after frame 35 has been moved vertically downward (e.g., at the bottom of its vertical stroke), and the second surface of the heated multilayered thermoplastic sheet correspondingly has been brought into contact with at least a portion of the interior mold surface of the first mold portion.

In a particular embodiment of the method of the present invention, the step of laterally moving at least one sheet retainer to a lateral position (relative to the perimeter edge of the mold), is performed at least one of prior to, substantially concurrently with and after the step of: positioning the first mold portion and the frame relative to each other so as to contact the second portion of the second surface of said heated multilayered thermoplastic sheet with at least a portion of the interior mold surface of the first mold portion. More particularly, the step of laterally moving at least one sheet retainer to its relative lateral position, is performed substantially concurrently with and/or after the step of relative positioning the first mold portion and the frame. Still further particularly, the step of laterally moving at least one sheet retainer to its relative lateral position, is performed substantially concurrently with the step of relative positioning (e.g., vertical positioning) of the first mold portion and the frame.

In an embodiment of the present invention and as described previously herein, each sheet retainer may be independently laterally repositioned by means of extending or retracting reversibly retractable arm 219 of first linear actuator 192. For example, as arm 219 is extended out of cylinder 216, sheet retainer 148 is moved laterally along the x-axis away from perimeter edge 17 of first mold portion 11. Correspondingly, as arm 219 is retracted within cylinder 216, sheet retainer 148 is moved laterally along the x-axis towards or in the direction of perimeter edge 17 of first mold portion 11.

Lateral movement of the sheet retainer(s) (with the first portion of the heated multilayered thermoplastic sheet retained/clamped within the clamp interiors thereof) serves to control the thickness of at least a portion of the second portion of the heated multilayered thermoplastic sheet that is contacted with the interior mold surface of the first mold portion. In addition, lateral movement of the sheet retainer(s) (with the first portion of the heated sheet retained/clamped within the clamp interiors thereof) also assists and enhances the intimate contour matching contact of the second portion of the second surface of the heated multilayered thermoplastic sheet with the interior mold surface of the first mold portion.

Without intending to be bound by any theory, and based on the evidence at hand, it is believed that as a sheet retainer is moved laterally towards the perimeter edge of the first mold portion, a greater amount of heated sheet material is made available as the heated sheet is brought into contact with the interior mold surface (whether the mold is a male or female mold). A greater amount of heated multilayered thermoplastic material being present over that portion of the mold where the sheet retainer is moved towards the mold, results in increased sheet thickness in that area (and accordingly a molded article having increased thickness in that area). Correspondingly, as a sheet retainer is moved laterally away from the perimeter edge of the first mold portion, a lesser amount of heated sheet material is made available as the heated sheet is brought into contact with the interior mold surface (whether the mold is a male or female mold). A lesser amount of heated multilayered thermoplastic material being present over that portion of the mold where a sheet retainer is move away from the mold, results in decreased sheet thickness in that area (and, accordingly, a molded article having decreased thickness in that area).

In the case of a plurality of laterally repositionable sheet retainers (e.g., 148A-H) being located around the perimeter edge of the mold, the thickness of the heated multilayered thermoplastic sheet may be varied in/over different areas of the mold, as the result of, for example, some sheet retainers being moved towards the perimeter edge, while others are moved away from the perimeter edge of the mold.

In the case of a first mold portion having a complex interior mold surface, for example, having portions that may be characterized as male, and other portions that may be characterized as female, some sheet retainers may be moved laterally towards the perimeter edge, while other sheet retainers are moved laterally away from the perimeter edge. For example, those sheet retainers that are adjacent to male interior mold surface portions, may be moved laterally away from the perimeter edge; while those sheet retainers that are adjacent to female interior mold surface portions, may be moved laterally towards the perimeter edge; or visa versa. Alternatively, or in addition thereto, the lateral position of one or more sheet retainers may be adjusted (e.g., serial adjustments and/or continual adjustments) as the second surface of the heated multilayered thermoplastic sheet is brought into contact with the interior surface of the mold, such positions being selected from towards the mold perimeter edge, away from the mold perimeter edge, and any combination, order or additional combinations thereof (e.g., towards, away and towards; or away, towards and away).

Each sheet retainer, as discussed previously, may be laterally repositioned in the method of the present invention so as to effect control of the thickness of the heated multilayered thermoplastic sheet over various portions of the interior mold surface of the first mold portion. In an embodiment, each sheet retainer may be moved through a lateral distance (e.g., towards or away from the mold perimeter edge) that is typically from 2.54 cm to 91.44 cm, more typically from 5.08 cm to 60.96 cm, and further typically from 7.62 cm to 30.48 cm. In an embodiment, each sheet retainer may be moved through a lateral distance (e.g., towards or away from the mold perimeter edge) of approximately 19.05 cm.

Figure 16:
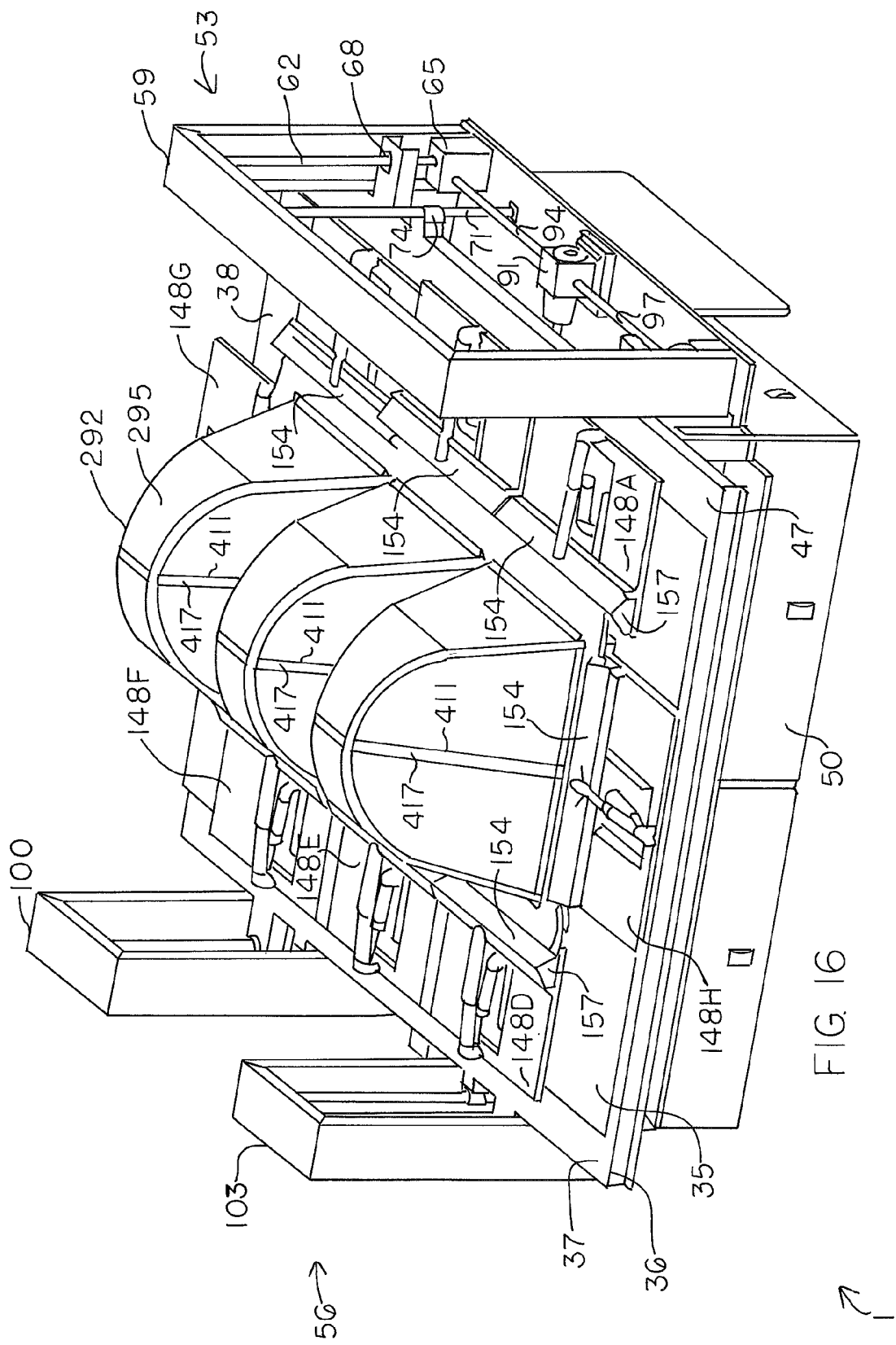
FIG. 16 is a representative perspective view of the sheet molding apparatus of FIG. 15 in which the heated multilayered thermoplastic sheet has been drawn by reduced pressure into contour matching contact with the interior surface of the first mold portion, while still being held within the clamp portions of the sheet retainers.

With at least a portion of the second portion of the second surface of the heated multilayered thermoplastic sheet in contact with at least a portion of the interior mold surface of the first mold portion, reduced pressure is drawn (e.g., by means of first vacuum apparatus 29 and conduit 32) through the plurality of perforations (e.g., 26) of the interior mold surface. The second portion of the second surface of the heated thermoplastic sheet is drawn (as a result of the reduced pressure) into intimate contact with and matches the contour of the interior mold surface. See, for example, FIG. 16.

The interior mold surface of the first mold portion may optionally be heated so as to assist matching of the second portion of the second surface of the heated multilayered thermoplastic sheet with the contoured interior mold surface. As a result of, however, the residual heat retained within the heated multilayered thermoplastic sheet (e.g., due to its use upon continuous formation as it extends downstream from the elongated sheet slot of the sheet die), separately heating the interior mold surface of the first mold portion is typically not required in the method of the present invention. In addition, in light of the residual heat retained within the heated multilayered thermoplastic sheet, separate or external heating of the heated multilayered thermoplastic sheet is typically not required in the method of the present invention.

While maintained in intimate contour matching contact with the interior mold surface, the heated multilayered thermoplastic sheet is cooled. Cooling of the heated multilayered thermoplastic sheet results in the formation of a shaped multilayered article (i.e., a shaped multilayered thermoplastic sheet) that retains the contour of the interior mold surface of the first mold portion. The heated multilayered thermoplastic sheet is typically cooled to a temperature that is less than the softening point or glass transition temperature of the multilayered thermoplastic sheet. When cooled to a temperature below its softening point or glass transition temperature, the multilayered thermoplastic sheet is no longer thermoformable, and as such retains the contoured shape of the interior mold surface.

Cooling of the heated multilayered thermoplastic sheet may be achieved by known means, as discussed previously herein. For example, cool air may be passed over the first surface of the heated multilayered thermoplastic sheet, and/or the interior mold surface of the first mold portion may be cooled (e.g., by means of a chilled fluid or coolant being passed through conduits located under the interior mold surface—not shown).

After the multilayered thermoplastic sheet has been sufficiently cooled, the resulting shaped multilayered article (or molded multilayered article) is removed from the first mold portion. Removal of the shaped multilayered article from the first mold portion may be achieved by art-recognized methods. For example, one or more ejector cores (not shown) may extend reversibly outward from the interior mold surface, in effect pushing the shaped multilayered article off of and away from the first mold portion. Alternatively, or in addition thereto, a gas (e.g., air) may be passed under pressure through the plurality of perforations (e.g., 26) in the interior mold surface, thereby lifting the shaped multilayered article off of and away from the first mold portion.

In accordance with the method of the present invention, an excess portion of the multilayered thermoplastic sheet extends from the perimeter edge (e.g., 17) of the first mold portion 11 into the clamp interior 157 of the clamp portion 151 of the sheet retainer(s) 148. This excess portion of the multilayered thermoplastic sheet may be used to assist removal of the shaped multilayered article (or molded multilayered article) from the interior surface of the first mold portion. In an embodiment of the present invention and with reference to FIG. 16, after the multilayered thermoplastic sheet has cooled and hardened and with the excess portion of the multilayered thermoplastic sheet within (e.g., retained within) the clamp interior 157 of the clamp portion 151 of the sheet retainer(s) 148, frame support 36 and frame 35 are moved vertically upward, which results in the shaped multilayered article (292) being lifted off of and removed from interior surface 14 of first mold portion 11. With the excess portion of the multilayered thermoplastic sheet within the clamp portion of the sheet retainers, frame 35 may be moved vertically upward any suitable distance so as to effect separation of the shaped multilayered thermoplastic sheet from the first mold portion, such as 5%, 10%, 25%, 50%, 75% or 100% of the total vertical distance that frame 35 is moved in the method of the present invention (e.g., the total vertical distance traveled as depicted between FIG. 11 and FIG. 16).

The excess portion of the multilayered thermoplastic sheet extending from the perimeter edge of the first mold portion into the clamp interior 157 of the clamp portion 151 of the sheet retainer(s) 148, is typically detached along the perimeter edge at some point after the heated multilayered thermoplastic sheet has been drawn by reduced pressure into intimate contour matching contact with the interior mold surface of the first mold portion. The excess multilayered thermoplastic sheet material may be detached prior to or after the shaped multilayered thermoplastic sheet is removed from the first mold portion. Typically, the excess multilayered thermoplastic sheet material is detached after removal of the shaped multilayered article from the first mold portion.

The excess multilayered thermoplastic sheet material may optionally be detached after the shaped multilayered thermoplastic sheet is removed from the first mold portion. The excess thermoplastic sheet material may, for example, be used to secure and transport the shaped multilayered thermoplastic sheet (shaped/molded multilayered article) during post-molding operations, such as sanding, applying labels, cutting holes, inserting attachments and/or painting. After completion of the post molding operations, the excess multilayered thermoplastic sheet material may then be detached from the shaped multilayered thermoplastic sheet.

As the heated multilayered thermoplastic sheet extends or drops vertically and gravitationally from the elongated sheet slot of the sheet die, it may be subject to necking, which causes the width of the heated multilayered thermoplastic sheet to decrease. For purposes of illustration, and with reference to FIG. 25, heated multilayered thermoplastic sheet 292 is depicted as exhibiting the phenomenon of necking. As heated multilayered thermoplastic sheet 292 drops through vertical distance 316, a pre-necked portion 319 having an initial width 322 is formed. After heated multilayered thermoplastic sheet 292 drops further through vertical distance 325, the phenomenon of necking occurs and a transition portion 328 is formed having a variably decreasing width. After falling through distance 325, the necking phenomenon is complete and a necked portion 331 having a stabilized width of 334 is formed. Width 334 of necked portion 331 is smaller than width 322 of initial portion 319 of heated multilayered thermoplastic sheet 292.

The phenomenon of sheet necking may have numerous causes, including but not limited to, the molten thermoplastic composition, the configuration of the sheet die (e.g., the shape of its elongated sheet slot), the temperature of the heated thermoplastic sheet as it emerges from the sheet die, and combinations thereof. The phenomenon of necking is typically undesirable, since the resulting reduction in the width of the heated multilayered thermoplastic sheet usually necessitates the use of a wider, heavier and more expensive sheet die.

Figure 25:
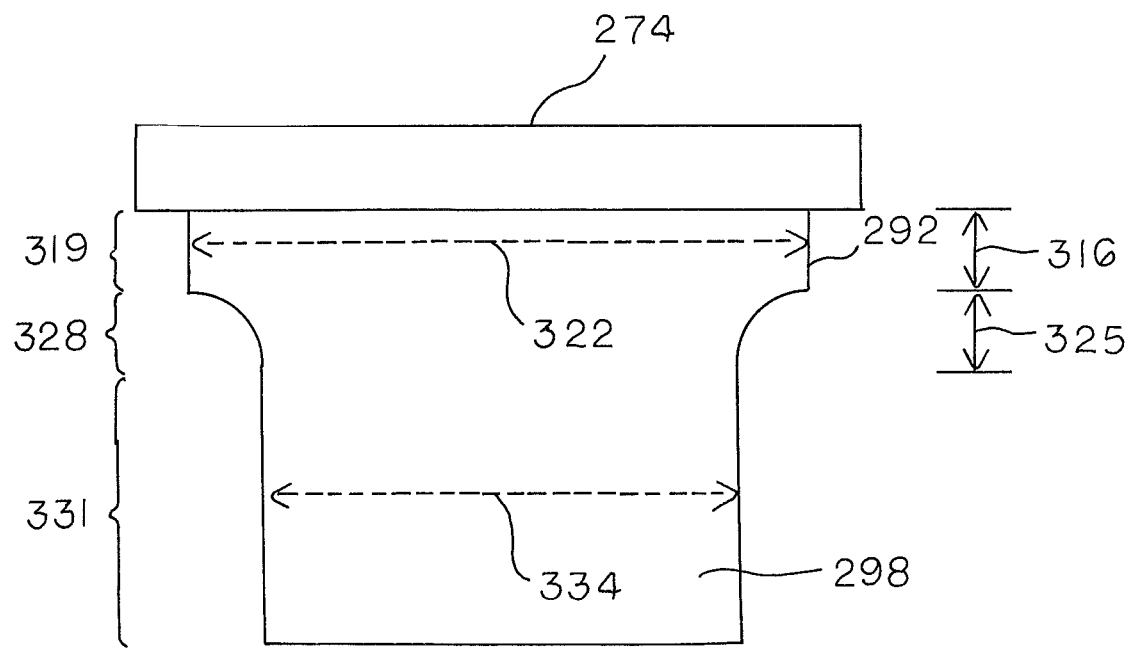
FIG. 25 is a representative elevational view of the second surface of a heated multilayered thermoplastic sheet as it extends downstream from the sheet die, in which the heated multilayered thermoplastic sheet exhibits necking.

In an embodiment of the present invention, the step of contacting the first portion of the second surface of the heated multilayered thermoplastic sheet with the clamp interior 157 of the clamp portion 151 of the sheet retainer 148 (and optionally clamping/retaining the sheet within the clamp interior) occurs prior to necking of the heated multilayered thermoplastic sheet. Contacting the heated multilayered thermoplastic sheet with the clamp interior of the sheet retainer (and optionally further clamping the heated sheet therein) prior to necking, substantially prevents necking of the heated multilayered thermoplastic sheet. With further reference to FIG. 25, for example, when the first portion of the second surface 298 of heated multilayered thermoplastic sheet 292 is contacted with and optionally clamped/retained within the clamp interior of a sheet retainer within vertical distance 316 (i.e., before necking occurs), necking of the heated multilayered thermoplastic sheet is substantially prevented, and the heated multilayered thermoplastic sheet retains its initial (non-necked) width 322.

As discussed previously with regard to the sheet molding apparatus, in an embodiment of the method of the present invention, the first mold portion, the frame and correspondingly the sheet retainers are together positioned and moveable in a plane (e.g., the plane defined by the x- and y-axes of FIG. 1) beneath the sheet die, and the sheet die is substantially stationary.

In this particular embodiment, the method further includes moving the first mold portion, the frame and the sheet retainers together in the plane beneath the sheet die as the heated multilayered thermoplastic sheet is formed, thereby facilitating contact between the heated multilayered thermoplastic sheet and the clamp interior of each sheet retainer and the interior mold surface of the first mold portion. As the first mold portion and sheet retainers are moved beneath the sheet die, the heated multilayered thermoplastic sheet is in effect draped there-across. See, for example, FIGS. 11 through 14. With reference to FIG. 13, the linear speed at which the first mold portion 11, frame 35 and sheet retainers 148 are moved beneath sheet die 274 (e.g., on platform 50 in the direction indicated by arrow 302), and the rate at which heated multilayered thermoplastic sheet 292 is continuously formed downstream relative to sheet die 274, may together be controlled so as to control the thickness of the heated multilayered thermoplastic sheet 292 as it is draped across the mold and clamp interiors of the sheet retainers. The rate of linear movement and rate of heated multilayered thermoplastic sheet formation may each be variably and independently controlled so as to vary the thickness of the heated multilayered thermoplastic sheet across the interior mold surface.

In FIGS. 13 and 14, for purposes of clarity, heated multilayered thermoplastic sheet 292 is depicted as being rigid. Since heated multilayered thermoplastic sheet 292 has a temperature that is at least greater than its softening point, in practice, heated multilayered thermoplastic sheet 292 more typically drapes across the clamp interiors 157 of the sheet retainers 148 and optionally a portion of interior mold surface 14 (rather than rigidly residing thereon/therein and/or thereover).

In the method of the present invention, the heated multilayered thermoplastic sheet is typically detached from the sheet die at some point after it has been contacted with the clamp interiors of the sheet retainers, and before the shaped multilayered article is removed from the first mold portion. In an embodiment, the method includes detaching the heated multilayered thermoplastic sheet from the sheet die prior to, concurrently with or after the step of: positioning the first mold portion and the frame relative to each other so as to contact the second portion of the second surface of the heated multilayered thermoplastic sheet with at least a portion of the interior mold surface of the first mold portion. With reference to FIG. 14, heated multilayered thermoplastic sheet 292 has been detached from sheet die 274: after the first portion of the heated sheet has been retained within the clamp portions of the sheet retainers; and prior to positioning the first mold portion and the frame relative to each other so as to contact the second portion of the second surface of the heated multilayered thermoplastic sheet with at least a portion of the interior mold surface of the first mold portion.

The sheet molding apparatus of the present invention may further include a second mold portion having an interior mold surface, in which case, the method may further include the step of contacting compressively the interior mold surface of the second mold portion with the first surface of the heated multilayered thermoplastic sheet. Contact of the interior mold surface of the second mold portion with the first surface of the heated multilayered thermoplastic sheet, is performed: (i) after the second portion of the second surface of the heated multilayered thermoplastic sheet has been drawn into intimate contour matching contact with the interior mold surface of the first mold portion (by means of reduced pressure drawn through the perforations of the interior mold surface of the first mold portion); and (ii) before cooling of the heated multilayered thermoplastic sheet (and the corresponding formation of the shaped multilayered article).

Figure 24:
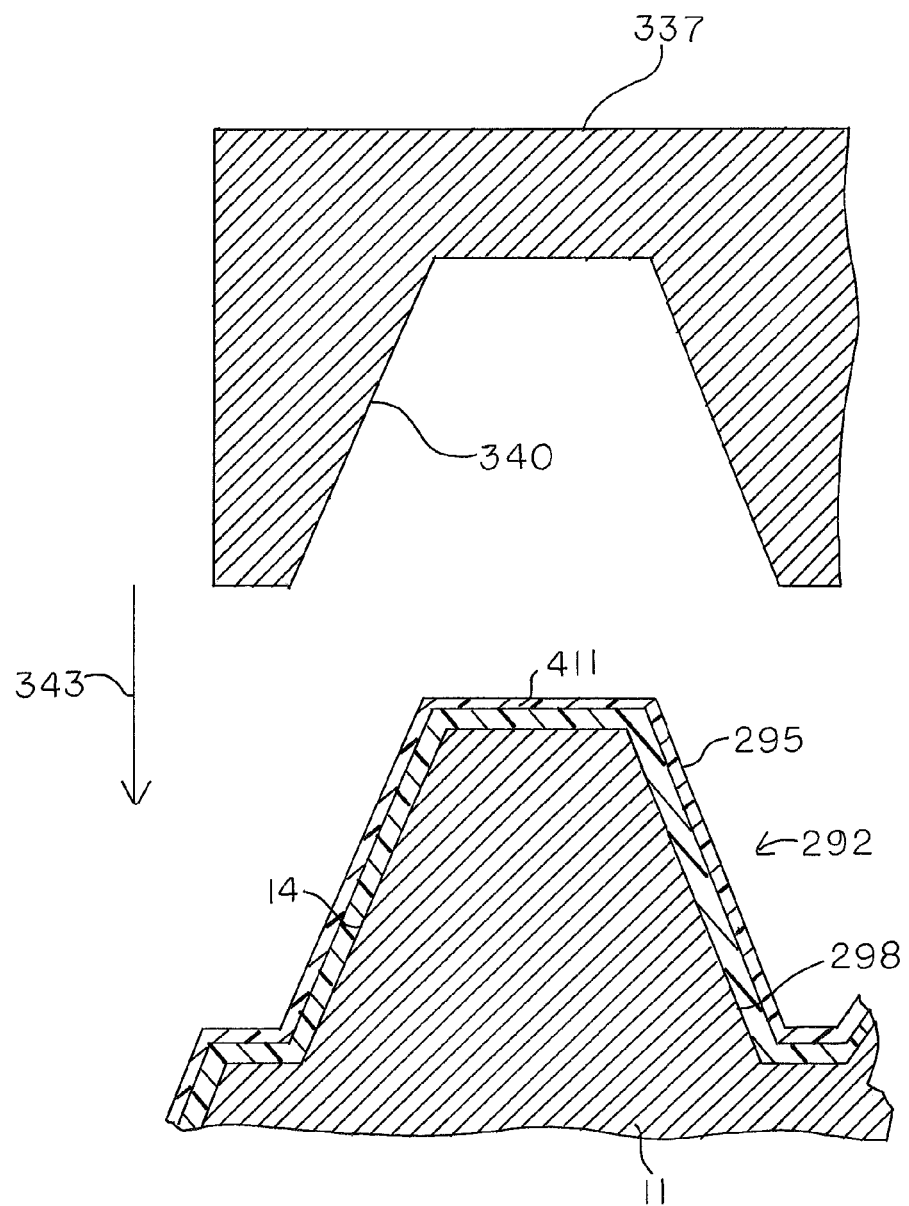
FIG. 24 is a partial side sectional view of a portion of the mold apparatus as depicted in FIG. 16, further including a second mold portion.

With reference to FIG. 24, second mold portion 337 has an interior mold surface 340. First mold portion 11 and second mold portion 337 are reversibly positionable relative to each other (e.g., along arrow 343), such that interior mold surface 14 of first mold portion 11 and interior mold portion 340 of second mold portion 337 are in reversibly positionable facing opposition relative to each other. More particularly, first surface 295 of heated multilayered thermoplastic sheet 292 and interior mold portion 340 of second mold portion 337 are in reversibly positionable facing opposition relative to each other (as depicted). When second mold portion 337 is moved in the direction represented by arrow 343 towards first mold portion 11, interior mold surface 340 of second mold portion 337 compressively contacts first surface 295 of heated multilayered thermoplastic sheet 292. Second mold portion 337 may be moved by known means, such as on vertical rails by means of a piston (not shown). Second mold portion 337 is typically located at a remote compression molding station relative to the heated multilayered thermoplastic sheet formation station (where sheet die 274 is located). Generally, platform 50 is moved by known locomotion means (e.g., on rails, as described previously herein) to the remote compression molding station, and second mold portion 337 is brought into compressive contact with first surface 295 of heated multilayered thermoplastic sheet 292.

Interior mold surface 340 of second mold portion 337 is typically brought into compressive contact with first surface 295 of heated multilayered thermoplastic sheet 292 at a compressive force of 1.0 Kg/cm$^2$ to 4.0 Kg/cm$^2$ (14 to 57 psi), more typically from 1.2 Kg/cm$^2$ to 2.0 Kg/cm$^2$ (17 to 28 psi), and further typically from 1.3 Kg/cm$^2$ to 1.8 Kg/cm$^2$ (19 to 27 psi). In an embodiment, interior mold surface 340 of second mold portion 337 is typically brought into compressive contact with first surface 295 of heated multilayered thermoplastic sheet 292 at a compressive force of 1.5 Kg/cm$^2$ (21 psi).

Contact of the interior mold surface of the second mold portion with the first surface of the heated multilayered thermoplastic sheet may be undertaken for reasons including, but not limited to: imparting surface features into the first surface of the heated multilayered thermoplastic sheet; controlling the thickness of the sheet; and/or smoothing the first surface of the sheet. The interior mold surface of the second mold portion may be smooth, or it may include raised and/or lowered portions.

Certain of the various steps of the method of the present invention, as discussed previously herein, may be performed sequentially as recited, concurrently, or in reverse order. In an embodiment of the method of the present invention, the step of: moving laterally at least one sheet retainer to a lateral position (relative to the perimeter edge of the first mold portion), is performed at least one of prior to, substantially concurrently with and after the step of: positioning the first mold portion and the frame relative to each other so as to contact the second portion of the second surface of the heated multilayered thermoplastic sheet with at least a portion of the interior mold surface of the first mold portion. In a particular embodiment, the step of: moving laterally at least one sheet retainer to its lateral position (relative to the perimeter edge of the first mold portion), is performed substantially concurrently with the step of; positioning the first mold portion and the frame relative to each other so as to contact the second portion of the second surface of the heated multilayered thermoplastic sheet with at least a portion of the interior mold surface of the first mold portion.

In another embodiment of the method of the present invention, the step of: drawing reduced pressure through the plurality of perforations of the interior mold surface of the first mold portion, such that the second portion of the second surface of the heated multilayered thermoplastic sheet substantially matches the contour of the interior mold surface of the first mold portion, is performed one of concurrently with and sequentially after the step of: moving laterally at least one sheet retainer to a lateral position (relative to the perimeter edge of the first mold portion).

The steps of: positioning the first mold portion and the frame relative to each other so as to contact the second portion of the second surface of the heated multilayered thermoplastic sheet with at least a portion of the interior mold surface of the first mold portion; moving laterally at least one sheet retainer to its lateral position (relative to the perimeter edge of the first mold portion); and drawing reduced pressure through the plurality of perforations of the interior mold surface of the first mold portion, such that the second portion of the second surface of the heated multilayered thermoplastic sheet substantially matches the contour of the interior mold surface of the first mold portion, may, in an embodiment, be performed substantially concurrently.

In the method of the present invention, the step of drawing the second portion of the second surface of the heated multilayered thermoplastic sheet into intimate contour matching contact (via reduced pressure) with the interior mold surface of the first mold portion may be assisted or enhanced by forming a seal between the second surface of the heated multilayered thermoplastic sheet and the perimeter edge of the first mold portion. In particular, a third portion (e.g., 313 of FIG. 23) of the second surface 298 of the heated multilayered thermoplastic sheet 292 is contacted with the perimeter edge 17 (and, in particular, the entire perimeter edge) of the first mold portion 11, thereby forming a seal between the third portion and the perimeter edge. After or concurrently with formation of the sheet-perimeter edge seal, the step of drawing reduced pressure through the perforations (e.g., 26) of the interior surface (e.g., 14) of the first mold portion may then be undertaken. A vacuum or near vacuum may be formed in the enclosed/sealed space defined by the second portion of the second surface of the heated multilayered thermoplastic sheet and the interior mold surface, as reduced pressure is drawn through the perforations of the interior mold surface. The formation of the vacuum or near vacuum, thus results in the heated multilayered thermoplastic sheet being efficiently drawn down onto the interior mold surface.

In the method of the present invention, the heated thermoplastic sheet is formed (e.g., by melt compounding/extrusion) from at least one thermoplastic composition, and the first plastic sheet and optional second plastic sheet each comprise a thermoplastic layer that defines the second surface thereof. The thermoplastic composition and thermoplastic layers (of the first and second plastic sheets) each independently include at least one thermoplastic material. As used herein and in the claims, the term "thermoplastic material" and similar terms, means a plastic material that has a softening and melting point, and is substantially free of a three dimensional crosslinked network resulting from the formation of covalent bonds between chemically reactive groups, e.g., active hydrogen groups and free isocyanate groups. Examples of thermoplastic materials that may be included in the thermoplastic composition from which the heated thermoplastic sheet (e.g., 423) is prepared, and thermoplastic layers of the first and second plastic sheets include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-styrene-acrylate and combinations thereof (e.g., blends and/or alloys of at least two thereof).

In an embodiment of the present invention, the thermoplastic material of each thermoplastic composition, and the thermoplastic layers of the first and second plastic sheets is independently selected in each case from thermoplastic polyolefins. As used herein and in the claims, the term "polyolefin" and similar terms, such as "polyalkylene" and "thermoplastic polyolefin", means polyolefin homopolymers, polyolefin copolymers, homogeneous polyolefins and/or heterogeneous polyolefins. For purposes of illustration, examples of polyolefin copolymers include those prepared from ethylene and one or more $C_3$-$C_{12}$ alpha-olefin, such as, 1-butene, 1-hexene and/or 1-octene.

The polyolefins, from which the thermoplastic material of each thermoplastic composition, and the thermoplastic layers of the first and second plastic sheets, may in each case be independently selected include, but are not limited to, heterogeneous polyolefins, homogeneous polyolefins, and combinations thereof. The term "heterogeneous polyolefin" and similar terms means polyolefins having a relatively wide variation in: (i) molecular weight amongst individual polymer chains (i.e., a polydispersity index of greater than or equal to 3); and (ii) monomer residue distribution (in the case of copolymers) amongst individual polymer chains. The term "polydispersity index" (PDI) means the ratio of $M_w/M_n$, where $M_w$ means weight average molecular weight, and $M_n$ means number average molecular weight, each being determined by means of gel permeation chromatography (GPC) using appropriate standards, such as polyethylene standards. Heterogeneous polyolefins are typically prepared by means of Ziegler-Natta type catalysis in heterogeneous phase.

The term "homogeneous polyolefin" and similar terms means polyolefins having a relatively narrow variation in: (i) molecular weight amongst individual polymer chains (i.e., a polydispersity index of less than 3); and (ii) monomer residue distribution (in the case of copolymers) amongst individual polymer chains. As such, in contrast to heterogeneous polyolefins, homogeneous polyolefins have similar chain lengths amongst individual polymer chains, a relatively even distribution of monomer residues along polymer chain backbones, and a relatively similar distribution of monomer residues amongst individual polymer chain backbones. Homogeneous polyolefins are typically prepared by means of single-site, metallocene or constrained-geometry catalysis. The monomer residue distribution of homogeneous polyolefin copolymers may be characterized by composition distribution breadth index (CDBI) values, which are defined as the weight percent of polymer molecules having a comonomer residue content within 50 percent of the median total molar comonomer content. As such, a polyolefin homopolymer has a CDBI value of 100 percent. For example, homogenous polyethylene/alpha-olefin copolymers typically have CDBI values of greater than 60 percent or greater than 70 percent. Composition distribution breadth index values may be determined by art recognized methods, for example, temperature rising elution fractionation (TREF), as described by Wild et al, Journal of Polymer Science, Poly. Phys. Ed., Vol. 20, p. 441 (1982), or in U.S. Pat. No. 4,798,081, or in U.S. Pat. No. 5,089,321. An example of homogeneous ethylene/alpha-olefin copolymers are SURPASS polyethylenes, commercially available from NOVA Chemicals Inc.

The thermoplastic material of each thermoplastic composition, and the thermoplastic layers of the first and second plastic sheets, may independently and optionally in each case include a reinforcing material selected, for example, from glass fibers, glass beads, carbon fibers, metal flakes, metal fibers, polyamide fibers (e.g., KEVLAR polyamide fibers), cellulosic fibers, nanoparticulate clays, talc and mixtures thereof. If present, the reinforcing material is typically present in a reinforcing amount, e.g., in an amount of from 5 percent by weight to 60 or 70 percent by weight, based on the total weight of the thermoplastic material. The reinforcing fibers, and the glass fibers in particular, may have sizings on their surfaces to improve miscibility and/or adhesion to the thermoplastic materials into which they are incorporated, as is known to the skilled artisan. In an embodiment, the thermoplastic layers of the first and second plastic sheets are in each case free of reinforcing material.

In an embodiment of the invention, the reinforcing material is in the form of fibers (e.g., glass fibers, carbon fibers, metal fibers, polyamide fibers, cellulosic fibers and combinations of two or more thereof). The fibers typically have lengths (e.g., average lengths) of from 0.5 inches to 4 inches (1.27 cm to 10.16 cm). The heated thermoplastic sheet (e.g., 423), in particular (since it is typically formed by extrusion) may include fibers having lengths that are at least 50 or 85 percent of the lengths of the fibers that are present in the feed materials from which the heated thermoplastic sheet is prepared, such as from 0.25 inches to 2 or 4 inches (0.64 cm to 5.08 or 10.16 cm). The average length of fibers present in the heated thermoplastic sheet may be determined in accordance with art recognized methods. For example, the heated thermoplastic sheet (e.g., 423) may be pyrolyzed to remove the thermoplastic material, and the remaining or residual fibers microscopically analyzed to determine their average lengths, as is known to the skilled artisan.

Fibers are typically present in the thermoplastic composition from which the heated thermoplastic sheet is prepared in amounts selected independently from 5 to 70 percent by weight, 10 to 60 percent by weight, or 30 to 50 percent by weight (e.g., 40 percent by weight), based on the total weight of the thermoplastic sheet (i.e., the weight of the thermoplastic material, the fiber and any additives). Accordingly, the shaped multilayered article prepared by the method of the present invention may include fibers in amounts of from 5 to 70 percent by weight, 10 to 60 percent by weight, or 30 to 50 percent by weight (e.g., 40 percent by weight), based on the total weight of the shaped multilayered article.

The fibers of the heated thermoplastic sheet (e.g., 423) may have a wide range of diameters. Typically, the fibers have diameters of from 1 to 20 micrometers, or more typically from 1 to 9 micrometers. Generally, each fiber comprises a bundle of individual filaments (or monofilaments). Typically, each fiber is composed of a bundle of 10,000 to 20,000 individual filaments.

Typically, the fibers are uniformly distributed throughout the thermoplastic material of the heated thermoplastic sheet. During mixing of the fibers and the thermoplastic material, the fibers generally form bundles of fibers typically comprising at least 5 fibers per fiber bundle, and preferably less than 10 fibers per fiber bundle. While not intending to be bound by theory, it is believed, based on the evidence at hand, that fiber bundles containing 10 or more fibers may result in a shaped multilayered article having undesirably reduced structural integrity. The level of fiber bundles containing 10 or more fibers per bundle, may be quantified by determining the Degree of Combing present within a molded article. The number of fiber bundles containing 10 or more fibers per bundle is typically determined by microscopic evaluation of a cross section of the molded article, relative to the total number of microscopically observable fibers (which is typically at least 1000). The Degree of Combing is calculated using the following equation: 100×((number of bundles containing 10 or more fibers)/(total number of observed fibers)). Generally, the heated thermoplastic sheet (e.g., 423) and the shaped multilayered article each have a Degree of Combing of less than or equal to 60 percent, and typically less than or equal to 35 percent.

In addition or alternatively to reinforcing material(s), the thermoplastic composition(s), from which the heated thermoplastic sheet is prepared, and the thermoplastic layers of the first and second plastic sheets may optionally and independently include one or more additives. Examples of such additives include, but are not limited to, antioxidants, colorants, e.g., pigments and/or dyes, mold release agents, fillers, e.g., calcium carbonate, ultraviolet light absorbers, fire retardants and mixtures thereof. Additives may be present in the thermoplastic composition and thermoplastic layers in functionally sufficient amounts, e.g., in amounts independently from 0.1 percent by weight to 10 percent by weight, based on the total weight of the thermoplastic composition or thermoplastic layer.

In the method of the present invention, the heated multilayered thermoplastic sheet may be longitudinally and/or transversely stretched by lateral movement of the sheet retainers away from the perimeter edge of the first mold portion, while the heated multilayered thermoplastic sheet is between its glass transition temperature and below its melting temperature. During such stretching operations (e.g., $T_g < T_{(sheet)} < T_m$), the polymer molecules of the heated multilayered thermoplastic sheet, in the solid state, may become orientated in the stretching direction, thereby resulting in improved or increased physical properties (e.g., compressive strength) along the stretching direction. As such, the shaped multilayered article formed in accordance with the method of the present invention may optionally exhibit uniaxial or biaxial orientation (relative to the polymer molecules). In addition, when the thermoplastic composition of the heated thermoplastic sheet, and/or the thermoplastic layer of the first and/or second plastic sheet, include fibers, such as, glass fibers, stretching of the heated multilayered thermoplastic sheet (e.g., under conditions of $T_g < T_{(sheet)} < T_m$), by lateral movement of the sheet retainers away from the mold perimeter edge, may also serve to orient the fibers uniaxilly or biaxially, thereby providing the shaped multilayered article with improved or increased physical properties along the stretching direction. Accordingly, the shaped multilayered article formed in accordance with the method of the present invention may alternatively or additionally exhibit uniaxial or biaxial fiber orientation.

Shaped multilayered articles (or molded multilayered articles) that may be prepared in accordance with the method of the present invention may have complex 3-dimensional shapes, or relatively simple shapes, such as, panels (e.g., wall panels, or wall panel covers). Shaped multilayered articles that may be prepared according to the method of the present invention, include but are not limited to: fluid management structures, such as, fluid/water management chambers, storm/waste water chambers, storm drains and culverts; storage structures; support structures or platforms (e.g., pallets); and shelters (e.g., shelters for domestic pets, such as, dogs and cats).

For purposes of further illustration, the method and apparatus of the present invention may be employed to fabricate/mold shaped multilayered articles, such as, fluid management structures (e.g., fluid/water management chambers and storm/waste water chambers). Fluid management structures, such as, storm/waste water chambers, are typically buried in a porous media, and more typically beneath the ground or earth (e.g., beneath soil, clay and/or aggregate materials), and serve to collect and divert fluid runoff (such as, rain/waste water runoff), thus preventing or minimizing pooling of the runoff on and/or above the ground surface. Since fluid management structures, such as, storm/waste water chambers, are typically buried beneath the ground (e.g., over which heavy motorized vehicles may travel), they must be structurally and dimensionally stable so as to resist collapse due to the weight of the overlaying ground and optional traffic.

Fluid management structures, such as, storm water chambers fabricated using the method and apparatus of the present invention typically include a housing having a longitudinal axis, an arch shaped cross section, a first base side flange, a second base side flange, a plurality of raised lateral arch shaped ribs extending from the first base flange to the second base side flange, a plurality of continuous lateral arch shaped indentations extending from the first base flange to the second base flange, an open bottom, an exterior surface, and an interior surface. Each continuous lateral indentation is interposed between a pair of neighboring raised lateral ribs. The fluid management structure also typically includes a first endplate having an exterior surface and an interior surface, and a second endplate having an exterior surface and an interior surface. The fluid management structure may optionally be free of the first and/or second endplates. The housing, first endplate and second endplate together define a continuous unitary structure (i.e., a continuous unitary molded fluid management structure). The exterior surfaces of each of the housing, the first endplate and the second endplate are in each case defined by the first surface of the multilayered thermoplastic sheet (from which the fluid management structure is molded). The interior surfaces of each of the housing, the first endplate and the second endplate are in each case defined by the second surface of the multilayered thermoplastic sheet (from which the fluid management structure is molded). The interior surfaces of each of the housing, the first endplate and the second endplate together define an interior chamber of the fluid management structure.

The first endplate and the second endplate each independently have at least one opening that is in fluid communication with the interior chamber. The openings may be located anywhere in the endplates (e.g., in upper, middle and/or lower portions of the endplates). In an embodiment, the first endplate has a first opening that is in fluid communication with the interior chamber, and which has an open bottom that is continuous with the open bottom of the housing. In the same embodiment, the second endplate has a second opening that is in fluid communication with the interior chamber, and which has an open bottom that is continuous with the open bottom of the housing.

The method and apparatus of the present invention provides control over the wall thicknesses of the various components of the shaped multilayered articles, such as, fluid management structures, fabricated thereby. For example, the housing, first endplate and second endplate of the fluid management structure may each have wall thicknesses that are substantially equivalent, i.e., having a variation of wall thickness (a wall thickness variation value) of less than or equal to plus or minus 10 percent (e.g., a wall thickness in each case of 5.1 mm (0.2 inch) plus or minus 10 percent, that is a wall thickness in each case of from 4.59 mm to 5.61 mm), and preferably less than or equal to plus or minus 5 percent. Alternatively, the housing, first endplate and second endplate of the fluid management structure may each have different wall thicknesses (e.g., the housing having a wall thickness that is greater than that each of the first and second endplates, which may have substantially equivalent wall thicknesses).

Figure 29:
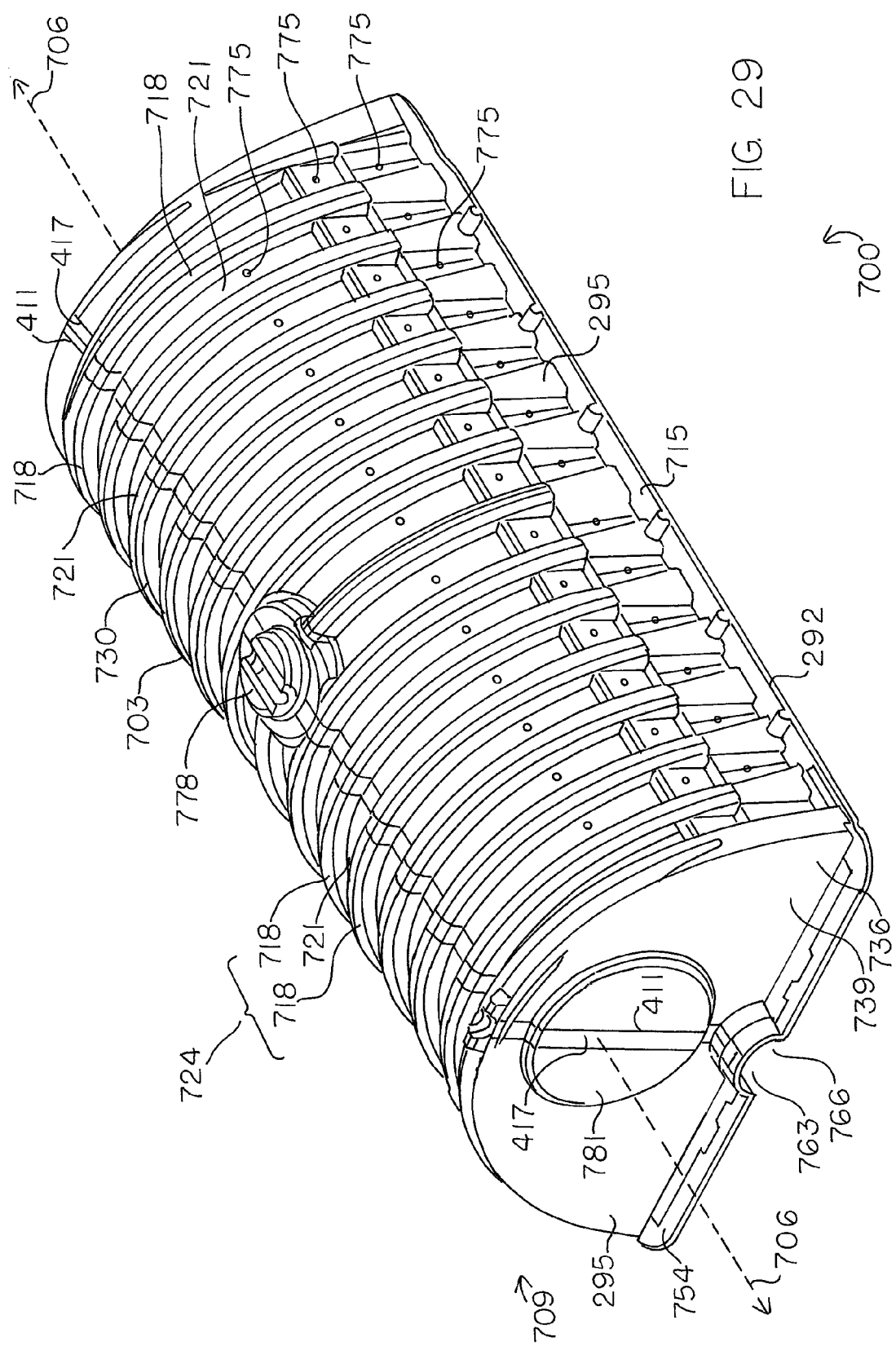
FIG. 29 is a representative perspective substantially isometric view of a fluid management structure prepared using the method and optionally the apparatus of the present invention.
Figure 30:
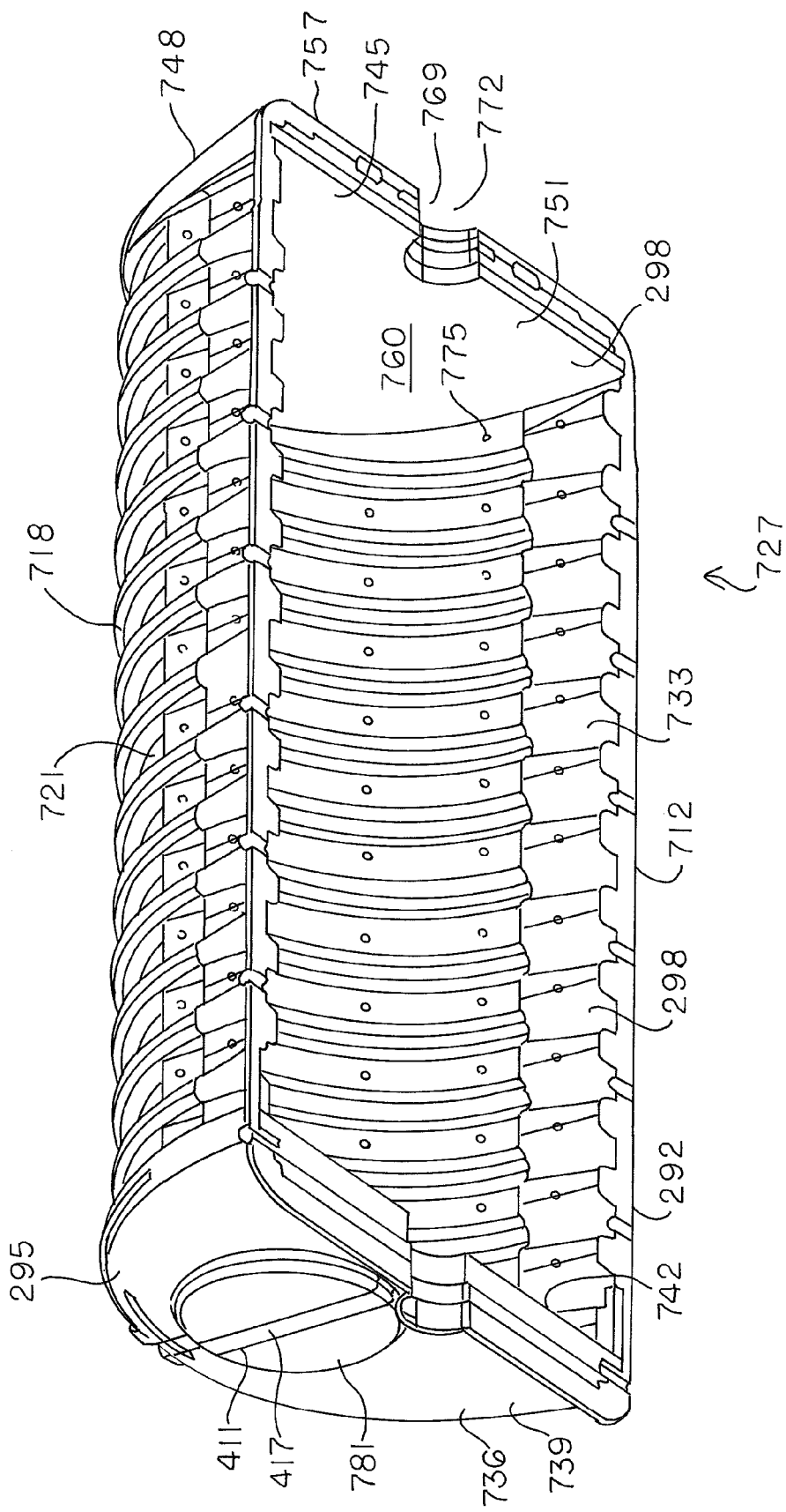
FIG. 30 is a perspective view of the underside of the fluid management structure of FIG. 29.

For purposes of further illustration, and with reference to FIGS. 29 and 30 there is depicted a fluid management structure 700 (e.g., a storm/waste water chamber 700) fabricated using the method and apparatus of the present invention. In particular, fluid management structure 700 is fabricated from multilayered sheet 292, in accordance with the method and apparatus as described previously herein. Fluid management structure 700 has a housing (or body) 703 having a longitudinal axis 706. Housing 703 has an arched shaped geometrical cross section 709 taken perpendicular relative to longitudinal axis 706. Housing 703 further includes a first base side flange 712 and a second base side flange 715, each of which extend laterally outward from housing 703 and which are each substantially parallel with longitudinal axis 706, and accordingly are and form opposing first and second base side flanges (712 and 715). Housing 703 includes a plurality of raised substantially continuous lateral ribs 718 that extend from the first to the second base side flanges (712 to 715), and a plurality of continuous lateral indentations (or valleys) 721 that extend from the first to the second base side flanges (712 to 715). Each continuous lateral indentation 721 is interposed between a pair of neighboring raised lateral ribs 718 (e.g., neighboring pair of raised lateral ribs 724 of FIG. 29). Raised lateral ribs 718 and lateral indentations 721: are substantially parallel to each other; in each case conform to (or follow) the arched shape of housing 703; and in each case are oriented substantially perpendicular relative to longitudinal axis 706. Housing 703 also has an open bottom 727, an exterior surface 730 and an interior surface 733.

Fluid management structure 700 further includes: a first endplate 736 having an exterior surface 739 and an interior surface 742 (not visible in the drawings); and a second endplate 745 having an exterior surface 748 (not visible in the drawings) and an interior surface 751. Housing 703, first endplate 736 and second endplate 745 together define a substantially continuous unitary structure (i.e., a substantially continuous unitary fluid management structure 700). First endplate 736 may optionally have a first endplate base flange 754 extending laterally outward therefrom. Second endplate 745 may optionally have a second endplate base flange 757 extending laterally outward therefrom. First endplate base flange 754 and second endplate base flange 757 are each substantially continuous with each of first base side flange 712 and second based side flange 715 of housing 703.

In an embodiment, fluid management structure 700 is free of first endplate 736 and/or second endplate 745, in which case the first and/or second ends of structure 700 are open. When free of both first endplate 736 and second endplate 745, fluid management structure 700 consists of housing 703, and the first and second ends of structure 700 are each open.

Exterior surface 730 of housing 703, exterior surface 739 of first endplate 736 and exterior surface 748 of second endplate 745 are in each case defined by first surface 295 of multilayered thermoplastic sheet 292. Accordingly, and, more particularly, at least a portion of exterior surface 733 of housing 703, exterior surface 739 of first endplate 736 and exterior surface 748 of second endplate 745 are each at least partially defined by first surface 417 of first plastic sheet 411. See, for example, first endplate 736 of FIGS. 29 and 30.

Interior surface 733 of housing 703, interior surface 742 of first endplate 736 and interior surface 751 of second endplate 745 are in each case defined by second surface 298 of multilayered thermoplastic sheet 292. See, for example, FIG. 30. In addition, interior surface 733 of housing 703, interior surface 742 of first endplate 736 and interior surface 751 of second endplate 745 together define an interior chamber 760 (FIG. 30) of fluid management structure 700.

First endplate 736 has a first opening 763 that is in fluid communication with interior chamber 760. First opening 763 of first endplate 736 has an open bottom 766 that is continuous with open bottom 727 of housing 703. Second endplate 745 has a second opening 769 that is in fluid communication with interior chamber 760. Second opening 769 of second endplate 745 has an open bottom 772 that is continuous with open bottom 727 of housing 703. First opening 763 and second opening 769 of the endplates allows a fluid, such as water, to pass into and out of interior chamber 760. In addition, first opening 763 and second opening 769 of the endplates allows a fluid, such as water, that collects within interior chamber 760 to flow out of the interior chamber. The first and/or second openings (763, 769) may be connected to the first and/or second opening of a neighboring fluid management structure (not shown) by suitable means, such as, a conduit (not shown). Alternatively, one of the first or second openings (763, 769) may be capped, in particular, when the fluid management structure is a terminal fluid management structure.

In addition or alternatively to having an opening (e.g., openings 763 and 769) having an open bottom (e.g., 766 and 772) the first and second endplates may each independently have an opening that is in fluid communication with interior chamber 760, but which does not have an open bottom (e.g., 766 or 772) that is continuous with open bottom 727 of housing 703. First endplate 736 includes an optional cap 781 that may be cutout so as to provide first endplate 736 with an opening (not shown) that is in fluid communication with interior chamber 760, but which does not have an open bottom that is continuous with open bottom 727. Second endplate 745 also has an optional cap (not visible in the drawings) that is similar to cap 781.

To provide for more efficient collection and/or emission of fluid, such as, water, within and/or out-of fluid management structure 700, housing 703 may further include a plurality of apertures 775. Apertures 775 may reside within raised lateral ribs 718 and/or continuous lateral indentations 721. As depicted in the drawings, apertures 775 of housing 703 reside within continuous lateral indentations 721 (and raised lateral ribs 718 are free of apertures 775). Apertures 775 allow a fluid, such as, water, to pass from the surrounding media in which the structure 700 is buried (e.g., ground) into and collect within interior chamber 760, from where the collected fluid may pass out through first endplate opening 763 and/or second endplate opening 769. Alternatively, or in addition thereto, apertures 775 allow a fluid, such as, water, to pass from interior chamber 760 out into the surrounding media in which the structure 700 is buried (e.g., ground). In addition, a fluid, such as, water, may pass up through open bottom 727 of housing 703 and into interior chamber 760, from where it may pass out through first endplate opening 763 and/or second endplate opening 769, and/or apertures 775. Apertures 775 may be formed during molding of fluid management structure 700 from the heated multilayered sheet 292, or they may be formed in a post-molding operation (e.g., by means of post-molding drilling and or punching operations).

The housing of the fluid management structure may be fabricated with additional molded-in features, such as, an inspection portal structure. Housing 703 of fluid management structure 700 has an inspection portal structure 778 (located in the top or apex of housing 703). Inspection portal structure 778 provides a means of accessing and inspecting interior chamber 760 of housing 703 after fluid management structure 700 has been buried underground, without compromising the structural and/or dimensional integrity of the fluid management structure. For example, after burying the structure underground, a portion of the overlaying ground may be removed so as to expose inspection portal structure 778, which may be cut open (typically, partially cut open and pulled up or back) to allow access to and visual inspection of interior chamber 760. After visual inspection of interior chamber 760 has been completed, inspection portal structure 778 may be sealed by suitable means (e.g., heat and/or radio frequency welding, and/or adhesives), and re-covered with ground material.

The present invention has been described with reference to specific details of particular embodiments thereof. It is not intended that such details be regarded as limitations upon the scope of the invention except insofar as and to the extent that they are included in the accompanying claims.

What is claimed is:

1. A method of forming a shaped multilayered article comprising:

(a) providing a first mold portion having an interior mold surface, said interior mold surface having a contour;

(b) providing a first plastic sheet having a first surface and a second surface defined by a thermoplastic layer having a melting temperature, said first plastic sheet being provided at a temperature that is less than said melting temperature of said thermoplastic layer defining said second surface of said first plastic sheet;

(c) forming, from at least one thermoplastic composition, a heated thermoplastic sheet having a temperature that allows said heated thermoplastic sheet to be thermoformable, said heated thermoplastic sheet having a first surface and a second surface, said temperature of said heated thermoplastic sheet being equal to or greater than the melting temperature of said thermoplastic layer defining said second surface of said first plastic sheet;

(d) positioning a portion of said second surface of said first plastic sheet in opposition with a portion of said first surface of said heated thermoplastic sheet;

(e) applying a stream of gas against a portion of said first surface of said first plastic sheet, so as to contact continuously, as said heated thermoplastic sheet is formed, said portion of said second surface of said first plastic sheet with said portion of said first surface of said heated thermoplastic sheet, thereby melt-bonding continuously said thermoplastic layer defining said second surface of said first plastic sheet and said heated thermoplastic sheet together, and thereby forming continuously a heated multilayered thermoplastic sheet having a first surface defined at least partially by said first surface of said first plastic sheet, and a second surface defined by said second surface of said heated thermoplastic sheet, said heated multilayered thermoplastic sheet having a temperature that allows said heated multilayered thermoplastic sheet to be thermoformable;

(f) bringing said second surface of said heated multilayered thermoplastic sheet into contour matching contact with said interior mold surface of said first mold portion;

(g) cooling said heated multilayered thermoplastic sheet thereby forming said shaped multilayered article, which retains said contour of said interior mold surface of said first mold portion; and (h) removing said shaped multilayered article from said first mold portion.

2. The method of claim 1 wherein said interior mold surface of said first mold portion comprises a plurality of perforations, said method further comprising, contacting a portion of said second surface of said heated multilayered thermoplastic sheet with said interior mold surface of said first mold portion, and drawing reduced pressure through said plurality of perforations of said interior mold surface of said first mold portion, thereby bringing said second surface of said heated multilayered thermoplastic sheet into contour matching contact with said interior mold surface of said first mold portion.

3. The method of claim 1 wherein said stream of gas comprises air, and said stream of gas has a temperature that is less than said melting temperature of said thermoplastic layer defining said second surface of said first thermoplastic sheet.

4. The method of claim 1 wherein said method is free of, passing through a nip of a pair of compressive rolls at least one of, said first plastic sheet and said heated thermoplastic sheet together, and said heated multilayered thermoplastic sheet, and passing over at least a portion of a surface of an individual roll at least one of, said first plastic sheet and said heated thermoplastic sheet together, and said heated multilayered thermoplastic sheet.

5. The method of claim 1 further comprising, providing a second plastic sheet having a first surface and a second surface defined by a thermoplastic layer having a melting temperature, said second plastic sheet being provided at a temperature that is less than said melting temperature of said thermoplastic layer defining said second surface of said second plastic sheet, positioning a portion of said second surface of said second plastic sheet in opposition with a portion of said second surface of said heated thermoplastic sheet, and applying a second stream of gas against a portion of said first surface of said second plastic sheet, so as to contact continuously, as said heated thermoplastic sheet is formed, said portion of said second surface of said second plastic sheet with said portion of said second surface of said heated thermoplastic sheet, thereby melt-bonding together continuously said thermoplastic layer defining said second surface of said second plastic sheet and said heated thermoplastic sheet, and thereby forming continuously said heated multilayered thermoplastic sheet in which said first surface of said heated multilayered thermoplastic sheet is defined at least partially by said first surface of said first plastic sheet, and said second surface of said heated multilayered thermoplastic sheet is defined at least partially by said first surface of said second plastic sheet, said temperature of said heated multilayered thermoplastic sheet allowing said heated multilayered thermoplastic sheet to be thermoformable.

6. The method of claim 1 wherein said first plastic sheet comprises said thermoplastic layer defining said second surface of said first plastic sheet, and at least one further layer, each further layer being fabricated from a material selected independently from the group consisting of thermoplastic materials, thermoset materials, metal foils, paper, woven fabric materials, nonwoven fabric materials and combinations thereof.

7. The method of claim 1 wherein said first plastic sheet is a first single layer plastic sheet, said thermoplastic layer defining said second surface and said first surface of said first plastic sheet.

8. The method of claim 1 further comprising, providing a second mold portion having an interior mold surface, and contacting compressively said interior mold surface of said second mold portion with said first surface of said heated multilayered thermoplastic sheet, after said second surface of said heated multilayered thermoplastic sheet has been brought into contour matching contact with said interior mold surface of said first mold portion, and before cooling of said heated multilayered thermoplastic sheet.

9. The method of claim 1 further comprising, providing a guide apparatus for said first plastic sheet comprising, an elongated arm comprising a forward portion having a guide slot dimensioned to receive said first plastic sheet there-through, said forward portion of said elongated arm being positioned in opposition to said first surface of said heated thermoplastic sheet, said forward portion of said elongated arm further comprising a conduit having a gas outlet aperture residing beneath said guide slot, said gas outlet aperture being dimensioned to allow said stream of gas to pass outward therefrom, passing said first plastic sheet through said guide slot such that said portion of said first surface of said first plastic sheet passes in front of said gas outlet aperture, and said portion of said second surface of said first plastic sheet is positioned in opposition with said portion of said first surface of said heated thermoplastic sheet, and passing said stream of gas out through said gas outlet aperture and against said portion of said first surface of said first plastic sheet, thereby driving said portion of said second surface of said first plastic sheet into contact with said portion of said first surface of said heated thermoplastic sheet, thereby melt-bonding continuously said thermoplastic layer defining said second surface of said first plastic sheet and said heated thermoplastic sheet together, and forming continuously said heated multilayered thermoplastic sheet.

10. The method of claim 9 wherein said forward portion of said elongated arm of said guide apparatus further comprises a bracket comprising a forward bracket portion and opposing sidewalls extending rearward from said forward bracket portion, said forward bracket portion defining said guide slot, the opposing sidewalls of said bracket together defining a guide channel extending rearward from said forward bracket portion and being dimensioned to receive said first plastic sheet there-through.

11. The method of claim 9 wherein said guide apparatus further comprises,
a guide rail, said elongated arm being attached slidingly to said guide rail, and said guide rail being substantially stationary relative to said elongated arm, and
a linear actuator having a first portion and a second portion, said linear actuator being reversibly linearly expandable, said first portion of said linear actuator being attached to said guide rail, and said second portion of said linear actuator being attached to said elongated arm, reversible linear expansion of said linear actuator providing reversible linear movement of said elongated arm along said guide rail,
said method further comprising,
actuating said linear actuator so as to move said elongated arm towards said first surface of said heated second thermoplastic sheet, and thereby positioning said forward portion of said elongated arm in opposition to said first surface of said heated thermoplastic sheet.

12. The method of claim 1 further comprising,
providing a mold apparatus comprising,
(i) said first mold portion which further comprises a perimeter edge, and in which said interior mold surface comprises a plurality of perforations,
(ii) a frame surrounding at least a portion of said perimeter edge of said first mold portion, said frame having an upper surface, said first mold portion and said frame being reversibly vertically positionable relative to each other, and
(iii) at least one sheet retainer, each sheet retainer having a clamp portion facing towards said perimeter edge of said first mold portion and comprising a clamp member and a clamp interior, said clamp member being reversibly closeable, said clamp interior being defined in part by said clamp member, each sheet retainer being independently, reversibly and laterally attached to said upper surface of said frame such that said clamp portion of each sheet retainer is reversibly and laterally positionable relative to said perimeter edge;
positioning said first mold portion and said frame relative to each other such that the upper surface of said frame is located above said perimeter edge;
positioning said clamp member of each sheet retainer in an open position so as to provide access to said clamp interior;
contacting a first portion of said second surface of said heated multilayered thermoplastic sheet with the clamp interior of at least one sheet retainer;
positioning said clamp member of said sheet retainer in a closed position so as to clamp and retain said first portion of said multilayered heated thermoplastic sheet within said clamp interior;
positioning said first mold portion and said frame relative to each other so as to contact a second portion of the second surface of said heated multilayered thermoplastic sheet with at least a portion of the interior mold surface of said first mold portion;
moving laterally at least one sheet retainer to a lateral position selected from the group consisting of towards said perimeter edge, away from said perimeter edge, and combinations thereof,
wherein lateral movement of said sheet retainer controls at least a portion of a thickness of said second portion of said heated multilayered thermoplastic sheet that is contacted with the interior mold surface of said first mold portion; and
drawing reduced pressure through said plurality of perforations of said interior mold surface of said first mold portion, such that said second portion of said second surface of said heated multilayered thermoplastic sheet substantially matches said contour of said interior mold surface of said first mold portion.

13. The method of claim 12 wherein said first mold portion is substantially stationary relative to vertical positioning, and said frame is reversibly and controllably vertically positionable, and
said frame is reversibly, controllably and vertically positioned relative to said first mold portion, thereby contacting said second portion of the second surface of said heated multilayered thermoplastic sheet with at least a portion of the interior mold surface of said first mold portion.

14. The method of claim 12 wherein said mold apparatus comprises at least two sheet retainers.

15. The method of claim 12 wherein each sheet retainer further comprises a base plate having an upper surface, a lower surface and a forward portion,
said clamp member being hingedly attached to an upper surface of said forward portion of said base plate, said clamp member and said forward portion of said base plate together defining said clamp portion of said sheet retainer, the upper surface of said forward portion and an inner surface of said clamp member together defining said clamp interior, and
at least a portion of said lower surface of said base plate slidingly abutting said upper surface of said frame.

16. The method of claim 15 wherein each sheet retainer further comprises:
a first linear actuator having a first end and a second end, said first linear actuator being reversibly linearly expandable, and said base plate further comprises a slot and a rear portion,
said first end of said first linear actuator being located within said slot and being fixedly attached to the upper surface of said frame, said second end of said first linear actuator being fixedly attached to an upper surface of said rear portion of said base plate, and
reversible linear expansion of said first linear actuator providing reversible lateral movement of said sheet retainer relative to said perimeter edge of said first mold portion; and a second linear actuator having a first end and a second end, said second linear actuator being reversibly linearly expandable,
    said first end of said second linear actuator being pivotally attached to an exterior surface of said clamp member, and said second end of said second linear actuator being attached to the upper surface of said rear portion of said base plate, and
    reversible linear expansion of said second linear actuator providing reversible closing of said clamp member.

17. The method of claim 12 further comprising,
melting said thermoplastic composition in an extruder thereby forming a molten thermoplastic composition, said extruder having a terminal end that is in fluid communication with a sheet die,
passing said molten thermoplastic composition through said sheet die, thereby forming said heated thermoplastic sheet,
    wherein said first mold portion and said frame are together moveable in a plane beneath said sheet die, and said sheet die is substantially stationary, and
moving said first mold portion and said frame together in said plane beneath said sheet die as said heated multilayered thermoplastic sheet is formed, thereby facilitating contact between said heated multilayered thermoplastic sheet and said clamp interior of said sheet retainer.

\* \* \* \* \*